(12) United States Patent
Bidkar et al.

(10) Patent No.: US 11,047,481 B2
(45) Date of Patent: Jun. 29, 2021

(54) SEAL ASSEMBLY FOR A ROTARY MACHINE

(71) Applicant: General Electric Company, Schenectady, NY (US)

(72) Inventors: Rahul Anil Bidkar, Niskayuna, NY (US); Steven Douglas Johnson, Milford, OH (US); Nathan Evan McCurdy Gibson, Cincinnati, OH (US)

(73) Assignee: General Electric Company, Schenectady, NY (US)

(*) Notice: Subject to any disclaimer, the term of this patent is extended or adjusted under 35 U.S.C. 154(b) by 297 days.

(21) Appl. No.: 16/296,620

(22) Filed: Mar. 8, 2019

(65) Prior Publication Data
US 2019/0203842 A1 Jul. 4, 2019

Related U.S. Application Data

(63) Continuation-in-part of application No. 15/697,062, filed on Sep. 6, 2017.

(51) Int. Cl.
*F16J 15/447* (2006.01)
*F01D 11/08* (2006.01)
(Continued)

(52) U.S. Cl.
CPC ......... *F16J 15/4476* (2013.01); *F01D 11/003* (2013.01); *F01D 11/02* (2013.01); *F01D 11/025* (2013.01); *F01D 11/08* (2013.01)

(58) Field of Classification Search
CPC .......... F01D 11/02; F01D 11/04; F01D 11/06; F01D 25/22; F04D 29/083; F04D 29/161;
(Continued)

(56) References Cited

U.S. PATENT DOCUMENTS 4,856,963 A 8/1989 Klapproth et al.
4,983,051 A 1/1991 Hibner et al.
(Continued)

OTHER PUBLICATIONS

Bruce et al., "Advanced Seal Technology Role in Meeting Next Generation Turbine Engine Goals", National Aeronautics and Space Administration Lewis Research Center, France, pp. 1-14, May 11-15, 1998.
(Continued)

*Primary Examiner* — Kristina R Fulton
*Assistant Examiner* — L. Susmitha Koneru
(74) *Attorney, Agent, or Firm* — Dority & Manning, P.A.

(57) ABSTRACT

A seal assembly of a rotary includes a radially oriented plate that axially opposes a front and rear support plates of a stator interface. The seal assembly also includes a film-riding shoe coupled with the radially oriented plate. The shoe forms a shoe fluid bearing between the shoe and a rotating component responsive to rotation of the rotating component and pressurization of fluid in the rotary machine upstream of the stator interface. One or more of the stator interface or the film-riding shoe includes one or more ports or pathways through which higher-pressure fluid upstream of the stator housing in the rotary machine flows to form an aft axial fluid bearing between the radially oriented plate and the rear support plate of the stator interface.

20 Claims, 33 Drawing Sheets

(51) Int. Cl.
*F01D 11/02* (2006.01)
*F01D 11/00* (2006.01)

(58) Field of Classification Search
CPC .............. F04D 29/164; F05B 2240/55; F05B 2240/57; F16J 15/4472; F16J 15/4474; F16J 15/4476; F16J 15/4478
See application file for complete search history.

(56) References Cited

U.S. PATENT DOCUMENTS

| | | | |
|---|---|---|---|
| 6,202,302 B1 | 3/2001 | Descoteaux | |
| 6,210,103 B1 | 4/2001 | Ramsay | |
| 6,692,006 B2 | 2/2004 | Holder | |
| 9,115,810 B2 | 8/2015 | Bidkar et al. | |
| 9,255,642 B2 | 2/2016 | Bidkar et al. | |
| 9,359,908 B2 | 6/2016 | Bidkar et al. | |
| 9,587,746 B2 | 3/2017 | Bidkar et al. | |
| 2001/0007632 A1 | 7/2001 | Pesek et al. | |
| 2008/0265513 A1* | 10/2008 | Justak | F01D 11/025 277/301 |
| 2012/0248704 A1 | 10/2012 | Fennell et al. | |
| 2014/0008871 A1 | 1/2014 | Bidkar et al. | |
| 2014/0062024 A1 | 3/2014 | Bidkar et al. | |
| 2014/0117624 A1 | 5/2014 | Bidkar et al. | |
| 2014/0119912 A1 | 5/2014 | Bidkar et al. | |
| 2016/0010480 A1 | 1/2016 | Bidkar et al. | |
| 2016/0130963 A1* | 5/2016 | Wilson | F01D 11/025 60/805 |
| 2017/0051834 A1* | 2/2017 | Webster | F16J 15/447 |
| 2017/0211402 A1* | 7/2017 | Peters | F01D 11/025 |
| 2018/0045066 A1* | 2/2018 | Chuong | F01D 11/025 |
| 2018/0058240 A1* | 3/2018 | Chuong | F04D 29/083 |
| 2019/0218926 A1* | 7/2019 | DiFrancesco | F01D 11/025 |
| 2020/0102845 A1* | 4/2020 | DiFrancesco | F01D 11/001 |

OTHER PUBLICATIONS

Munson et al., "Development of Film Riding Face Seals for a Gas Turbine Engine", Tribology Transactions, vol. 35, Issue: 01, pp. 65-70, Mar. 25, 2008.

* cited by examiner

SEAL ASSEMBLY FOR A ROTARY MACHINE

CROSS-REFERENCE TO RELATED APPLICATIONS

This application is a continuation-in-part of U.S. patent application Ser. No. 15/697,062, filed 6 Sep. 2017, the entire disclosure of which is incorporated herein by reference.

GOVERNMENT LICENSE RIGHTS

This invention was made with government support under contract number DE-FE0024007 awarded by the U.S. Department Of Energy. The government has certain rights in the invention.

FIELD

The subject matter described herein relates to seal assemblies in rotary machines.

BACKGROUND

Many rotary machines, such as gas turbines, steam turbines, aircraft engines, supercritical CO2 turbines, compressors and other rotary machines, have seals between the moving components (e.g., rotors) and the stationary components (e.g., stators). These seals help to reduce leakage of fluids between the rotors and stators. Increased leakage between rotors and stators can significantly reduce the power generated by the rotary machines; thereby lowering the operating efficiency of the rotary machines.

Typically, labyrinth seals are used for reducing the leakage through circumferential rotor-stator gaps. The radial clearance between rotors and stators can change multiple times the nominal clearance because of thermal transients and centrifugal growth. Labyrinth seals that are assembled with small radial clearances result in seal rubs (which have increased wear and degraded leakage performance), whereas labyrinth seals assembled having large radial clearances to avoid seals rubs lead to increased leakage. These seals are not able to maintain small clearances during steady-state operation and are not able to radially move with the rotor during a rotor transient so that any rubbing between the seal and the rotor is avoided.

BRIEF DESCRIPTION

In one embodiment, a seal assembly for a rotary machine is provided. The seal assembly includes a stator interface having a front support plate and an opposing rear support plate that are axially separated from each other along one or more axial directions that are parallel to an axis of rotation of a rotating component of the rotary machine. The seal assembly also includes plural seal segments configured to be disposed circumferentially intermediate to the rotating component of the rotary machine and axially located between the front support plate and the rear support plate of the stator interface. One or more of the seal segments includes a radially oriented plate configured to axially oppose the front support plate and/or the rear support plate of the stator interface and a film-riding shoe coupled with the radially oriented plate. The film-riding shoe is configured to form a shoe fluid bearing between the film-riding shoe and the rotating component responsive to rotation of the rotating component and pressurization of fluid in the rotary machine upstream of the front support plate of the stator interface. One or more of the stator interface or the film-riding shoe includes one or more ports or pathways through which higher-pressure fluid upstream of the stator housing in the rotary machine flows to form an aft axial fluid bearing between the radially oriented plate and the rear support plate of the stator interface.

In one embodiment, a seal segment of a seal assembly for a rotary machine having a stator interface and a rotating component is provided. The stator interface includes a front support plate and an opposing rear support plate that are axially separated from each other along one or more axial directions that are parallel to an axis of rotation of the rotating component. The seal segment includes a radially oriented front cover plate configured to axially oppose the front support plate of the stator interface, a radially oriented aft plate configured to axially oppose the rear support plate of the stator interface, and a film-riding shoe configured to be located in the vicinity of the cover plate and the aft plate. Responsive to rotation of the rotating component and pressurization of fluid in the rotary machine upstream of the front support plate of the stator interface, the cover plate forms at least part of a front axial fluid bearing between the cover plate and the front support plate using at least some of the fluid, the film-riding shoe forms at least part of a shoe fluid bearing between the film-riding shoe and the rotating component using at least some of the fluid, and the aft plate forms at least part of an aft fluid bearing between the aft plate and the rear support plate using at least some of the fluid.

In one embodiment, a method for forming fluid seals between a rotating component and a stator interface of a rotary machine and between a higher-pressure fluid volume upstream of the stator interface and a lower-pressure fluid volume downstream of the stator interface is provided. The method includes positioning plural seal segments circumferentially intermediate to the rotating component of the rotary machine and axially between a front support plate and a rear support plate of the stator interface and pressurizing the rotary machine with fluid to form the higher-pressure volume upstream of the stator interface. The higher-pressure volume rotates the rotating component to form the lower-pressure volume downstream of the stator interface. The method also includes forming a front axial fluid bearing between cover plates of the seal segments and the front support plate of the stator interface using at least some of the fluid, forming a shoe fluid bearing between film-riding shoes of the seal segments and the rotating component using at least some of the fluid, and forming an aft fluid bearing between aft plates of the seal segments and the rear support plate of the stator interface using at least some of the fluid.

In one embodiment, a seal segment of a seal assembly configured to extend around a rotating component of a rotary machine between the rotating component and a stator interface is provided. The seal segment includes a film-riding shoe having one or more internal passages and an aft plate coupled with the film-riding shoe. The one or more internal passages are configured to direct pressurized fluid in the rotary machine to a location between the film-riding shoe and the rotating component to form a radial film bearing between the film-riding shoe and the rotating component. The one or more internal passages also are configured to direct the pressurized fluid to a location between the aft plate and the stator interface to form an axial aft fluid bearing between the aft plate and the stator interface. The radial film bearing and the axial aft bearing prevent contact between the seal segment and the rotating component and between the seal segment and the stator interface.

In one embodiment, a seal assembly for a rotary machine includes plural seal segments disposed circumferentially intermediate to a stationary housing and a rotor. One or more of the seal segments includes a stator interface element, a radially oriented front cover plate, and a movably supported shoe plate. The shoe plate includes one or more labyrinth teeth forming a primary seal with the rotor, a load bearing surface radially offset from the one or more labyrinth teeth, a radial surface forming a frictionless secondary seal with the front cover plate, and one or more internal passageways configured to direct fluid through the shoe plate or through the front cover plate, and between the radial surface of the shoe plate and the front cover plate to form the frictionless secondary seal.

In one embodiment, a method includes forming one or more seal segments of a seal assembly for a rotary machine using additive manufacturing. The one or more seal segments are shaped to be positioned circumferentially intermediate to a stationary housing and a rotor of the rotary machine. Forming the one or more of the seal segments includes forming a stator interface element, a radially oriented front cover plate, and a shoe plate using additive manufacturing. The shoe plate is formed using additive manufacturing to include one or more labyrinth teeth forming a primary seal with the rotor, a load bearing surface radially offset from the one or more labyrinth teeth, a radial surface forming a frictionless secondary seal with the front cover plate, and one or more internal passageways configured to direct fluid from outside of the shoe plate, through the shoe plate, and between the radial surface of the shoe plate and the front cover plate to form the frictionless secondary seal.

In one embodiment, an assembly includes plural seal segments shaped to be disposed circumferentially between a stator and a rotor of a rotary machine. At least one of the seal segments includes a stator interface plate positioned to face the stator, a front cover plate in contact with the stator interface plate and positioned to radially extend between the stator and the rotor, and a shoe plate having a radial face that opposes the front cover plate and a bearing surface positioned to face the rotor. The shoe plate and/or the front plate has one or more internal passages shaped to direct fluid from outside of the at least one seal element to a gap in a seal between the radial face of the shoe plate and the front cover plate. The one or more internal passages are shaped to direct the fluid to the gap to reduce or eliminate friction between the radial face of the shoe plate and the front cover plate.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
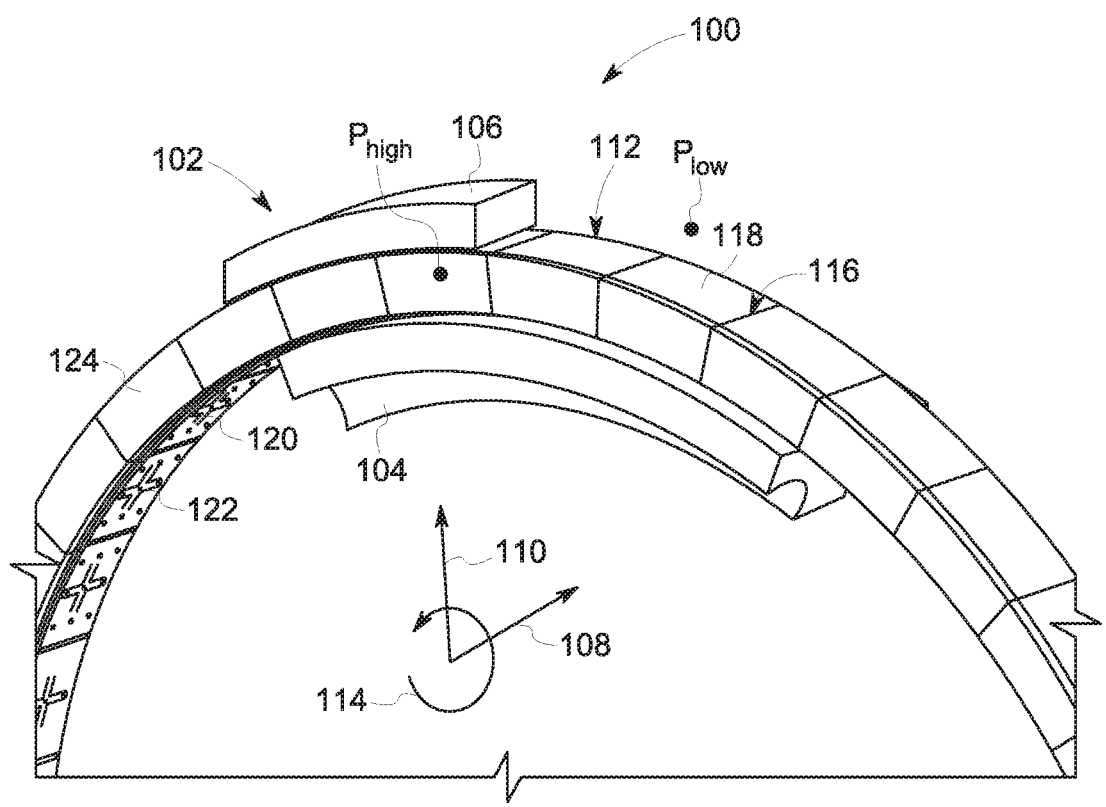
FIG. 1 illustrates a front perspective view of a seal assembly in conjunction with part of a rotary machine.

One or more embodiments of the inventive subject matter described herein provide seal assemblies for rotary machines. The seal assemblies are film-riding hybrid aerostatic-aerodynamic seals for sealing rotor-stator circumferential gaps in gas turbines, steam turbines, aircraft engines, supercritical CO2 turbines, centrifugal compressors, and other rotary machinery. As used herein, the terms "aerostatic" and "aerodynamic" are used to refer to the types of load-bearing pressures in a fluid film formed between the seal assembly and a rotor. The aerostatic forces are fluid film forces created due to pressurization and are thus pressure-dependent in nature. The aerodynamic forces are forces in the fluid film that are dependent on the speed at which the rotor rotates. The term "aero" or fluid should not restrict all embodiments of the inventive subject matter described herein to air as the working fluid. The seal assemblies can operate with other working fluids such as nitrogen, hydrogen, supercritical and gaseous CO2, and steam.

In one embodiment, a seal includes an assembly of several segments forming a 360-degree assembly to reduce the rotor-stator leakage. Each segment of this seal includes springs, a frictionless (or reduced friction) secondary seal formed by the interface between a front cover plate and individual segments, a shoe, and a stator interface element for attaching the spring and shoe to a turbomachinery stator. Optionally, each segment can be attached individually to the stator of the rotary machinery or several segments can be attached simultaneously to a single stationary piece of the rotary machinery In another embodiment, a seal includes an assembly of several segments forming a 360-degree assembly to reduce rotor-stator leakage. Each segment of this seal can include a shoe, a frictionless (or reduced friction) secondary seal formed by the interface between a front cover plate and individual segments, and a garter spring for supporting one or more, or all, individual shoes against the rotor.

The assembly reduces the flow of the fluid (e.g. air) through the circumferential rotor-stator gap relative to other types of seals. This seal also acts like a movable spring-shoe under the influence of aerostatic and aerodynamic loads.

Each segment maintains an air film between the shoe and the rotor, thereby ensuring that there is no contact (e.g., rubbing) between the shoe and the rotor. Furthermore, after pressurization, each shoe maintains an air film between the shoe and the front cover plate, thereby ensuring negligible friction force in the radial direction. These seals are based on the foil bearing and hybrid bearing technology.

The seal assemblies improve predictability for aerostatic force balance and radial operation of the seal assemblies and eliminate or significantly reduce the radial friction force from the secondary seal, thereby allowing for predictable radial motion of the seal assemblies. The seal assemblies can operate with both aerostatic and aerodynamic modes of operation, which increases load-bearing capacity of the assemblies. Ports and feeding grooves of the assemblies control pressure distributions on the shoes and control cooling flow around the shoes. In one embodiment, the seal assemblies have spline seals between neighboring shoes to reduce leakage between neighboring seal segments. In other embodiments, neighboring shoes are interlocked with one another (without restricting radial motion of shoes) to reduce leakage between neighboring seal segments. Load-bearing surfaces of the seal assemblies can have patterns of aerostatic feedholes and counterbores that allow for tilt correction and moment-bearing capacity of the seal assemblies.

Shoes of the seal assemblies can have either a curvature mismatch with the rotor and/or one or more grooves, steps, pockets, or the like that generate additional radial force in an aerodynamic operation mode. There optionally can be grooves, steps, pockets, or the like on the rotor to generate aerodynamic force. The rotor can be a stepped rotor to provide for reliable operation of the seal assemblies.

These seal assemblies described herein can provide advantages over other existing labyrinth sealing technologies. One or more embodiments of the seal assemblies are relatively very cheap to fabricate and present a reliable, robust seal for several locations in rotary machinery with high pressure drops and large transients. The non-contact operation of these seal assemblies makes the assemblies especially useful for large rotor transient locations where, due to limitations of the current labyrinth seal technology, large steady-state clearances typically are used (which thereby cause or result in significant leakage) to avoid rubs and wear.

The aerostatic feature of the seal assemblies improves load-bearing capacity and allows operation of the seal assemblies at increased running gaps compared to previous foil seals. This increased gap enables seal operation at higher speeds. Furthermore, the frictionless secondary seal allows for high differential pressure operation, which is not possible with previous secondary seal concepts. Specifically, in previous radial seal designs, the secondary seal friction force scales with the differential pressure and makes the seal inoperable for large differential pressures. The concept of the inventive subject matter described herein reduces or eliminates the large pressure-dependent frictional force, thereby enabling the seal for large differential pressure operation.

FIG. 1 illustrates a front perspective view of a seal assembly 100 in conjunction with part of a rotary machine 102. The rotary machine 102 includes a moveable (e.g., rotating) stepped rotor 104 and a stationary housing, or stator, 106. The rotor 104 rotates relative to the stator 106 and the seal assembly 100 by rotating around or about an axis of rotation 108 (that coincides with or extends parallel to an axial direction 108 of the rotary machine 102).

The seal assembly 100 is formed by assembling several seal segments 112 circumferentially around the axis of rotation 108 along a circumferential direction 114 and between the rotor 104 and stator 106. The seal assembly 100 is used to reduce or minimize (e.g., eliminate) the leakage of fluid (e.g., working fluid, exhaust or other gases) between a cavity that is upstream of the rotor 104 and seal assembly 100 (e.g., along the axial direction 108 shown in FIG. 1) and a cavity that is downstream of the rotor 104 and seal assembly 100 in the rotary machine 102 (e.g., along the axial direction 108 shown in FIG. 1).

Higher-pressure fluid (shown as $P_{high}$ in the Figures) in the upstream cavity passes through and rotates the rotor 104 along the axial direction 108 to the downstream cavity as lower-pressure fluid (shown as $P_{low}$ in the Figures) along the axial direction 108 shown in FIG. 1. Front cover plates 124 of the seal segments 112 face the high-pressure fluid in the upstream cavity. The front cover plates 124 are radially oriented in that the plates 124 radially extend between the stator 106 and rotor 104 (e.g., extend along radial directions 110). Opposite rear surfaces of the seal segments 112 (not visible in FIG. 1) face the low-pressure fluid in the downstream cavity.

The neighboring seal segments 112 are separated by a small intersegment gap 116 that allows for free motion of the individual seal segments 112 relative to each other (predominantly in the radial direction 110) of each segment 112, which is unaffected by the neighboring seal segments 112. Each seal segment 112 includes a stator interface surface or plate 118 that faces and/or directly engages the stator 106 and an opposite load-bearing surface 120 that faces the rotor 104. The stator interface surfaces 118 can be used for attaching (e.g., by bolting, brazing, or welding) each seal segment 112 to the stator 106. The load-bearing surfaces 120 are parts of shoes of the seal segments 112, as described herein. These shoes optionally can include spline seals that reduce or eliminate fluid leakage between the neighboring seal segments 112 in one embodiment.

The load-bearing surfaces 120 can include hydrostatic ports 122 through which at least some of the fluid passing through internal passages in the seal segments 112 flows. As described herein, these ports 122 direct this fluid between the seal segments 112 and the rotor 104 to allow the seal segments 112 (and the seal assembly 100) to float above the rotor 104 (to avoid wearing down the seal segments 112) while maintaining a seal between the seal assembly 100 and the rotor 104 that prevents or reduces passage of the high-pressure fluid between the seal assembly 100 and the rotor 104 to the downstream cavity.

Figure 2:
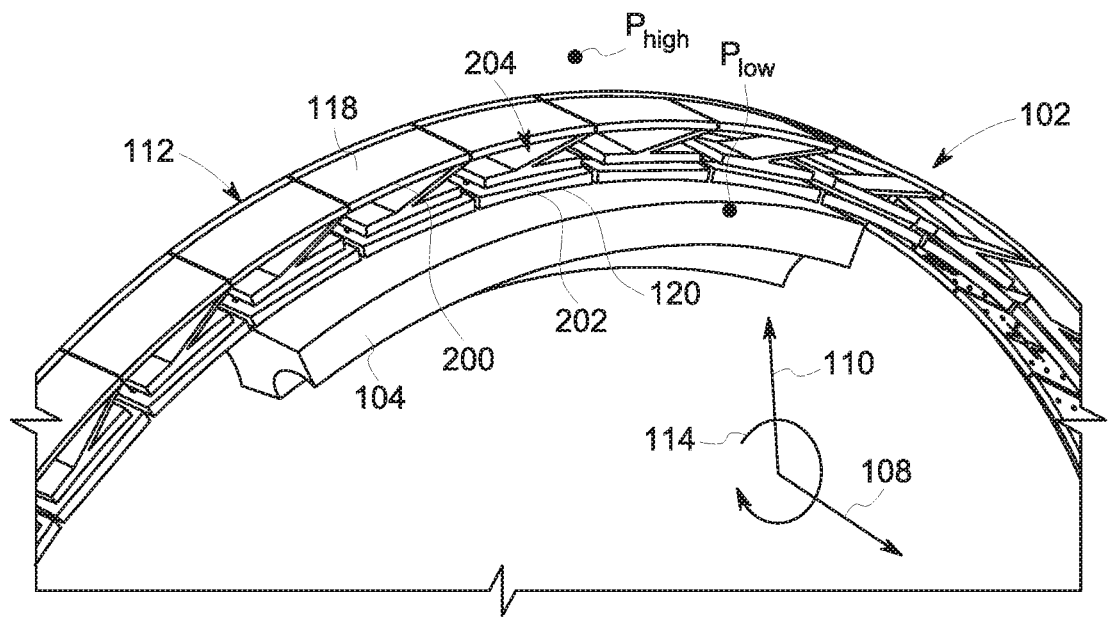
FIG. 2 illustrates a rear perspective view of the seal assembly shown in FIG. 1.
Figure 3:
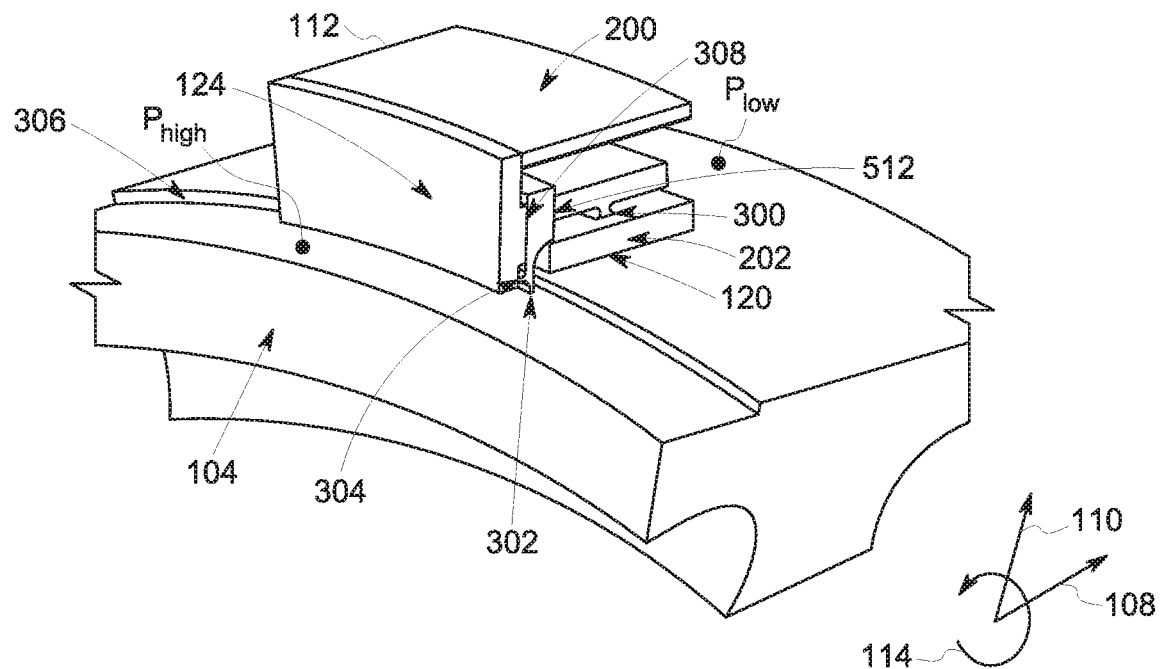
FIG. 3 illustrates a front perspective view of one seal segment in the seal assembly according to one embodiment.
Figure 4:
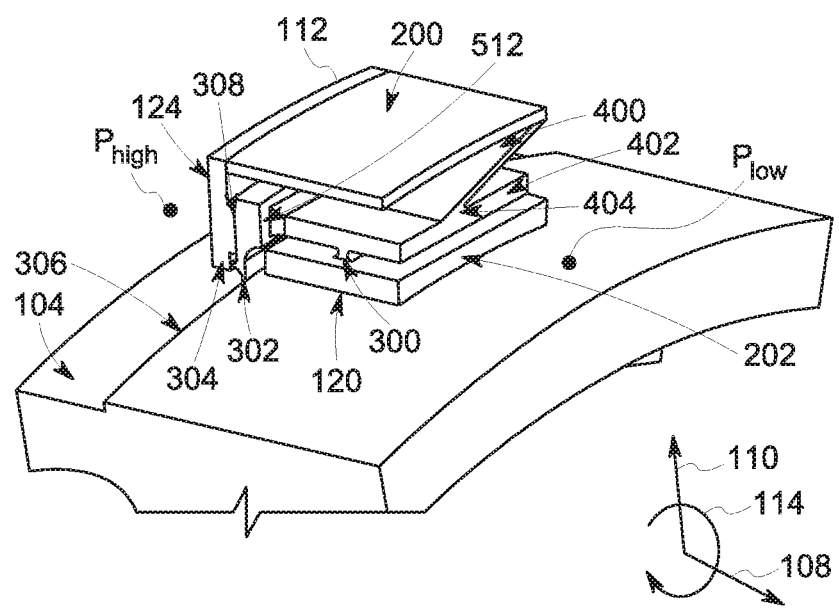
FIG. 4 illustrates a rear perspective view of the seal segment shown in FIG. 3.

FIG. 2 illustrates a rear perspective view of the seal assembly 100 shown in FIG. 1. FIG. 3 illustrates a front perspective view of one seal segment 112 in the seal assembly 100 according to one embodiment. FIG. 4 illustrates a rear perspective view of the seal segment 112 shown in FIG. 3. The stator 106 is not shown in FIGS. 2 through 4.

The seal segments 112 include stator interface elements 200, which are curved, thin bodies that include the stator interface surfaces 118. The seal segments 112 also include shoe plates 202 that are opposite of the stator interface elements 200. The shoe plates 202 include the load-bearing surfaces 120. The shoe plates 202 in neighboring seal segments 112 may be interlocked with each other by slanted faces or surfaces 2908 (shown in FIG. 29) that reduce leakage of fluid between the neighboring shoe plates 202.

The shoe plates 202 and stator interface elements 200 are coupled with each other by flexible elements 204. The flexible element 204 is shown as an angled planar or substantially planar body 400 and a curved thin body 402 (shown in FIG. 4) joined at an acute angle with respect to each other. The angled body 400 of the flexible element 204 extends from the stator interface element 200 toward the curved body 402. The angled body 400 is oriented at a transverse or acute angle to each of the thin body 402 and the stator interface element 200 in the illustrated embodiment. Optionally, the flexible elements 204 can be springs, flexures, bellow springs, or the like.

The flexible elements 204 moveably support the shoe plates 202 with the stator interface elements 200 in that the flexible elements 204 can flex to permit the shoe plates 202 to move relative to the stator interface elements 200 as the radial distance between the stator 106 and rotor 104 changes during operation of the rotary machine 102. This can prevent the shoe plates 202 from contacting and rubbing against the rotor 104, which wears down and damages the seal segments 112. For example, the flexible elements 204 can provide radial compliance, rotational rigidity about the circumferential and axial directions 114, 108, and guide the motion of the shoe plates 202 (e.g., along the radial and axial directions 110, 108).

In the illustrated embodiment, the flexible element 204 includes a rolling flexural pivot 404 (shown in FIG. 4) at the connection or intersection between the bodies 400, 402 of the flexible element 204. The rolling flexural pivot 404 can be elongated and axially extend along the axial direction 108 or parallel to the axial direction 108. The rolling flexural pivot 404 allows for rotational motion (e.g., rolling) of the stator interface element 200, the flexible element 204, and/or the front cover plate 124 (e.g., by the cover plate 124 being coupled with the flexible element 204). This rotational motion includes the rolling of one or more of these components in directions about or around the axial direction 108. This degree of freedom is useful for the film-riding shoe plate 202 to form a converging-diverging fluid film wedge between the rotor 104 and the shoe plate 202. As described below, the shoe plate 202 floats or rides above the rotor 104 by forming a fluid film between the load-bearing surface 120 and the rotor 104. The rotational motion of components of the seal segment 112 allowed by the rolling flexural pivot 404 can ensure that the converging-diverging fluid film wedge shape is maintained and that a separation gap between the shoe plate 202 and the rotor 104 even when the gaps between the shoe plate 202 and rotor 104 change during operation of the rotary machine 102.

The shoe plate 202 optionally includes a pitching flexural pivot 300 (shown in FIG. 3) to allow for pitching degree of freedom of the seal segment 112. The pitching flexural pivot 300 is formed by a protrusion that juts out from the lower surface of the curved body 402 of the flexible element 204 in a direction that is opposite the radial direction 110 and that is toward the axis of rotation 108. The pitching flexural pivot 300 can be elongated and circumferentially extend along the circumferential direction 114 or parallel to the circumferential direction 114. The pitching degree of freedom allows the shoe plate 202 to adjust (e.g., move) to front-aft tilting or coning motion of the rotor 104.

Figure 5:
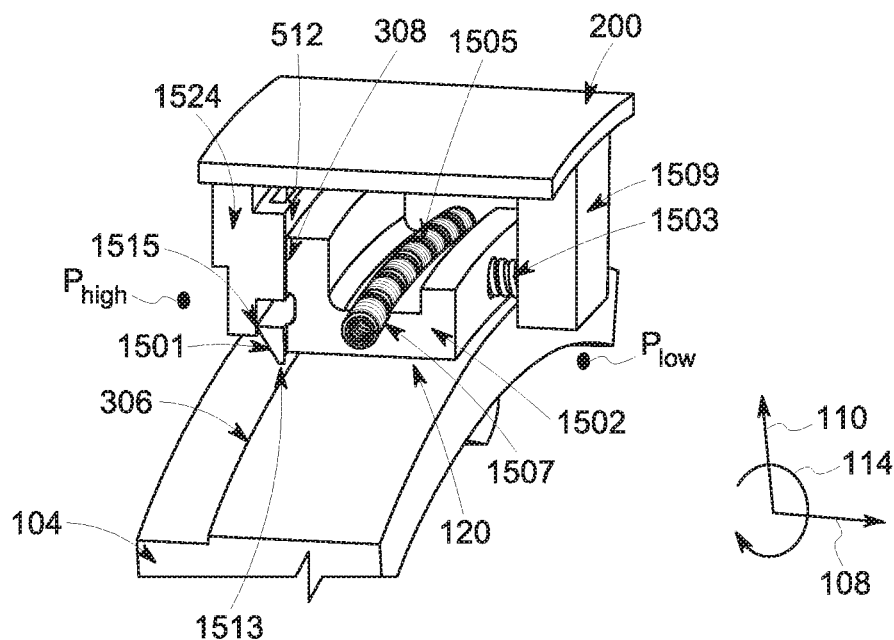
FIG. 5 illustrates a perspective view of a seal segment according to another embodiment.
Figure 6:
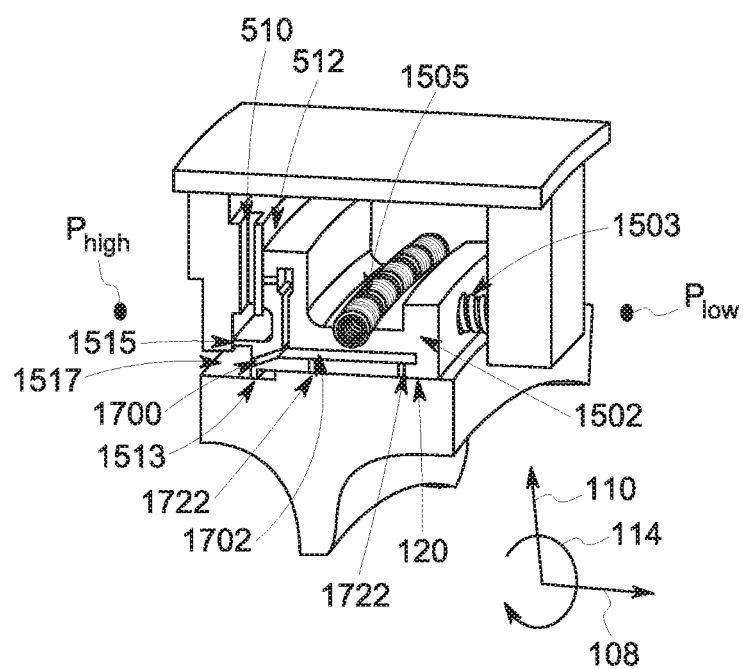
FIG. 6 illustrates a cross-sectional view of the seal segment shown in FIG. 5 according to one embodiment.
Figure 7:
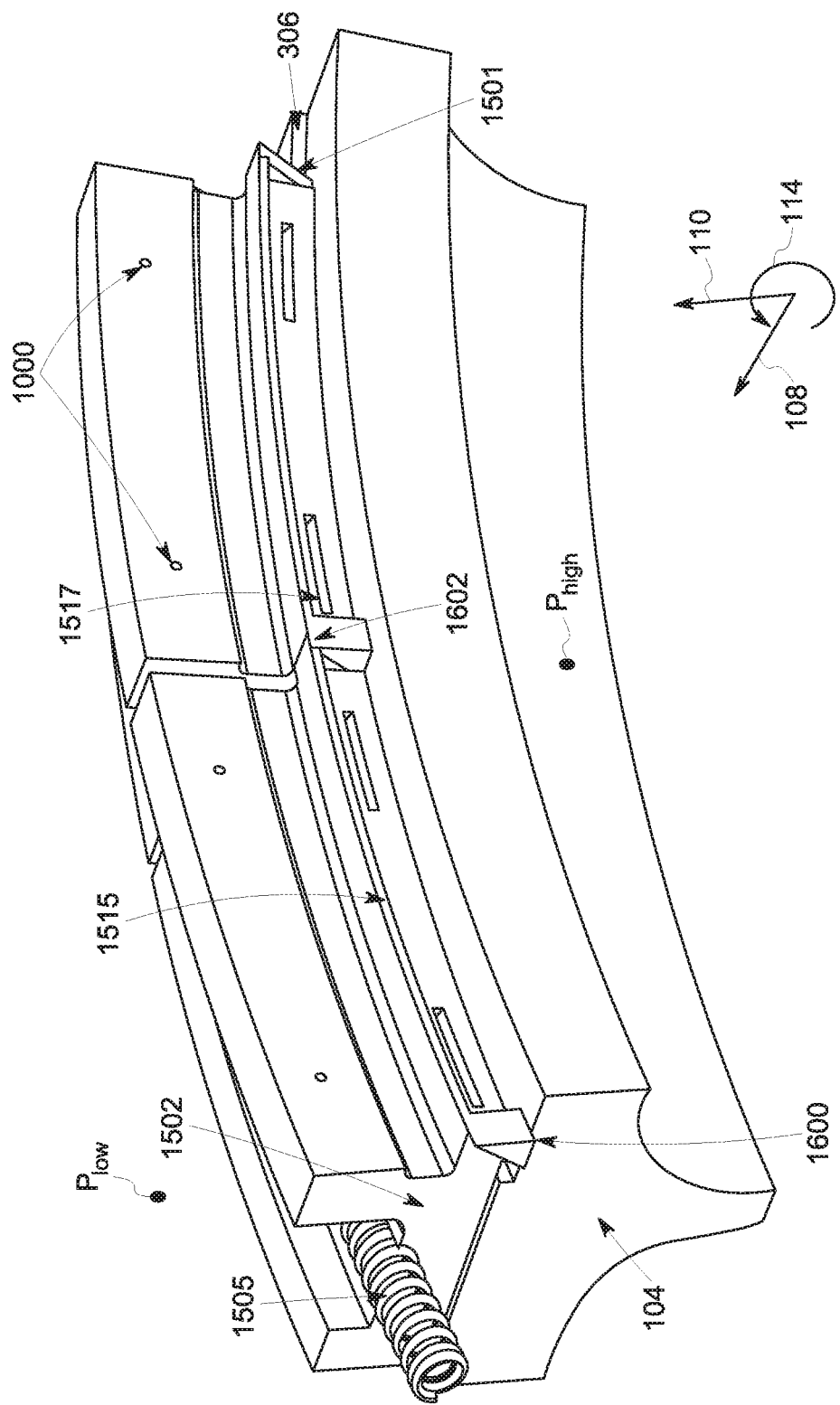
FIG. 7 illustrates plural seal segments shown in FIG. 5 coupled with each other and engaged with the rotor shown in FIG. 1 according to one embodiment.

FIG. 5 illustrates a perspective view of a seal segment 1512 according to another embodiment. FIG. 6 illustrates a cross-sectional view of the seal segment 1512 shown in FIG. 5 according to one embodiment. FIG. 7 illustrates plural seal segments 1512 coupled with each other and engaged with the rotor 104 according to one embodiment. The seal segment 1512 can be used in the assembly 100 in place of one or more, or all, of the seal segments 112 shown and described herein.

The seal segment 1512 includes a shoe plate 1502 that can interlock with neighboring shoe plates 1502 of other seal segments 1512 via a slanted contact interface 1501 of the shoe plates 1502. This slanted interface 1501 allows for each shoe plate 1502 to move outward in the radial direction 108 without any restriction, but blocks (or reduces) leakage of fluid between neighboring shoe plates 1502. The shoe plates 1502 include elongated recesses or indentations 1507 that extend along or parallel to the circumferential direction 114. These recesses or indentations 1507 receive a garter spring or multiple garter springs 1505 inside the seal segments 1512.

The garter spring 1505 radially pushes the shoe plates 1502 inward. A single garter spring 1505 can extend around the entire circumference of the assembly 100 and the rotor 104, or two or more garter springs 1505 can extend within the seal segments 1512 and around the entire circumference of the assembly 100 and the rotor 104.

The seal segment 1512 includes a radial stator interface wall 1509 that is located opposite of a front cover plate 1524 of the seal segment 1512. The stator interface wall 1509 extends radially from a location close to the rotor 104 (e.g., closer to the rotor 104 than the stator interface element 200) to the stator interface element 200. The shoe plates 1502 also are supported with axial springs 1503. The axial springs 1503 are located between an interior surface of the stator interface wall 1509 and the shoe plate 1502, as shown in FIG. 5. The axial springs 1503 impart forces on the shoe plate 1502 to force the shoe plate 1502 and the contact interface 1501 in the direction that is opposite of the axial direction 108. The shoe plates 1502 include the load-bearing surfaces 120, and other features such as labyrinth seals, internal passages, etc., as described herein.

Returning to the description of the seal segment 112 shown in FIGS. 1 through 4, the shoe plate 202 includes one or more labyrinth teeth 302, 304 (shown in FIG. 3) facing the rotor 104 on the upstream end of the seal segment 112. The shoe plate 1502 of the seal segment 1512 shown in FIG. 5 includes a primary labyrinth tooth 1513 that corresponds to the labyrinth tooth 302 (and the accompanying description herein) and a secondary labyrinth tooth 1515 that corresponds to the labyrinth tooth 304 (and the accompanying description herein). The labyrinth tooth 302, 1513 is formed as a protrusion that juts out from the remainder of the shoe plate 202, 1502 in a direction toward the rotor 104 and that is opposite of the radial direction 110. The labyrinth tooth 302, 1513 can be elongated in a direction that is along or parallel to the circumferential direction 114. The labyrinth tooth 304, 1515 is formed as a protrusion that juts out from the remainder of the shoe plate 202, 1502 in a direction that is opposite but parallel to the axial direction 108. In the illustrated embodiment, the labyrinth teeth 302, 304 and the labyrinth teeth 1513, 1515 extend from the shoe plates 202, 1502 in perpendicular directions. Alternatively, the labyrinth teeth 302, 304 and the labyrinth teeth 1513, 1515 extend from the corresponding shoe plate 202, 1502 in non-perpendicular but transverse directions.

The labyrinth teeth 302, 304, 1513, 1515 form fluid seals between the sealing segment 112, 1512 and the rotor 104 that prevent or reduce passage of the high-pressure fluid from the upstream cavity of the rotary machine 102 to the downstream cavity of the rotary machine 102 between the seal assembly 100 and the rotor 104. The labyrinth tooth 302, 1513 can be referred to as a primary tooth or primary labyrinth tooth 302, 1513 that forms a primary seal between the seal segment 112, 1512 and the rotor 104. This seal is formed by the primary labyrinth tooth 302, 1513 being very close (e.g., within close proximity to) the rotor 104 during rotation of the rotor 104 relative to the stationary or non-rotating seal segment 112, 1512. For example, the outer end of the labyrinth tooth 302, 1513 may be closer to the rotor 104 than the other labyrinth tooth 304, 1515 and/or may be closer to the rotor 104 than the lower end (e.g., along the radial directions 110) of the front cover plate 124, 1524.

The labyrinth tooth 304, 1515 can be referred to as a secondary tooth or secondary labyrinth tooth 304, 1515 that forms a secondary seal between the front cover plate 124, 1524 and the shoe plate 202, 1502. This seal is formed by the secondary labyrinth tooth 304, 1515 being very close (e.g., within close proximity to) the front cover plate 124, 1524. For example, the outer end of the labyrinth tooth 304, 1515 may be closer to the front cover plate 124, 1524 than the other labyrinth tooth 302, 1513.

The labyrinth teeth 302, 304, 1513, 1515 are depicted as single tooth protrusions, but other embodiments with multiple protrusions forming a set of primary labyrinth teeth and/or multiple protrusions forming a set of secondary labyrinth teeth are also possible.

In certain embodiments, the opposite edges of the primary labyrinth tooth 302 in each seal segment 112 (e.g., the edges that are opposite to each other along the circumferential direction 114) can engage or abut the edges of the primary labyrinth teeth 302 in the neighboring seal segments 112 to maintain the primary seal around the circumference of the seal assembly 100. In certain embodiments, the opposite edges of the secondary labyrinth tooth 304 in each seal segment 112 (e.g., the edges that are opposite to each other along the circumferential direction 114) can engage or abut the edges of the secondary labyrinth teeth 304 in the neighboring seal segments 112 to maintain the secondary seal around the circumference of the seal assembly 100. In other embodiments, the opposite edges of the primary labyrinth tooth 302 in each seal segment 112 may have a small clearance (separation) from the edges of the primary labyrinth teeth 302 in the neighboring seal segments 112; thereby resulting in a segment gap. In some embodiments, this segment gap leakage is reduced using spline seals between neighboring seal segments 112, 1512. In other embodiments, the neighboring shoes 1502 are interlocked along the slanted faces or interfaces 1501 as shown in FIG. 7. For example, one end 1600 of a slanted interface 1501 in one seal segment 1512 can protrude away from the seal segment 1512 along the circumferential direction 114 (or in a direction that is opposite the circumferential direction 114) while an opposite end 1602 of the same slanted interface 1501 in the same seal segment 1512 can be recessed into the seal segment 1512. The recessed end 1602 of the slanted interface 1501 can be sized to receive the projected or protruding end 1600 of the neighboring or adjacent seal segment 1512, as shown in FIG. 7.

During operation of the rotary machine 102, the pressure of the fluid reduces from the high-pressure $P_{high}$ to the low-pressure $P_{low}$ across the primary seal formed by the labyrinth teeth 302 in the seal assembly 100. The cavities downstream of the primary seal labyrinth teeth 302 are connected to the overall downstream cavity of the rotary machine 102.

The position of the primary labyrinth seal near the spinning rotor 104 and formed by the primary labyrinth teeth 302 is maintained by the film-riding shoe plate 202, which has the load-bearing surface 120 facing the rotor 104. The film-riding shoe plate 202 generates a radial aerostatic-aerodynamic force that positions the primary labyrinth seal tooth 302, while the primary labyrinth seal tooth 302 forms the primary seal. For example, a small amount of the fluid passes through internal passages of the seal segment 112 (described below) and exits out of the ports 122 (shown in FIG. 1) through the load-bearing surface 120 that faces the rotor 104. The fluid exiting the seal segment 112 through the ports 122 forms the fluid film between the shoe plate 202 and the rotor 104. This film applies the aerostatic-aerodynamic force in the radial directions 110 (or directions that are opposite to the radial directions 110) to cause the shoe plate 202, the primary labyrinth teeth 302 and seal segment 112 to float above (or maintain a separation distance from) the rotor 104. This primary labyrinth teeth 302 prevents additional fluid (not in the internal passages of the seal segments 112) from crossing over or through the gap between the seal segments 112 and the rotor 104.

The one or more primary seal labyrinth teeth 302 and the surface 120 of the film-riding shoe plate 202 ride on the rotor 104 at different radii of the rotor 104, as shown in FIGS. 3 and 4. The rotor 104 has a step 306 between the different radii of the rotor 104. The step 306 in the rotor 104 decelerates axial momentum of the fluid (e.g., momentum of the fluid in a direction along or parallel to the axial direction 108 or axis of rotation 108). This momentum can be created by a pressure drop in the fluid across the one or more labyrinth teeth 302. This enables the fluid film formed between the load-bearing surface 120 of the shoe plate 202 and the rotor 104 to remain unaffected by fluid leakage emanating from the primary seal formed by the primary labyrinth teeth 302 during movement of the rotor 104 and operation of the rotary machine 102.

Figure 9:
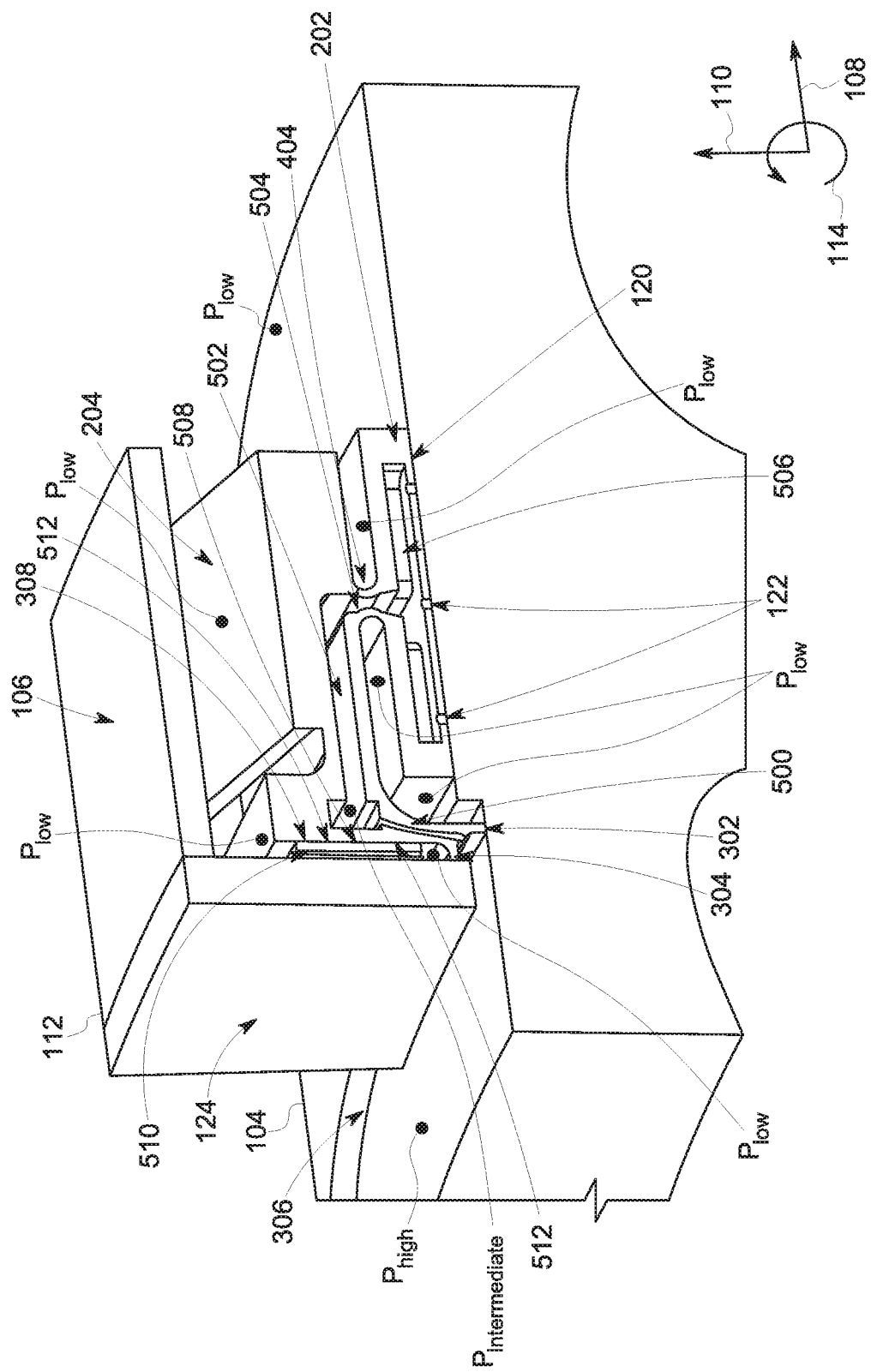
FIG. 9 illustrates a cross-sectional view of the seal segment shown in FIG. 3 according to one embodiment.

FIG. 9 illustrates a cross-sectional view of the seal segment 112 shown in FIG. 1 according to one embodiment. The load-bearing surface 120 of the shoe plate 202 has several of the ports 122 that direct fluid toward the rotor 104 (e.g., along or in a direction opposite to the radial direction 108). The shoe plate 202 has several internal hollow passages that feed at least some of the pressurized fluid to the ports 122 on the load-bearing surface 120 of the shoe plate 202. These passages include a feed passage 500, an upper or outer passage 502, a radial or interconnection passage 504, and a lower or inner passage 506. The feed passage 500 extends from an inlet located between the primary and secondary labyrinth teeth 302, 304 to the upper passage 502 (e.g., along a direction that is closer to being parallel to the radial directions 110 than the axial direction 108). The upper passage 502 extends along or parallel to the axial direction 108 toward the interconnection passage 504. The interconnection passage 504 is fluidly coupled with the upper passage 502 and extends along or parallel to the radial direction 110. The lower passage 506 is fluidly coupled with the interconnection passage 504 and extends along or parallel to the radial direction 110. The lower passage 506 is within the shoe plate 202 and is fluidly coupled with the ports 122 through the load-bearing surface 120 of the shoe plate 202.

With respect to the seal segment 1512 shown in FIG. 6, the load-bearing surface 120 of the shoe plate 1502 has several hydrostatic ports 1722 that direct fluid toward the rotor 104 (e.g., along or in a direction opposite to the radial direction 108). The shoe plate 1502 has several internal hollow passages that feed at least some of the pressurized fluid to the ports 1722 on the load-bearing surface 120 of the shoe plate 1502. These passages include a feed passage 1700 and an interconnection passage 1702. The feed passage 1700 extends from an inlet located between the primary and secondary labyrinth teeth 1513, 1515 to the interconnection passage 1702 (e.g., along a direction that is closer to being parallel to the radial directions 110 than the axial direction 108). The interconnection passage 1702 extends along or parallel to the axial direction 108 toward the hydrostatic ports 1722. The interconnection passage 1702 is fluidly coupled with the hydrostatic ports 1722 through the load-bearing surface 120 of the shoe plate 1502. Fluid is received into the feed passage 1700 through one or more feedholes or feed slots 1517.

The internal passages 500, 502, 504, 506, 1700, 1702 in the seal segments 212, 1512 are pressurized by fluid from the high-pressure or upstream side of the seal assembly 100. The ports 122, 1722 through the load-bearing surface 120 of the shoe plate 202, 1502 allow the film-riding shoe plate 202, 1502 to operate with an aerostatic film formed by the fluid moving through the passages 500, 502, 504, 506, 1700, 1702 and out of the seal segment 112, 1512 through the ports 122, 1722. Additionally, the load-bearing surface 120 of the shoe plate 202, 1502 may be machined with a radius larger than the radius of the rotor 104. This radii curvature mismatch allows the load-bearing surface 120 to form a converging-diverging (along the tangential direction of the rotor 104) thin film wedge between the load-bearing surface 120 and the spinning rotor 104. This converging-diverging fluid film leads to the generation of an aerodynamic force in the presence of rotation of the rotor 104 (relative to the seal assembly 100). Optionally, instead of the curvature mismatch, the rotor 104 or the load-bearing surface 120 of the shoe plate 202 may also have aerodynamic features such as spiral grooves, and/or Rayleigh steps to generate aerodynamic force in the presence of rotation of the rotor 104.

The presence of aerostatic ports and aerodynamic features (spiral grooves, Rayleigh steps or curvature mismatch) results in a high-stiffness fluid film being formed and separating the shoe plate 202, 1502 from the rotor 104. The characteristics of the film are such that the pressure of the fluid in the film increases with a corresponding reduction in thickness of the film, and vice versa. For example, as the rotor 104 moves closer to the seal assembly 100 during rotation of the rotor 104, the fluid film between the rotor 104 and the seal assembly 100 becomes thinner. But, the decreasing thickness of the fluid film also causes the pressure of the fluid in the film to increase. The increase in pressure of fluid in the film increases the forces exerted on the seal assembly 100 and the rotor 104 to prevent the rotor 104 from abutting, contacting, or otherwise engaging the seal assembly 100. This prevents wear of the seal assembly 100.

This characteristic of the fluid film pressure along with the flexible element 204, 1505 pushing or urging the shoe plate 202, 1502 toward the rotor 104 results in the shoe plate 202, 1502 (and the load-bearing surface 120 of the shoe plate 202, 1502) closely following or tracking radial incursions of the rotor 104, such as when the rotor 104 expands during rotation. The film-riding shoe plate 202, 1502 maintains a very small distance (e.g., 5 to 25 microns) between the rotor 104 and the load-bearing surface 120 using aerodynamic and aerostatic forces, thereby positioning the primary labyrinth seal formed by the primary labyrinth teeth 302, 1513 very close to the rotor 104.

Movement of the rotor 104 in or along the radial direction 110 may be caused by or result from thermal growth or expansion of the rotor 104, centrifugal growth or movement of the rotor 104 due to rotation of the rotor 104, and/or vibratory motion of the rotor 104 along the radial direction 110. The high stiffness of the thin fluid film between the shoe plate 202, 1502 and the rotor 104 is maintained and helps with tracking the radial motion of the rotor 104. This radial tracking (or following) of the rotor 104 enables the primary labyrinth seal formed by the primary labyrinth teeth 302, 1513 to maintain a small clearance gap between the rotor 104 and the teeth 302, 1513. This radial tracking also eliminates or reduces relative motion between the rotor 104 and the primary labyrinth teeth 302, 1513 along or in the radial directions 110 (and/or in opposite directions).

The elimination of relative radial motion between the primary labyrinth seal teeth 302 and the rotor 104 leads to non-degrading labyrinth seal teeth 302, 1513 and sustained low-leakage performance otherwise not possible with other labyrinth seals, which undergo degradation upon relative radial motion between the rotor 104 and the seal teeth.

Figure 10:
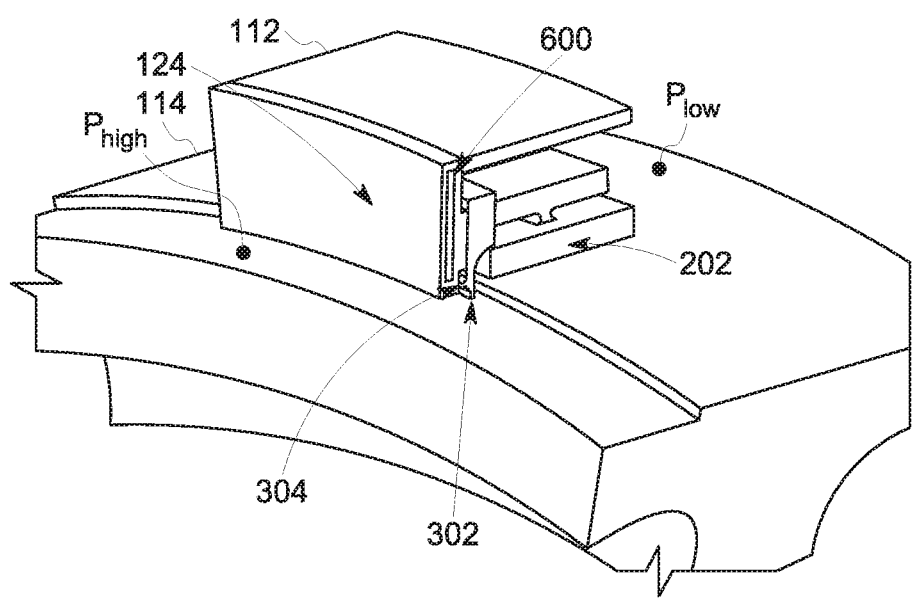
FIG. 10 illustrates another embodiment of the seal segment shown in FIG. 3 that includes a spline seal.

The seal assembly 100 is shielded on the upstream side with the front cover plate 124, 1524 that can be a continuous plate spanning 360 degrees (e.g., the front cover plate 124, 1524 is a continuous body that extends across the upstream side of all seal segments 112 in the seal assembly 100) or may be formed from several sub-segments. In one embodiment, each seal segment 112 is shielded by a separate front cover plate 124, 1524, overall leading to a segmented front cover plate. In this instance, the number of front cover plate or plate segments 124, 1524 is equal to the number of seal segments 112. In another embodiment, a segment of the front cover plate 124, 1524 simultaneously shields several seal segments 112. For example, a single front cover plate 124, 1524 may extend across all or a part of two or more different seal segments 112. In embodiments involving a segmented front cover plate 124, 1524, the gap between neighboring front cover plate segments 124, 1524 can be sealed with intersegment seals such as spline seals. FIG. 10 illustrates another embodiment of the seal segment 112 that includes such a spline seal slot 600. A spline seal (not depicted) typically formed with sheet metal is installed in the spline seal slot 600 of neighboring front plate segments to block/reduce leakage between front plate segments.

The labyrinth teeth 302, 304 form a first (or primary) seal between the rotor 104 and the seal assembly 100. While the individual labyrinth teeth 302, 304 each form respective primary and secondary seals, together these primary and secondary labyrinth seals form a primary seal of the entire seal segment 112 and/or of the entire seal assembly 100. The seal formed by the primary and secondary labyrinth teeth 302, 304 can be referred to herein as a primary segment seal or primary assembly seal.

The distance between the secondary labyrinth tooth 304 and a back or internal side 512 (shown in FIG. 9, also referred to as a vertical face) of the front cover plate 124 is set by a self-adjusting gap behavior created by the aerostatic ports for the secondary seal 308. Note that surface 512 represents one or multiple radially-extending surfaces that face the shoe or shoe plate 202 and the secondary labyrinth tooth 304. The secondary seal leakage past the secondary labyrinth seal formed by the labyrinth tooth 304 passes through cross-over ports or holes 510 (shown in FIG. 9) that radially extend in the front cover plate 124. In the illustrated embodiment, the cross-over ports 510 for the secondary seal leakage are present in the front cover plate 124. Alternatively, cross-over ports 510 in the shoe plate 202 are also possible. The cross-over ports 510 allow removal of the leaked fluid past the seal formed between the secondary labyrinth tooth 304 and the front cover plate 124 through the cross-over ports 510, thereby resulting in low pressure fluid in an internal cavity that is radially outward of the secondary seal tooth 304. This cavity is located at the "$P_{low}$" in FIG. 9 that is above the tooth 304 along the radial direction 110.

During pressurized operation, the front, radial, or vertical face 508 of the shoe plate 202 is separated from an opposing radial or vertical face 512 of the front cover plate 124 by a thin fluid film referred to as a secondary-seal fluid film 308. The secondary-seal fluid film 308 is formed by the fluid supplied from aerostatic ports 1000 (shown in FIG. 14 and described below). The internal passages in the shoe plate 202 are used for supplying the aerostatic ports 122 with pressurized fluid from the high-pressure or upstream side of the seal assembly 100. The secondary seal fluid film 308 self-adjusts by increasing or decreasing in thickness due to changes in fluid pressure to prevent components of the seal segment 112 from contacting and wearing on each other, while maintaining a seal that prevents a significant portion of the fluid from passing between the shoe plate 202 and the front cover plate 124.

Figure 8:
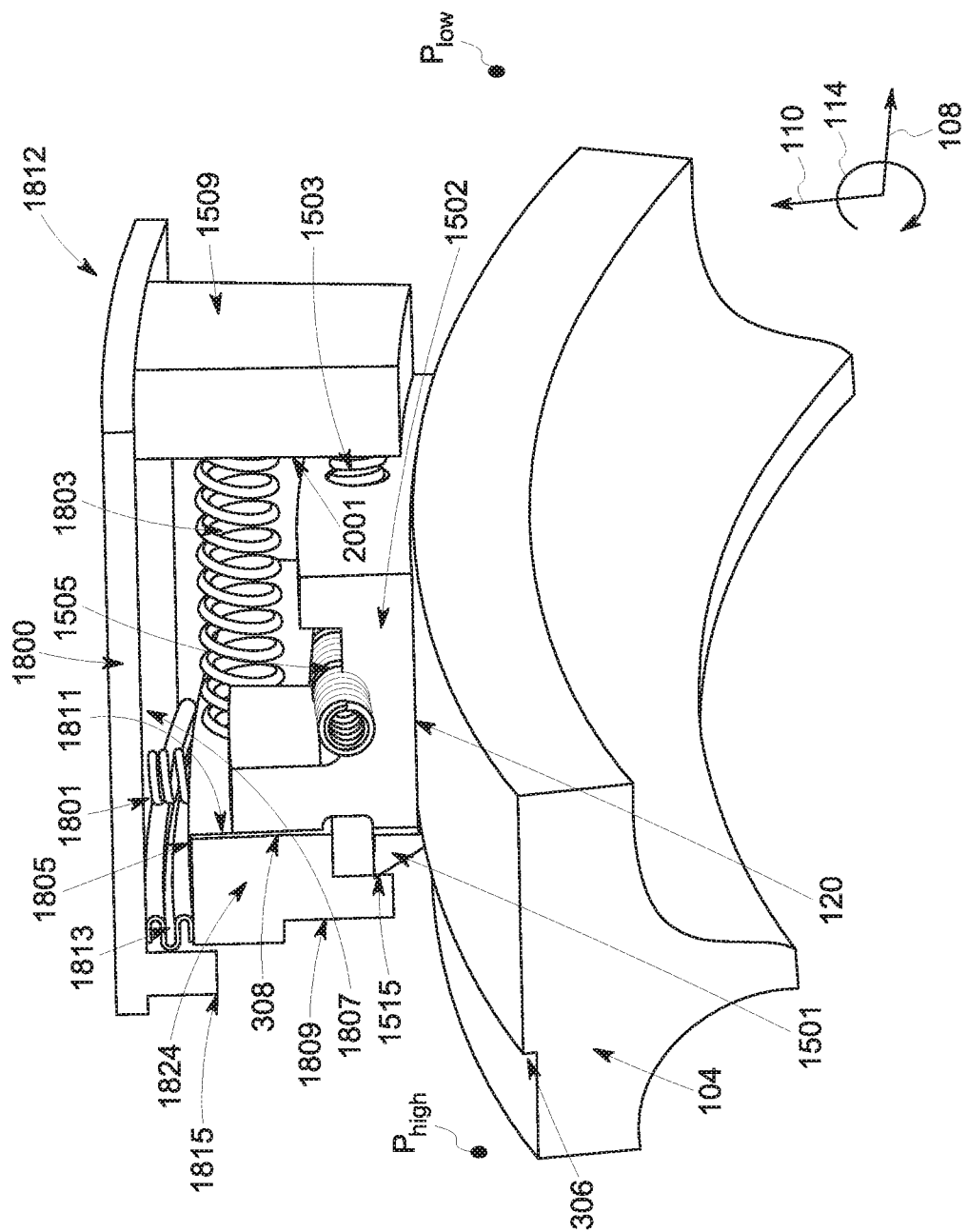
FIG. 8 illustrates a perspective view of another embodiment of a seal segment.

FIG. 8 illustrates a perspective view of another embodiment of a seal segment 1812. The seal segment 1812 can be used in the seal assembly 100 in place of one or more, or all, seal segments 112 and/or 1512. The seal segment 1812 includes many of the same components of the seal segment 112 and/or 1512, as shown in FIG. 8.

The seal segment 1812 can be shielded on the upstream side of the seal assembly 100 with a flexibly-mounted front cover plate 1824. The flexibly-mounted front cover plate 1824 can be a continuous plate spanning 360 degrees (e.g., the front cover plate 1824 is a continuous body that extends across the upstream side of all seal segments 1812 in the seal assembly 100) or may be formed from several sub-segments. The front cover plate 1824 is flexibly supported in the radial direction 110 with one or more radial springs 1801, and flexibly supported in the axial direction 108 with one or more axial springs 1803. The radial springs 1801 are compressed between a top side 1805 of the front cover plate 1824 and an opposing bottom side 1807 of a stator interface or interface element 1800 of the seal segment 1812. The radial spring(s) 1801 apply a force onto the top side 1805 of the front cover plate 1824 in a direction that is opposite the radial direction 110 to assist in establishing and/or maintaining the secondary seal between the labyrinth tooth 1515 of the shoe plate 1502 and the front cover plate 1824. The axial spring(s) 1803 are compressed between an interior side or surface 2001 (also referred to as a front support plate) of the stator interface wall 1509 and an opposing interior side or surface 1811 of the front cover plate 1824. A downwardly extending axial stop protrusion 1815 of the stator interface 1800 extends in a direction that is opposite of the radial direction 110. This protrusion 1815 also can be referred to as an axial stop. The stop 1815 limits or stops movement of the front cover plate 1824 by the axial spring(s) 1803 in a direction that is opposite of the axial direction 108. In such embodiments, the flexibly mounted front cover plate 1824 has more degrees of freedom (compared to the rigid-mounted front cover plate described above) to form a robust film-riding secondary seal. The flexible-mounted front cover plate 1824 optionally can include a stationary W-shaped seal body 1813 between the movable front cover plate 1824 and the stationary stator interface 1800.

Figure 11:
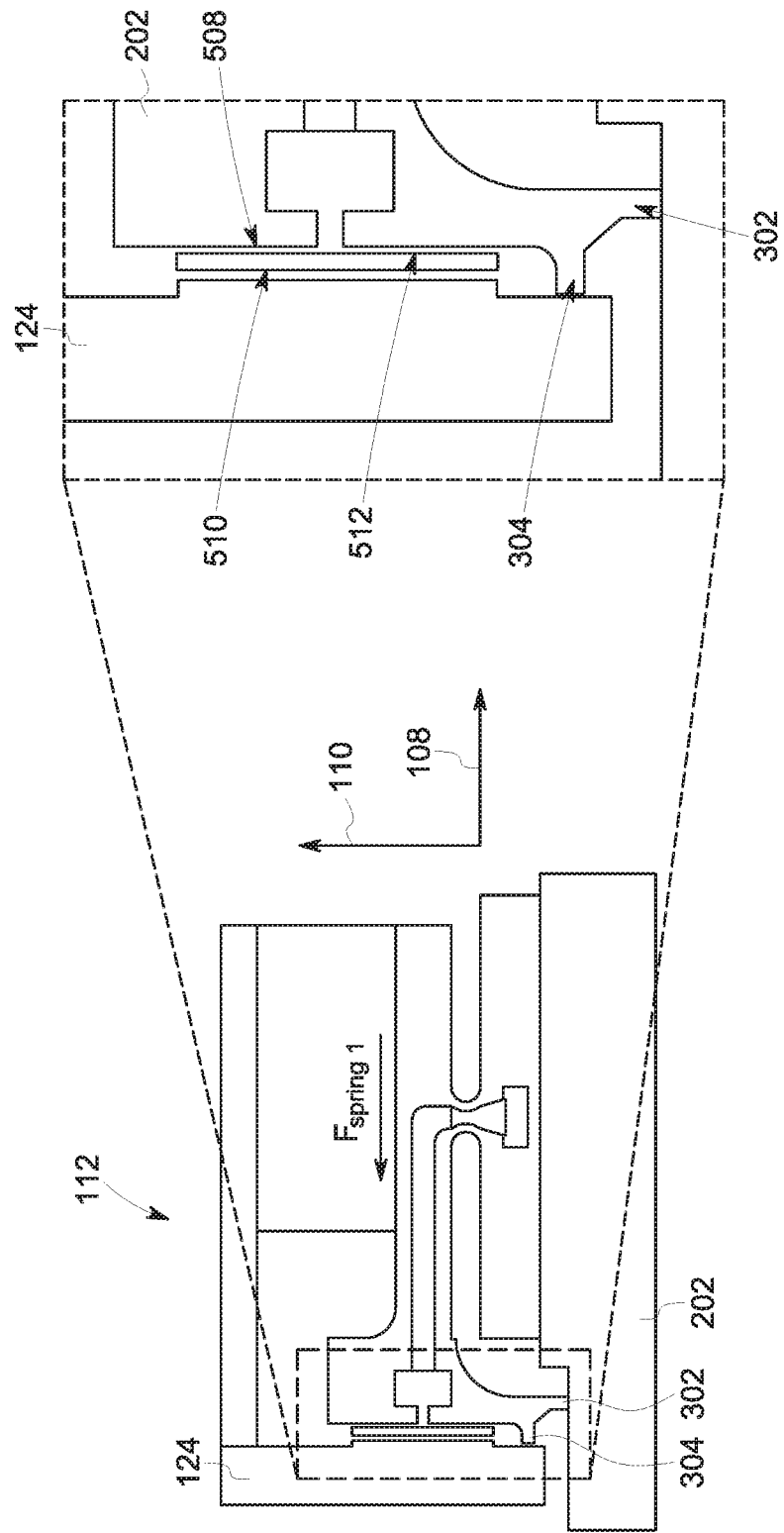
FIG. 11 illustrates a cross-sectional view and magnified view of the seal segment shown in FIG. 3 to demonstrate operation of a self-adjusting secondary-seal shown in FIG. 3 according to one example.
Figure 12:
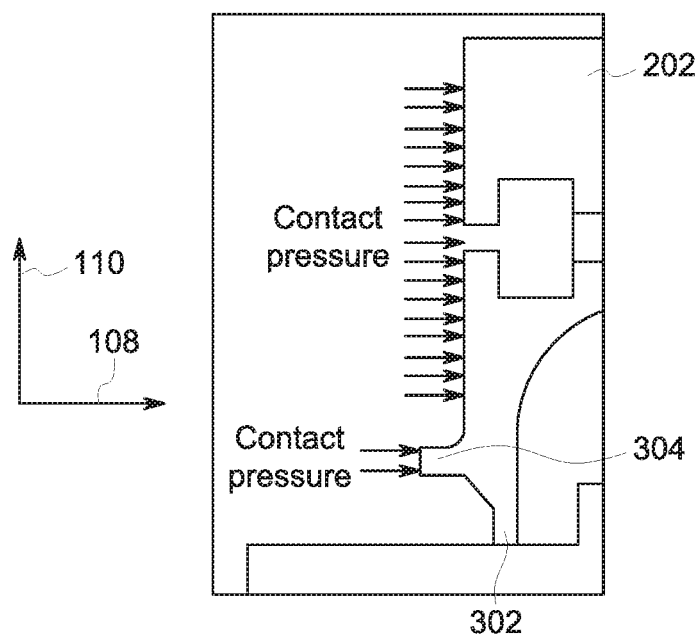
FIG. 12 illustrates a cross-sectional view of a shoe plate of the seal segment shown in FIG. 3 to demonstrate operation of a self-adjusting secondary-seal shown in FIG. 3 according to one example.

FIGS. 11 through 14 illustrate cross-sectional views and corresponding magnified views of the seal segment 112 shown in FIG. 1 to demonstrate operation of the self-adjusting secondary-seal 308 shown in FIG. 3 according to one example. FIGS. 11 and 12 show the seal segment 112 and shoe plate 202 prior to the presence of the high-pressure fluid (e.g., before pressurization of the rotary machine 102). Before pressurization, each seal segment 112 is assembled such that the front plate 124 of each seal segment 112 physically contacts or abuts the shoe plate 202 and the secondary labyrinth seal tooth 304 in the same seal segment 112. This is shown in FIG. 11 where the front or vertical face/surface 508 of the shoe plate 202 abuts the back face or surface 512 of the front cover plate 124. FIG. 12 shows the contact pressure applied onto the front surfaces of the shoe plate 202 by the front cover plate 124. The arrows in FIG. 12 show the direction in which the contact pressure is applied onto the shoe plate 202 by the front cover plate 124. This contact pressure arises because, in the non-pressurized state, the front plate 124 pushes against the shoe plate 202 and the secondary labyrinth tooth 304 in the axially aft direction (toward the right in FIGS. 11 and 12). This contact pressure also results in a spring reaction force $F_{spring1}$, as shown in FIG. 11. For example, in a non-pressurized state, the front cover plate can push the shoe plate and the flexible element in the axial direction, and preload or pre-compress the flexural element 204 to create a contact force between the front plate and the shoe plate.

Figure 13:
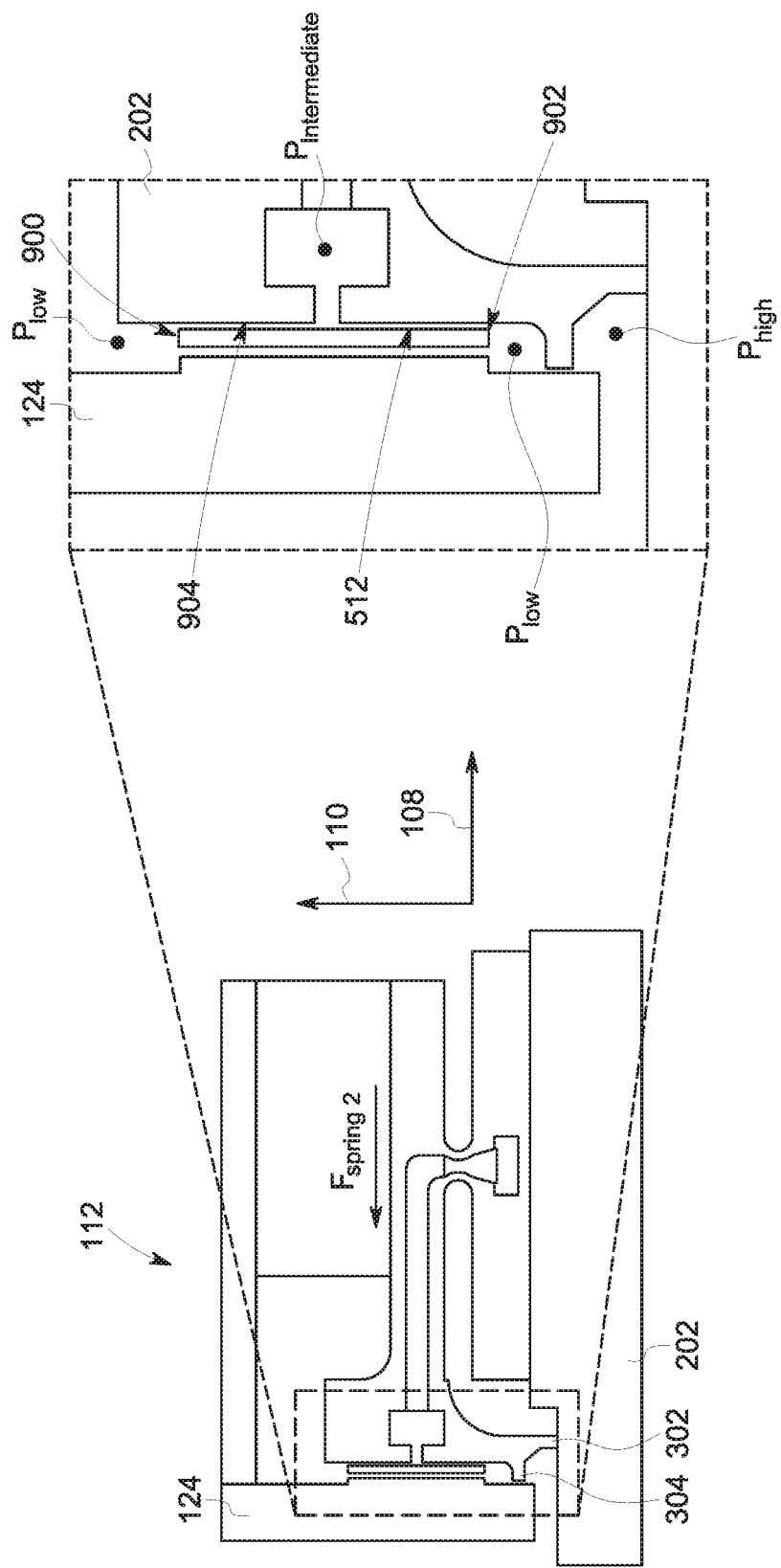
FIG. 13 illustrates another cross-sectional view and magnified view of the seal segment shown in FIG. 3 to demonstrate operation of a self-adjusting secondary-seal shown in FIG. 3 according to one example.
Figure 14:
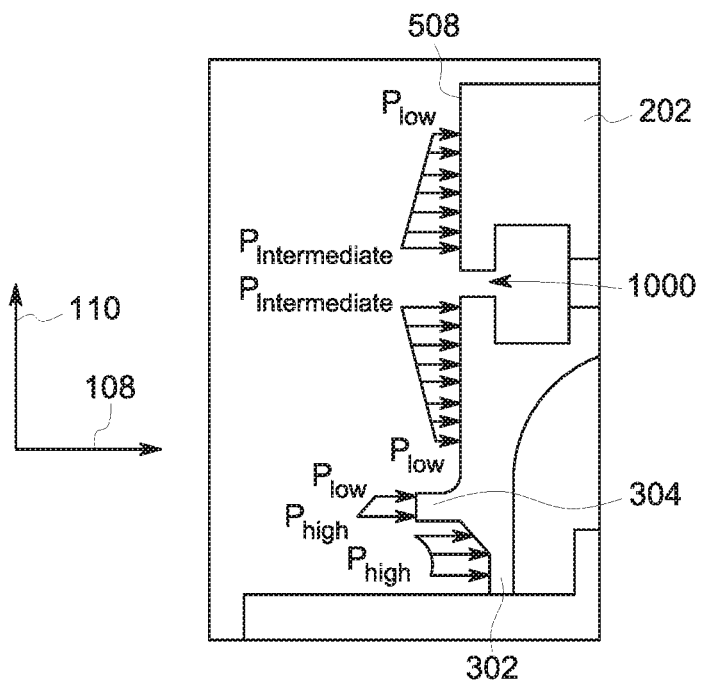
FIG. 14 illustrates another cross-sectional view of a shoe plate of the seal segment shown in FIG. 3 to demonstrate operation of a self-adjusting secondary-seal shown in FIG. 3 according to one example.

FIGS. 13 and 14 show the seal segment 112 in the presence of the high-pressure fluid (e.g., after pressurization of the rotary machine 102). Upon pressurization, the pressurized fluid passes through the internal passages and flows in the axially forward direction (from right to left in FIGS. 13 and 14, or in a direction that is opposite of the axial direction 108) from the shoe plate 202 to impinge on the vertical aft face 512 of the front cover plate 124. The pressurized jets impinging on the front plate aft vertical face 512 result in a pressure distribution as shown in FIG. 14, with the directions of the arrows in FIG. 14 representing the direction in which the fluid applies force onto the shoe plate 202 and the size (e.g., length) of the arrows indicating the magnitude of the corresponding force at that location (e.g., longer arrows indicate greater force while shorter arrows indicate lesser force).

The film pressures vary between a value of $P_{intermediate}$ near an aerostatic port 1000 of the internal passages of the shoe plate 202 to a value of $P_{low}$ on either upper and lower radial ends 900, 902 of the interface between the shoe plate 202 and the front cover plate 124. The pressure distribution shown in FIG. 14 is representative of the pressure value in a particular radial-axial plane and deviations from this profile are expected in locations that are farther from the aerostatic port 1000 in the circumferential direction 114 (shown in FIG. 1).

Figure 15:
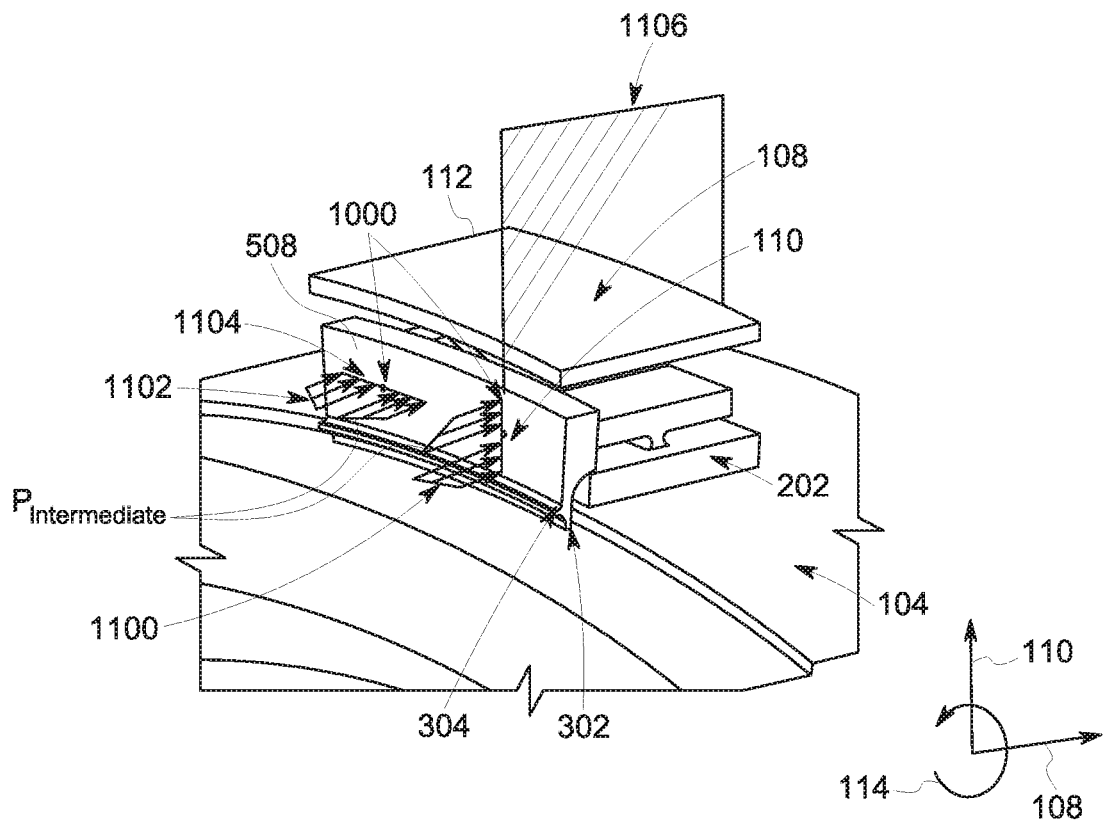
FIG. 15 illustrates a front perspective view of the seal segment shown in FIG. 3 with a front cover plate shown in FIG. 1 removed according to one example.
Figure 17:
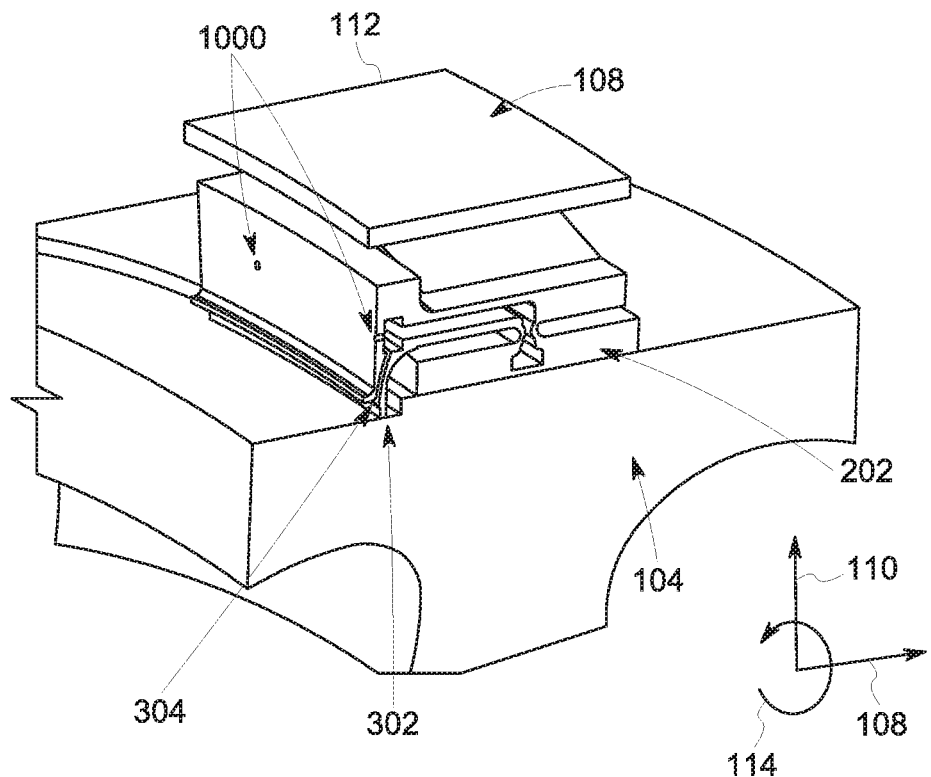
FIG. 17 illustrates a cross-sectional view of the seal segment shown in FIG. 15 along a cross-sectional plane shown in FIG. 15.

FIG. 15 illustrates a front perspective view of the seal segment 112 shown in FIG. 1 with the front cover plate 124 removed according to one example. FIG. 17 illustrates a cross-sectional view of the seal segment 112 shown in FIG. 15 along a cross-sectional plane 1106 shown in FIG. 15. A radial direction distribution 1100 of the fluid pressures exerted onto the front surface 508 of the shoe plate 202 along a radial direction 110 and a tangential direction distribution 1102 of the fluid pressures exerted onto the front surface 508 of the shoe plate 202 along a tangential direction 1104 are shown, with longer arrows indicating greater pressure than shorter arrows.

This pressure acts on the shoe plate 202 and pushes the shoe plate 202 along the axially aft direction (e.g., along or parallel to the axial direction 108). This also is shown in FIG. 14 where the pressures on the vertical face or front surface 508 of the shoe plate 202, the pressures on the secondary seal labyrinth tooth 304 and the high-pressure on the vertical face radially beneath the secondary seal labyrinth tooth 304 combine to push the shoe plate 202 toward the axially aft direction (left to right in FIG. 14). This pressure replaces the contact force or pressure shown in FIG. 12. This leads to a floating secondary seal arrangement without physical contact (or with very little physical contact) between the front cover plate 124 and the shoe plate 202. For example, a separation gap 904 (shown in FIG. 13) between the front cover plate 124 and the shoe plate 202 is created by the fluid pressure shown in FIG. 14. This creates a friction-less film-riding secondary seal of the seal segment 112. The sum of pressure forces pushing the shoe plate 202 toward the axially aft direction is balanced by a reaction force ($F_{spring2}$ in FIG. 13) from the flexible element 204.

Figure 18:
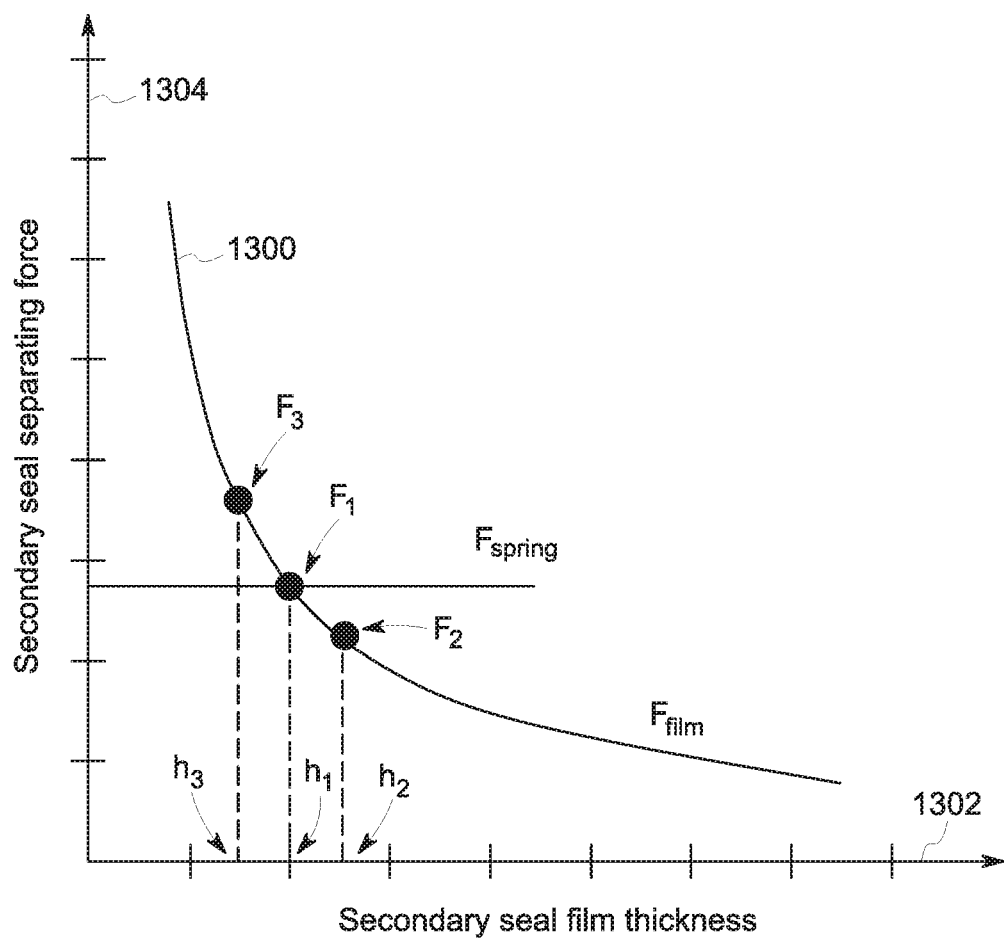
FIG. 18 illustrates a relationship between a thickness of a secondary seal fluid film formed in a gap between the front cover plate shown in FIG. 1 and the shoe plate shown in FIG. 2, and a force exerted on a face of the shoe plate shown in FIG. 9 according to one example.

The pressure distribution on the vertical face 508 of the shoe plate 202 creates a secondary seal separating force. The magnitude of this separating force depends on the thickness of the secondary seal film formed in the gap 904 between the front cover plate 124 and the shoe plate 202. FIG. 18 illustrates a relationship 1300 between the thickness of the secondary seal fluid film formed in the gap 904 between the front cover plate 124 and the shoe plate 202 and the force exerted on the face 508 of the shoe plate 202 according to one example. This relationship 1300 is shown alongside a horizontal axis 1302 representative of the thickness of the secondary seal fluid film formed in the gap 904 between the front cover plate 124 and the shoe plate 202. The relationship 1300 also is shown alongside a vertical axis 1304 representative of the force exerted on the face 508 of the shoe plate 202 by the fluid. The fluid pressure force increases when the secondary seal film thickness reduces, but the fluid pressure force decreases when the secondary seal film thickness increases. The fluid pressures (e.g., $P_{high}$, $P_{low}$, $P_{intermediate}$), the flow resistances in the shoe internal passages 500, 502, 504, 506, the diameter of the ports 1000, and/or the diameter of counterbores (shown and described in FIG. 19) can be modified or controlled to achieve the desired separating force versus film thickness relationship. Similarly, the thickness, length, and/or material strength of the flexible element 204 can be designed or controlled to achieve the desired stiffness of the flexible element 204 and $F_{spring}$ values.

For example, the $F_{spring}$ and the fluid pressure force that separates the shoe plate 202 and the front cover plate 124 may be equal and intersect when the secondary seal film thickness is $h_1$. Thus, for a film thickness of $h_1$, the resulting secondary seal separating force is $F_1$, which is equal to the $F_{spring}$ value. If a force imbalance or relative thermal motions lead to the reduction of the secondary seal film thickness, the secondary seal separating force will increase (e.g., to a value of $F_3$). This increased force will cause further separation of the shoe plate 202 from the front cover plate 124 and restore the secondary seal film thickness to $h_1$. If a force imbalance or relative thermal motions lead to an increase in the secondary seal film thickness, the secondary seal separating force will decrease (e.g., to a value of $F_2$). This decreased force will allow the flexible element 204 (shown in FIG. 4) to push the shoe plate 202 toward the front cover plate 124 and restore the secondary seal film thickness to $h_1$. The flexible element 204 pushes the shoe plate 202 in the axially forward direction (opposite to 108) because the flexible element is preloaded as described previously.

An alternative embodiment is the embodiment depicted in FIG. 5. In this case, the pre-load or contact force during the non-pressurized state is achieved because the axial spring 1503 pushes the shoe plate 1502 in the axially forward direction (opposite to the axial direction 108). The formation and operation of the secondary seal fluid film in this embodiment is similar or identical to the embodiment described in FIGS. 11 through 15, FIG. 17, and FIG. 18.

With respect to the embodiment shown in FIG. 8, the seal segment 1812 has the flexibly-mounted front cover plate 1824 that, in the non-pressurized state, may or may not be in physical contact with the shoe plate 1502. For example, the axial spring 1803 of the front cover plate 1824 may push the front cover plate 1824 in an axially forward direction (that is opposite to the axial direction 108 shown in FIG. 8).

This pushes the front cover plate 1824 against the axial stop 1815 to a position where the front cover plate 1824 loses physical contact with the shoe plate 1502 when the seal segment 1812 is in the non-pressurized state. The axial position of the shoe plate 1502 can be determined by the axial spring 1503 of the shoe plate 1502. Upon pressurization, the flexibly-mounted front cover plate 1824 overcomes the spring resistance of the axial spring 1803 (due to the introduction of fluid pressure at a front side or surface 1811 of the front cover plate 1824 and the shoe plate 1502. This pressure moves the front cover plate 1824 slightly in the axial direction 108. Additionally (and, optionally, simultaneously), upon pressurization, the shoe plate 1502 also moves in the axial direction 108 due to pressurization applied by the fluid pressure in the secondary seal 308. Depending on the relative stiffness of the axial springs 1503, 1803 and/or the magnitude of the pressure forces applied by the fluid pressure, the front cover plate 1824 may move to reduce the separation distance or gap between the front cover plate 1824 and the shoe plate 1502. As described above, a secondary seal fluid film is formed between the flexibly-mounted front cover plate 1824 and the shoe plate 1502. This secondary seal fluid film ensures that the flexibly-mounted cover plate 1824 and the shoe plate 1502 do not contact one another and form a frictionless secondary seal 308. Alternatively, in the non-pressurized state, the flexibly-mounted cover plate 1824 and the shoe plate 1502 may start with contact and a pre-loaded axial spring 1503, and later develop a secondary seal fluid film upon pressurization.

The arrangement of the aerostatic ports 1000 (with or without the counterbores shown and described in FIG. 19 described below) creates a self-adjusting secondary seal film thickness. This results in the shoe maintaining a self-adjusting small separation between the shoe plate 202 and the front cover plate 124, thereby resulting in small secondary seal leakage. Furthermore, because the shoe plate 202 is not in physical contact with the front cover plate 124, friction forces between the shoe plate 202 and front cover plate 124 that may result in radial force balance uncertainties are eliminated or reduced.

Figure 19:
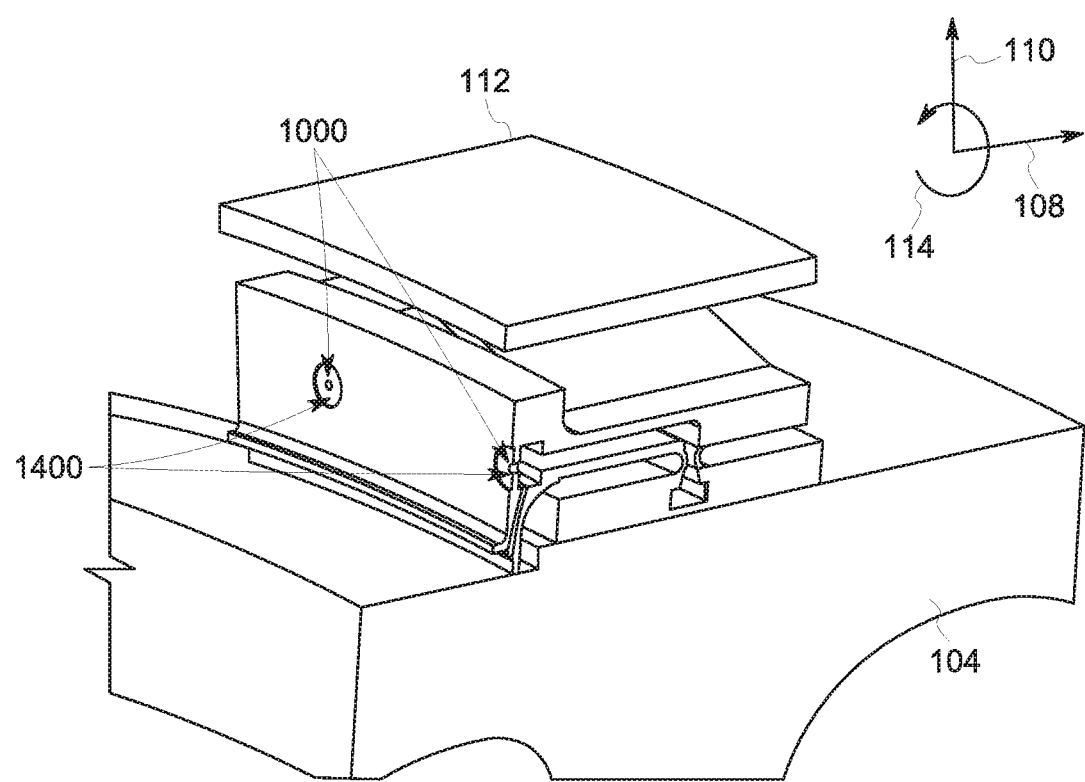
FIG. 19 illustrates a cross-sectional view of the seal segment shown in FIG. 1 with counterbores around aerostatic ports shown in FIG. 14 according to one embodiment.

FIG. 19 illustrates a cross-sectional view of the seal segment 112 shown in FIG. 1 with counterbores 1400 around the aerostatic ports 1000 according to one embodiment. The counterbores 1400 can be shallow depressions around the ports 1000 (e.g., depressions that do not extend all the way through the segment 112, do not extend more than half way through the segment 112, etc.). These counterbores 1400 can improve the stiffness of the secondary seal fluid film (e.g., the slope of the relationship 1300 shown in FIG. 18). The aerostatic ports 1000 on the load-bearing surface 120 of the shoe plate 202 optionally may include similar or identical counterbores to improve the stiffness of the film established between the rotor 104 and the shoe plate 202.

Figure 16:
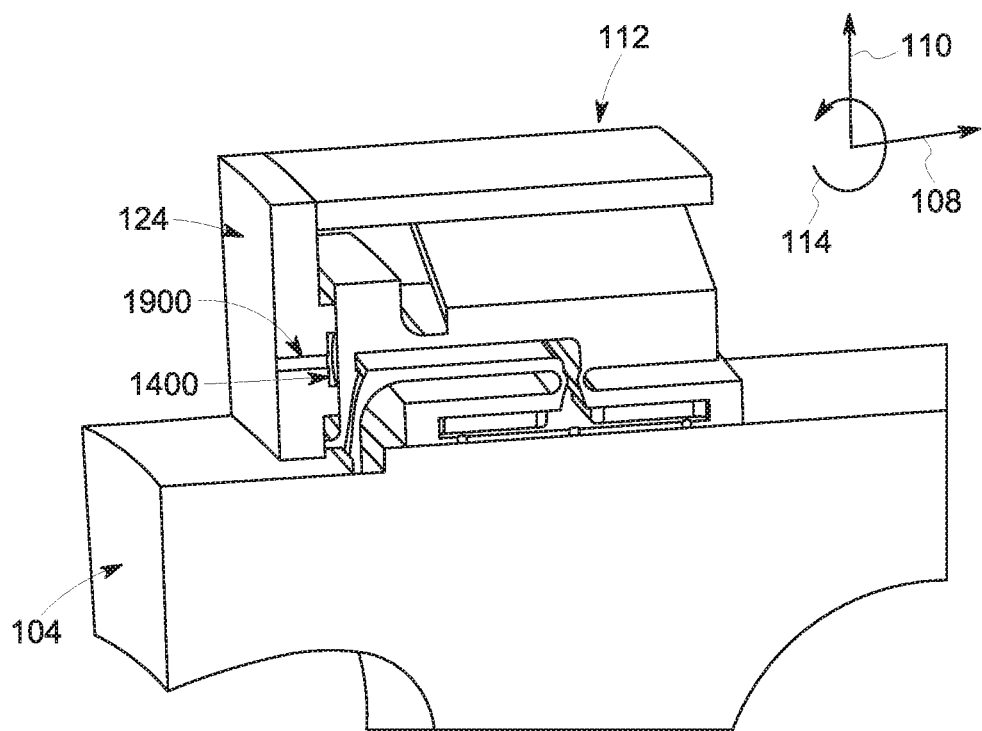
FIG. 16 illustrates a cross-sectional view of another embodiment of the seal segment shown in FIG. 1.

FIG. 16 illustrates a cross-sectional view of another embodiment of the seal segment 112 shown in FIG. 1. As shown in FIG. 16, the front cover plate 124 can include hydrostatic feed ports 1900 that direct fluid pressure into the seal segment 112 for the secondary seal fluid film seal 308. The counterbores 1400 may also be present in the front cover plate 124. These hydrostatic ports 1900 and/or counterbores 1400 may be exclusively present on the front cover plate or in combination with the hydrostatic ports/internal passages shown in the previous embodiments.

A method for manufacturing the seal segments 112 described herein can include forming one or more seal segments 112 of the seal assembly 100 for the rotary machine 102 using additive manufacturing. The seal segments 112 are shaped to be positioned circumferentially intermediate to the stationary housing or stator interface 106 and the rotor 104 of the rotary machine 102. Forming the seal segments 112 can include forming the stator interface element 200, the radially oriented front cover plate 124, and the shoe plate 202 that is movably supported by the stator interface element using additive manufacturing. This process might include additively forming the front cover plate, the shoe plate, the stator interface element, and/or the flexible element as one single assembly. Alternatively, each of these items may be formed additively and separately, and assembly together with joining processes such as bolting, welding, brazing etc. This additive manufacturing may be followed by precision machining operations to achieve desired surface finish and tight tolerances on critical dimensions. The fabrication process may be followed by coating process to apply low wear, low friction coatings on the load-bearing surface of the shoe plate or the secondary seal face of the shoe.

In one embodiment, a seal assembly for a rotary machine includes plural seal segments disposed circumferentially intermediate to a stationary housing and a rotor. One or more of the seal segments includes a stator interface element, a radially oriented front cover plate, and a movably supported shoe plate. The shoe plate includes one or more labyrinth teeth forming a primary seal with the rotor, a load bearing surface radially offset from the one or more labyrinth teeth, a radial surface forming a frictionless secondary seal with the front cover plate, and one or more internal passageways configured to direct fluid through the shoe plate or through the front cover plate, and between the radial surface of the shoe plate and the front cover plate to form the frictionless secondary seal.

Optionally, the frictionless secondary seal formed by the radial surface and the one or more internal passageways of the shoe plate or the front cover plate is self-correcting based on a magnitude of axial force applied to the front cover plate and an axial force from the shoe plate.

Optionally, the frictionless secondary seal is self-correcting in that, as an axial dimension of a gap between the radial surface of the shoe plate and the cover plate increases, a support force applied to the shoe plate along an axial direction and a fluid pressure applied by the secondary seal film (between the front cover plate and the shoe plate) change in magnitude to restore the axial dimension by decreasing the gap to a previous equilibrium position and, as the axial dimension of the gap between the radial surface of the shoe plate and the cover plate decreases, the support force applied to the shoe plate along the axial direction and the fluid pressure applied by the secondary seal film (between the front cover plate and the shoe plate) change in magnitude to restore the axial dimension by increasing the gap to the previous equilibrium position.

Optionally, the one or more seal segments also includes one or more flexible elements (non-restrictive examples are bellows, springs, and/or flexures) disposed between the shoe plate and the stator interface element. The one or more flexible elements can be configured for aiding a radial movement of the shoe plate relative to the stator interface element and configured for providing axial spring support for the shoe plate.

Optionally, the one or more seal segments are spring-loaded in the radially inwards direction using a Garter spring.

Optionally, the one or more labyrinth teeth include an axial tooth axially projecting toward the front cover plate and a radial tooth radially projecting toward the rotor.

Optionally, the axial tooth is positioned such that at least some of the fluid passes between the axial tooth and the front cover plate, and further flows through at least one cross-over port present in the front cover plate or at least one cross-over port present in the shoe.

Optionally, the shoe plate is positioned to be subjected to hydrodynamic or aerodynamic forces due to one or more of a presence of curvature mismatch, spiral grooves on the rotor, spiral grooves on the shoe plate, or Rayleigh steps on the shoe plate.

Optionally, the shoe plate is positioned to be subjected to a hydrostatic or aerostatic force due to a presence of high-pressure fluid jets emanating from internal cavities in the shoe plate and impinging on the rotor.

Optionally, the seal assembly is stationary and rides on the rotor during spinning of the rotor due to one or more hydrodynamic self-correcting forces or hydrostatic self-correcting forces.

Optionally, the shoe plates of the seal segments are separated from each other by a segment gap.

Optionally, the shoe plates of neighboring seal segments of the seal segments are interlocked with slanted faces to reduce segment leakage.

Optionally, the assembly also includes one or more flexural pivots that flex to allow for rolling and pitching motions of the shoe plate.

In one embodiment, a method includes forming one or more seal segments of a seal assembly for a rotary machine using additive manufacturing. The one or more seal segments are shaped to be positioned circumferentially intermediate to a stationary housing and a rotor of the rotary machine. Forming the one or more of the seal segments includes forming a stator interface element, a radially oriented front cover plate, and a shoe plate using additive manufacturing. The shoe plate is formed using additive manufacturing to include one or more labyrinth teeth forming a primary seal with the rotor, a load bearing surface radially offset from the one or more labyrinth teeth, a radial surface forming a frictionless secondary seal with the front cover plate, and one or more internal passageways configured to direct fluid from outside of the shoe plate, through the shoe plate, and between the radial surface of the shoe plate and the front cover plate to form the frictionless secondary seal.

Optionally, the one or more seal segments are formed using additive manufacturing such that the frictionless secondary seal formed by the radial surface and the one or more internal passageways of the shoe plate or the one or more internal passageways of the front plate is self-correcting based on a magnitude of axial force applied to the front cover plate and an axial force from the shoe plate.

Optionally, the one or more seal segments are formed using additive manufacturing such that the frictionless secondary seal is self-correcting in that, as an axial dimension of a gap between the radial surface of the shoe plate and the cover plate increases, a support force applied to the shoe plate along an axial direction and a fluid pressure applied by the secondary seal film (between the front cover plate and the shoe plate) change in magnitude to restore the axial dimension by decreasing the gap to a previous equilibrium position and, as the axial dimension of the gap between the radial surface of the shoe plate and the cover plate decreases, the support force applied to the shoe plate along the axial direction and the fluid pressure applied by the secondary seal film (between the front cover plate and the shoe plate) change in magnitude to restore the axial dimension by increasing the gap to the previous equilibrium position.

Optionally, the one or more seal segments are formed using additive manufacturing such that the one or more seal segments also includes one or more flexible elements disposed between the shoe plate and the stator interface element, and such that the one or more flexible elements are configured for aiding a radial movement of the shoe plate relative to the stator interface element and configured for providing axial spring support for the shoe plate.

In one embodiment, an assembly includes plural seal segments shaped to be disposed circumferentially between a stator and a rotor of a rotary machine. At least one of the seal segments includes a stator interface plate positioned to face the stator, a front cover plate in contact with the stator interface plate and positioned to radially extend between the stator and the rotor, and a shoe plate having a radial face that opposes the front cover plate and a bearing surface positioned to face the rotor. The shoe plate and/or the front plate has one or more internal passages shaped to direct fluid from outside of the at least one seal element to a gap in a seal between the radial face of the shoe plate and the front cover plate. The one or more internal passages are shaped to direct the fluid to the gap to reduce or eliminate friction between the radial face of the shoe plate and the front cover plate.

Optionally, the shoe plate also includes an axially oriented tooth that forms the seal between the radial face of the shoe plate and the front cover plate by projecting toward the front cover plate.

Optionally, the seal formed by the radial surface and the one or more internal passageways of the shoe plate is self-correcting based on a magnitude of axial force applied to the front cover plate.

Optionally, the gap in the seal between the radial face of the shoe plate and the front cover plate changes size responsive to changes in pressure in the fluid.

Figure 20:
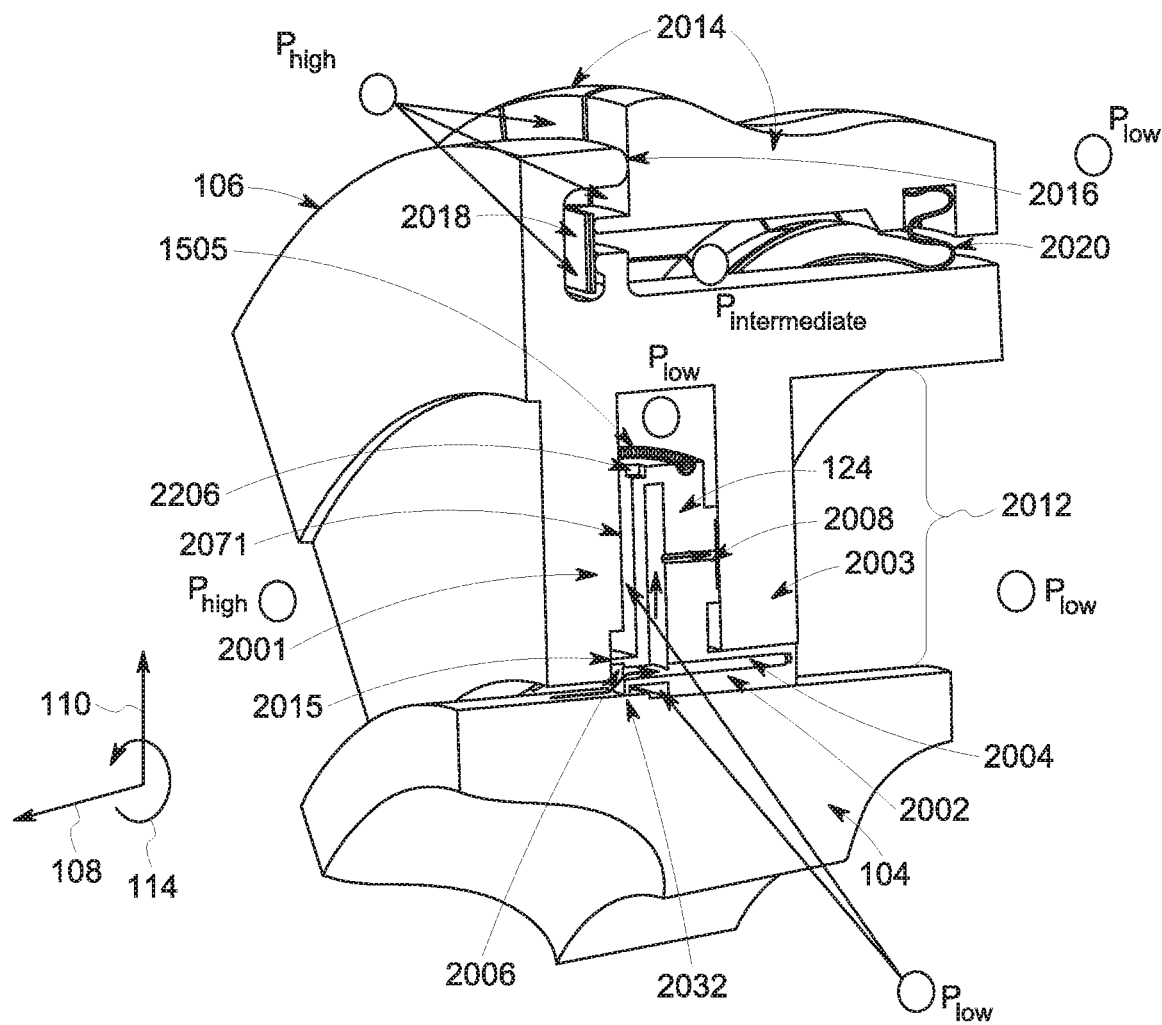
FIG. 20 illustrates a cross-sectional view of a seal segment according to another embodiment.
Figure 21:
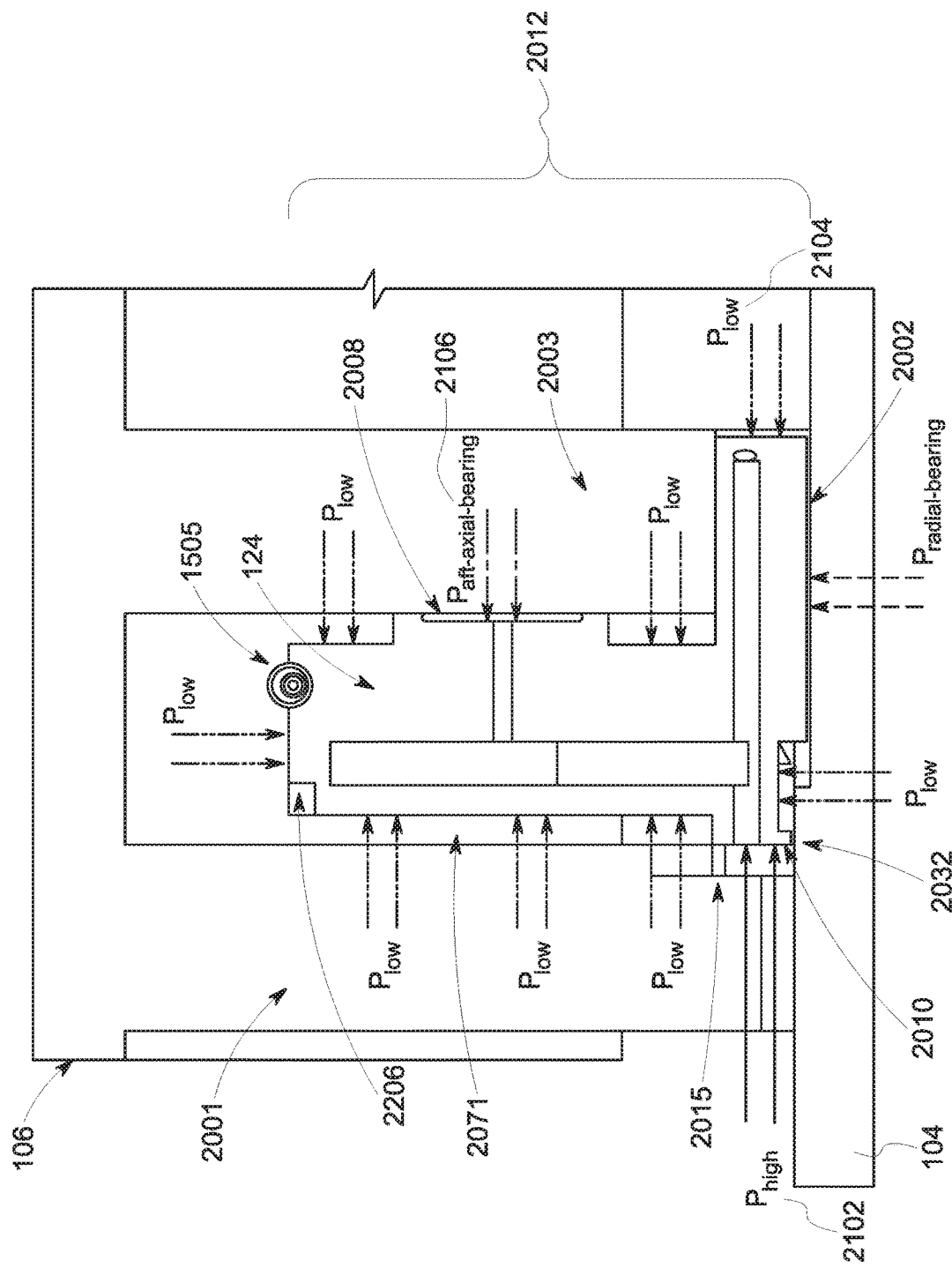
FIG. 21 illustrates a cross-sectional view of the seal segment shown in FIG. 20.
Figure 36:
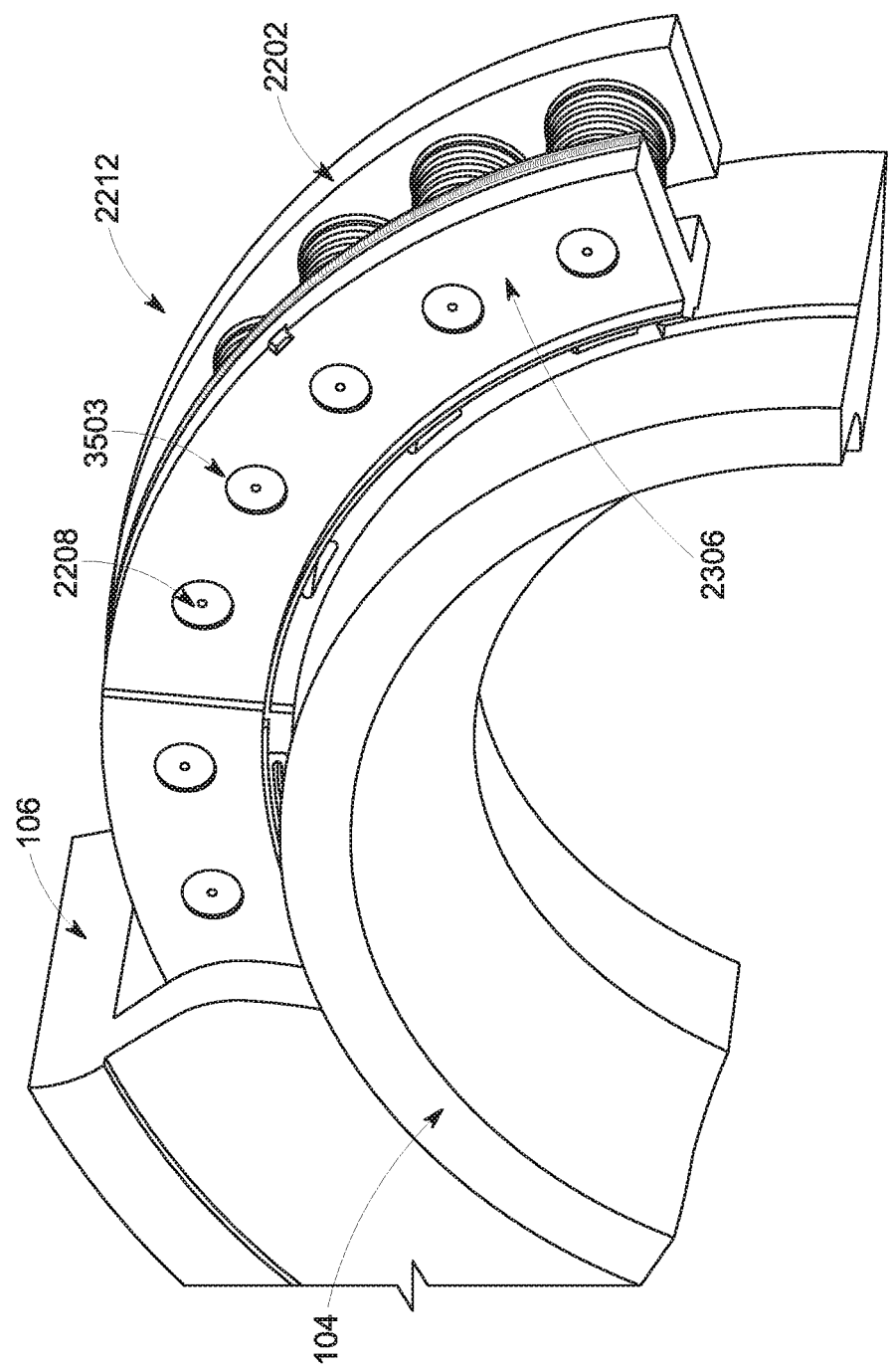
FIG. 36 illustrates another embodiment of a seal assembly.

FIGS. 20 and 21 illustrate a perspective view and a side view of one embodiment of a seal segment 2012 of one embodiment of a seal assembly. FIGS. 22 through 34 illustrate additional perspective views of another embodiment of a seal segment 2212 of a seal assembly 2200. FIG. 36 illustrates another embodiment of the seal assembly 2212 shown in FIGS. 22 through 34. The seal assemblies described herein include film-riding hybrid aerostatic-aerodynamic seals for sealing rotor-stator circumferential gaps in rotary machines 102. Examples of rotary machines 102 include gas turbines, steam turbines, aircraft engines, supercritical $CO_2$ turbines, centrifugal compressors, and other rotating machinery. The seal assemblies each include several seal segments 2012, 2212 that form a 360-degree assembly to reduce fluid leakage between a rotating component or rotor 104 of the rotary machine 102 and the stator housing 106 of the rotary machine 102. The housing 106 (also referred to as a stator interface or stator housing) can be a 360-degree ring or a segmented assembly formed by two or more pieces. The stator interface 106 can be rigidly attached to the stator of a turbomachinery cavity, such as by bolting, brazing, or welding the stationary component or stator interface 106 to the stator. Optionally, the stator interface 106 may float or not be rigidly attached to the stator, as described below.

Several seal segments 2012, 2212 can be arranged around the rotary component 104 of the machine 102 to form the seal assembly, as described above. Each segment 2012, 2212 of a seal assembly can include a film-riding shoe or shoe plate 2002 with one or more primary teeth 2032, springs 1505 for exerting radial force, and the stator interface 106. The film-riding shoe 2002 can represent one or more of the shoe plates 202, 1502 described above. The primary teeth 2032 can represent one or more of the primary teeth 302, 1513 described above. The stator interface 106 also is referred to herein as a stationary housing of one or more of the seal segments 2012, 2212. The stator interface 106 includes a front support plate 2001 and an aft support plate 2003 that axially oppose each other. That is, the support plates 2001, 2003 are spaced apart from each other by directions that are parallel to the axis of rotation of the rotary machine 102 (e.g., are separated from each other along the axial direction 108). The front support plate 2001 can represent the cover plate 124 and/or 1524 described herein and/or the aft support plate 2003 can represent the stator interface wall 1509 described above.

The film-riding shoe 2002 can form a secondary film seal with the front support plate 2024 between one or more elongated secondary teeth 2015. The secondary teeth 2015 can represent one or more of the secondary teeth described above. As shown, the secondary teeth 2015 can be axially elongated along or parallel to the axial direction 108 and can axially protrude from the seal segment 2012, 2212 along the axial direction 108. The secondary teeth 2015 extend toward the front support plate 2001 of the stator interface 106 and can form a secondary fluid film bearing between the secondary teeth 2015 and the front support plate 2001. Alternatively, the secondary teeth 2015 can be part of the front support plate 2001 (see FIG. 32) and extend parallel to the axial direction 108 toward the film riding shoe 2002. The primary teeth 2032 can be radially elongated along or parallel to (or in a direction that is opposite to) the radial direction 110. The primary teeth 2032 extend toward the outer radial surface of the rotating component 104 and can form a primary fluid film bearing between the primary teeth 2032 and the rotating machine or rotor 104. In the embodiment shown in FIGS. 22 through 34, the film-riding shoe 2002 optionally can have a radially extending forward floating plate 2306 that is attached to an aft floating plate 2202 with flexible, force-applying elements 2204, such as springs, internally-pressured bellows, or the like, to create a frictionless or nearly frictionless load bearing interface between the film-riding shoe 2002 and the stator interface 106. The rotating component 104 can rotate in the tangential or circumferential direction 114 (or in an opposite direction) around the axis of rotation of the rotary machine 102.

The seal segments 2012, 2212 forming the seal assembly reduce the flow of air (or another fluid, such as particulate-laden air, emissions, or other mixtures including air or other gases) through a circumferential gap between the rotating component 104 and the stator interface 106, thereby operating as a seal. This seal also operates like a movable spring-shoe under the influence of aerostatic and aerodynamic loads. The shoe 2002 of each seal segment 2012, 2212 maintains an air film between the shoe 2002 and the rotating component 104 while the rotary machine 102 is pressurized and the rotating component 104 is rotating relative to the stator interface 106. This air film can be referred to as a shoe fluid bearing. This bearing can ensure that there is no contact or rubbing between the shoe 2002 and the rotating component 104. The rotary machine 102 can be pressurized when there is a greater fluid or air pressure ($P_{high}$) on one axial side of the stator interface 106 and a reduced fluid or air pressure ($P_{low}$) on the opposite axial side of the stator interface 106 (and/or in one or more internal chambers of the stator interface 106).

Furthermore, after pressurization of the rotary machine 102, each film-riding shoe 2002 (or the attached aft floating plate 2202, as described below) can maintain the shoe film bearing between the shoe 2002 (or the attached aft floating plate 2202) and the aft support plate 2009 of the stator interface 106. This can ensure that little to no (e.g., negligible) friction forces are exerted on the film-riding shoe 2002 (or the attached aft floating plate 2202) as it moves in the radial direction 110 (or an opposite radial direction). When rotor 104 moves in the radial direction 110 (due to centrifugal growth or thermal effects during rotation of the rotor 104), the film-riding shoe 2002 (or the attached aft floating plate 2202) also moves radially to avoid a contact rub with the spinning rotor 104. Without a shoe film bearing between the shoe 2002 (or the attached aft floating plate 2202) and the aft support plate 2009, the radial motion of the film-riding shoe 2002 (or the attached aft floating plate 2202) would be typically impeded by the friction force caused by the physical contact between the film-riding shoe 2002 (or the attached aft floating plate 2202) and the stator interface 106.

Figure 22:
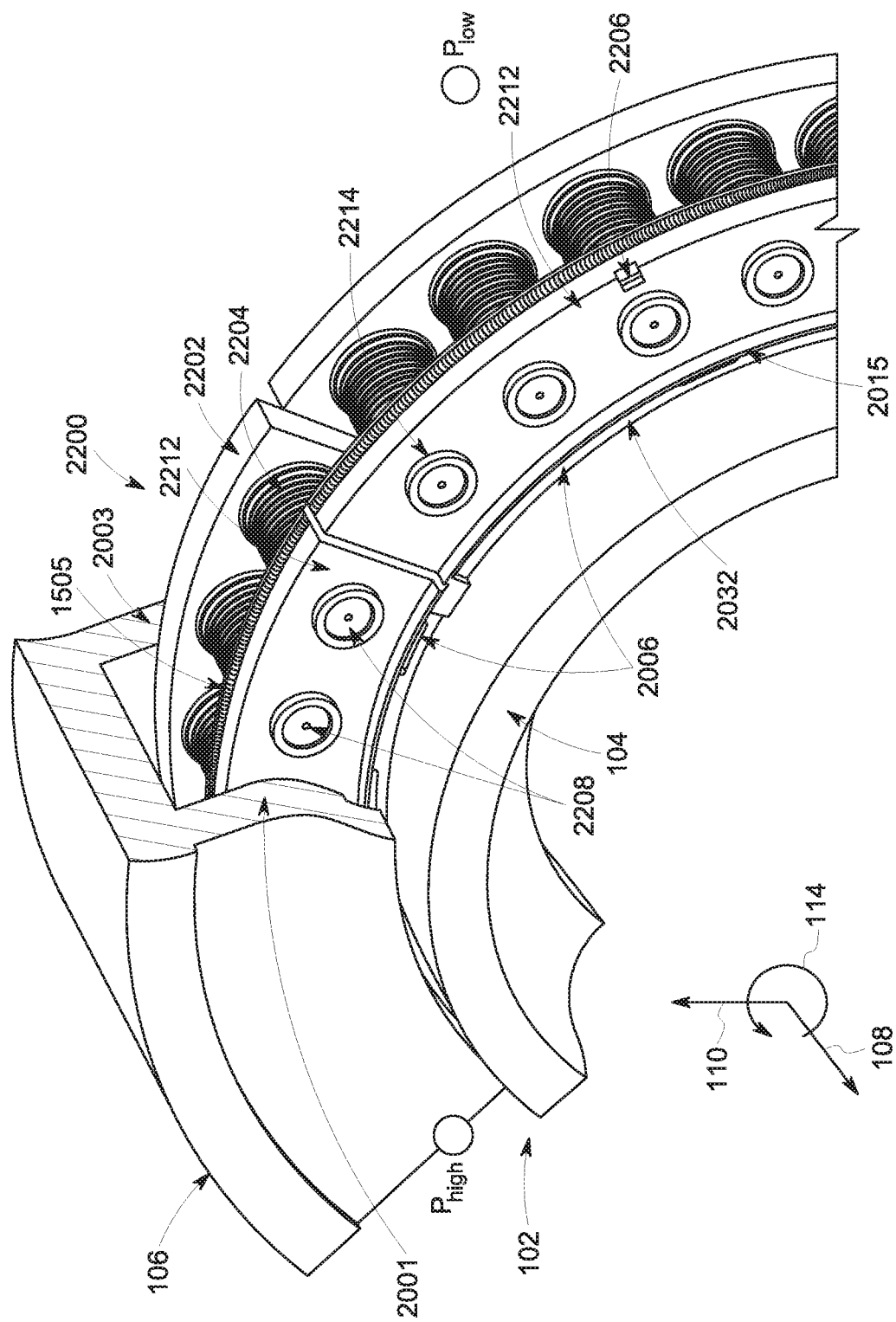
FIG. 22 illustrates a perspective view of a seal assembly having multiple seal segments with floating aft plates according to another embodiment.
Figure 23:
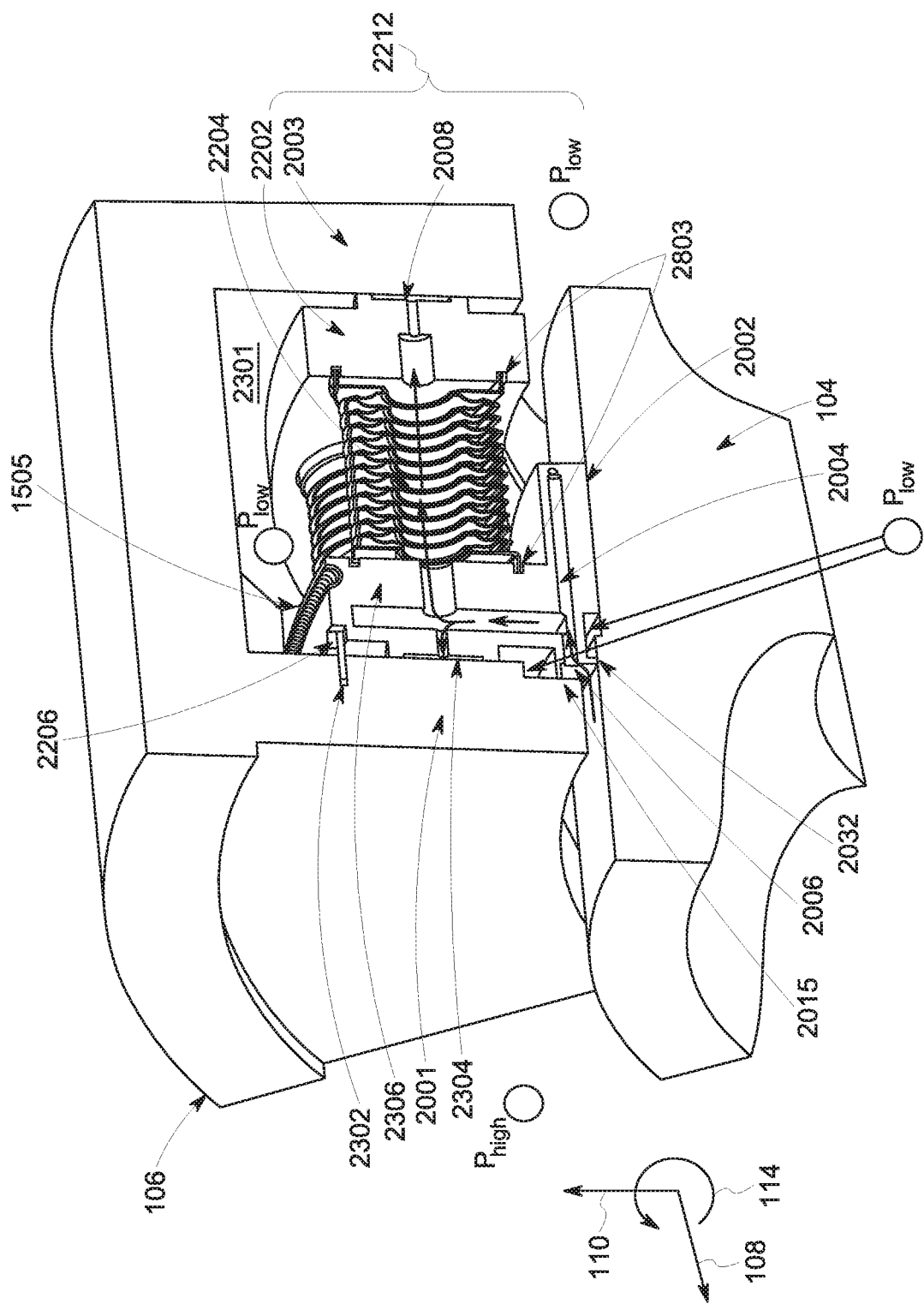
FIG. 23 illustrates a cross-sectional view of one of the seal segments shown in FIG. 22.
Figure 24:
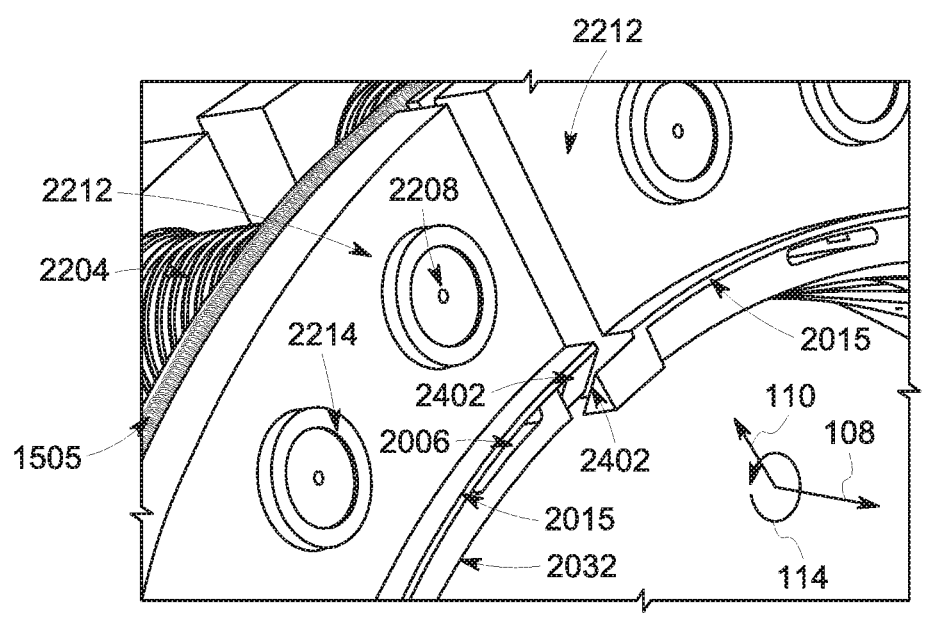
FIG. 24 illustrates one side of one of the seal segments shown in FIG. 22.
Figure 25:
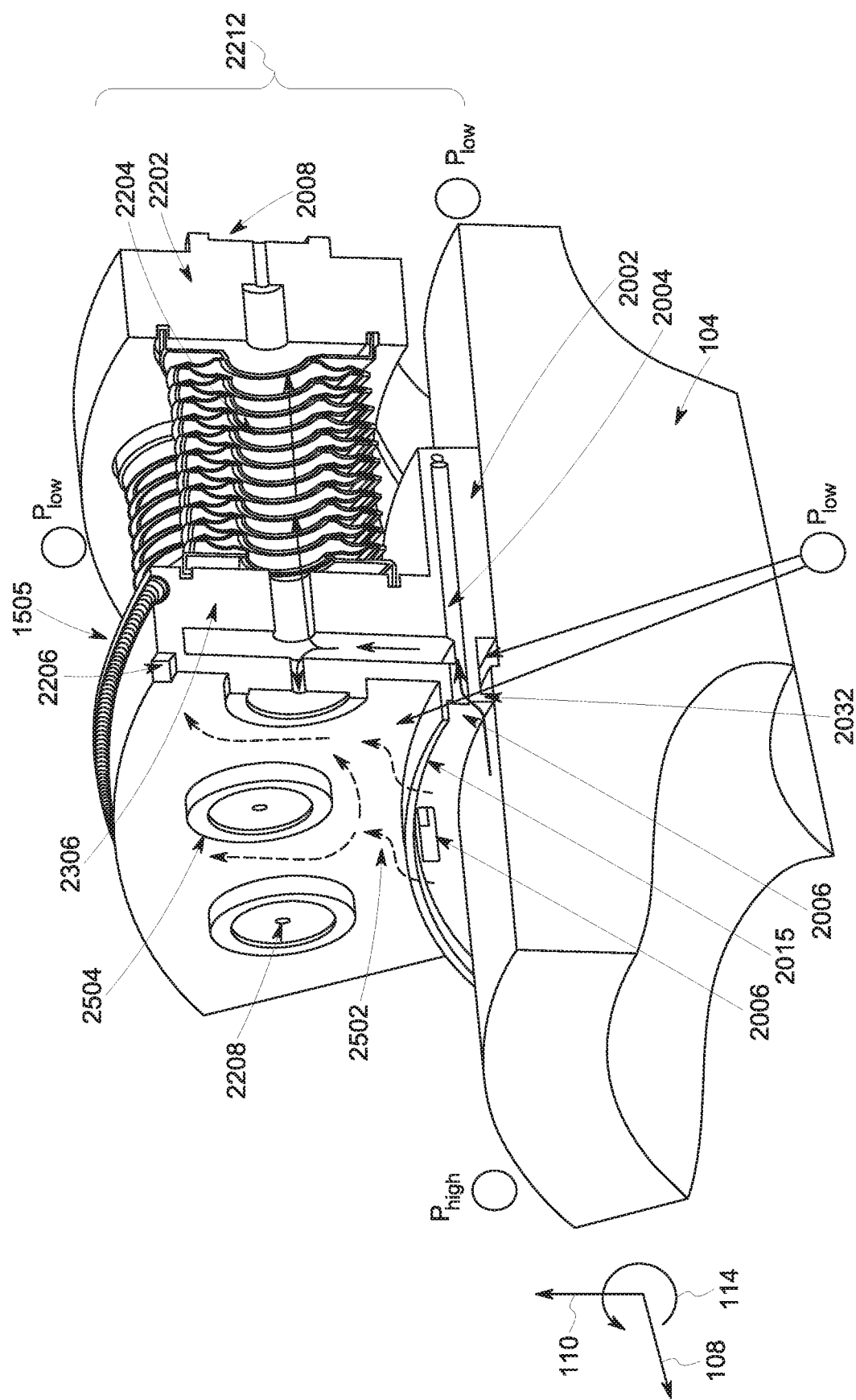
FIG. 25 illustrates another cross-sectional view of one of the seal segments shown in FIG. 22.

FIG. 22 illustrates a perspective view of one embodiment of a seal assembly 2200 formed by several seal segments 2212 shown in more detail in FIG. 23. FIG. 23 illustrates one of the seal segments 2212 according to one embodiment. FIG. 24 illustrates another view of the seal segments 2212 shown in FIGS. 22 and 23. The seal assembly 2200 is formed by assembling several of the seal segments 2212 in a circumferential or radial cavity that separates the stator interface 106 and the rotating component 104 of the rotary machine 102. The seal assembly 2200 is used to reduce the fluid leakage between the upstream cavity with high-pressure fluid ($P_{high}$) and the downstream cavity with low-pressure fluid ($P_{low}$). The neighboring seal segments 2212 are in contact (shown by slanted interfaces 2402 shown in FIG. 24) or are connected with an intersegment spline seal 3703 (shown in FIG. 37) to minimize or reduce fluid leakage from the high-pressure volume and the lower-pressure volume between the neighboring seal segments 2212. The motion of the seal segments 2212 during operation is predominantly radial.

The seal segments 2212 can be held by being radially pushed toward the rotating component 104 with one or more radial springs 1505. In the embodiments shown in FIGS. 22 through 34, the seal segments 2012, 2212 and seal assemblies are pushed radially inwards with a Garter spring. In the embodiment shown in FIG. 37, a radial leaf spring 3720 pushes the film-riding shoe toward the rotating component. Neighboring seal segments can be in contact (shown by slanted interfaces 2402 shown in FIG. 24) or are connected with an intersegment spline seal 3703 (shown in FIG. 37) to minimize or reduce fluid leakage between neighboring segments.

Each seal segment 2012, 2212 includes the film-riding shoe 2002 and one or more primary teeth 2032 facing the rotating component 104 (e.g., a rotor). These one or more labyrinth teeth 2032 facing the rotating component 104 form a primary film seal, by operating at a small clearance from the spinning rotor 104. This pressure of the fluid reduces from the high-pressure $P_{high}$ to the low-pressure $P_{low}$ across the primary seal labyrinth teeth 2032. One or more internal cavities or passages 2004 downstream of the primary seal labyrinth teeth 2032 are connected to the overall downstream cavity of the rotary machine 102 with angled ports 2702 (e.g., FIG. 27).

In one embodiment, the film-riding shoe 2002 has a radially oriented cover plate 124 with one or more antirotation notches 2206 formed or cut therein. These notches 2206 which engage pins 2302 axially protruding from an inner surface of the stator interface 106. For example, the pins 2302 may be received in the notches 2206 to prevent the seal segments from 2012, 2212 from rotating relative to the stator interface 106.

The position of the primary labyrinth seal near the spinning rotor 104 is maintained by the film-riding shoe 2002, which has a load-bearing surface 2904 facing the rotor 104. The film-riding shoe 2002 generates radial aerostatic-aerodynamic forces and positions the primary labyrinth seal teeth 2032, while the primary labyrinth seal teeth 2032 form seals between the seal assembly and the rotor 104. The one or more primary seal labyrinth teeth 2032 and the film-riding shoe 2002 ride on the rotating component 104 at different rotor radii as shown in FIG. 23 and FIGS. 25 through 29. This creates a radial step on the rotating component 104, which radially offsets the high-axial-momentum fluid jet emanating from the primary tooth 2032 from the load-bearing film. This enables the film between the load-bearing surface 2904 of the shoe 2002 (e.g., the surface of the shoe 2002 opposing or facing the rotating component 104) and the rotating component 104 to remain unaffected by fluid leakage emanating from between the primary seal labyrinth teeth 2032 and the rotating component 104.

The load-bearing surface 2904 of the shoe 2002 can include has several hydrostatic ports 2902 (shown in FIG. 29) that are fluidly coupled with the interior chambers or passages 2004 of the seal segments 2012, 2212. These ports 2902 direct fluid flowing inside the seal segments 2012, 2212 toward the rotating component 104 along directions that are opposite to the radial directions 110). The internal passages, chambers, or cavities 2004 are pressurized by fluid from the high-pressure or upstream side of the seal assembly and/or the high-pressure or upstream side of the turbomachine through supply cavities 2006 located along the front or forward face of the seal segments 2012, 2212 (FIG. 4). The ports 2902 on the load-bearing surface 2904 allow the film-riding shoe 2002 to operate with an aerostatic film between the shoe 2002 and the rotating component 104.

Figure 29:
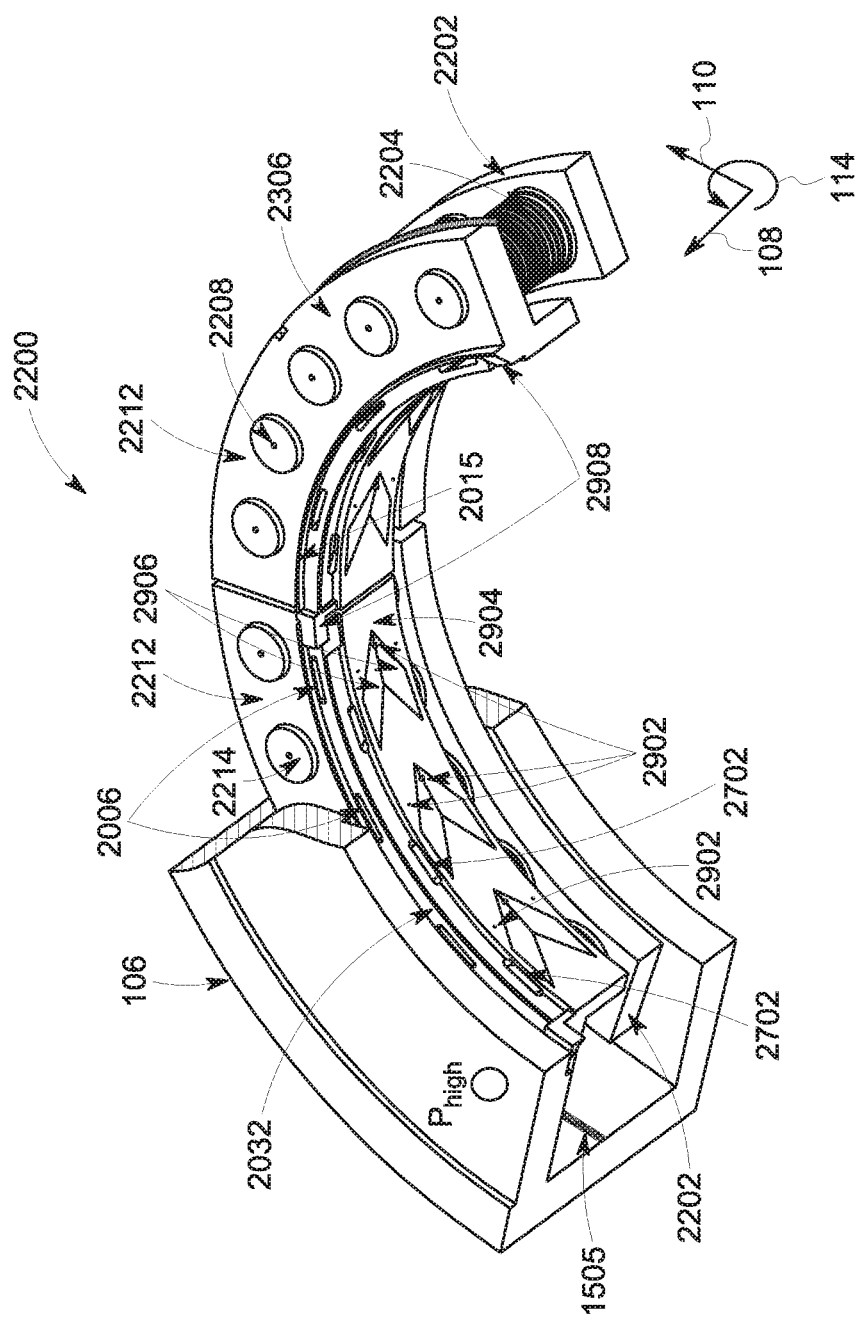
FIG. 29 illustrates another perspective view of the seal assembly shown in FIG. 22.

The load-bearing surface 2904 of the shoe 2002 optionally may have aerodynamic features 2906 such as spiral grooves (as shown in FIG. 29) and/or Rayleigh steps. These features 2906 are recesses that extend into the shoe 2002 along the radial directions 110 to generate aerodynamic force in the presence of rotation of the rotating component 104. Additionally, the load-bearing surface 2904 may be machined with a radius that is larger than the outer radius of the rotating component 104. This curvature mismatch between the radially inner surface 2904 of the seal segments 2012, 2212 and the opposing radially outer surface of the rotating component 104 allows the load-bearing surface 2904 to form a converging-diverging (along the tangential direction 114) thin film wedge between the load-bearing surface 2904 and the spinning rotor 104.

This converging-diverging fluid film leads to the generation of an aerodynamic force in the presence of rotation of the rotor 104. The presence of aerostatic ports 2902 and the aerodynamic features 2906 (e.g., the spiral grooves, Rayleigh steps, and/or curvature mismatch) results in a high-stiffness fluid film separating the shoe 2002 and the rotor 104. The characteristics of the film are such that the pressure of the film increases with a reduction in film thickness and the pressure of the film decreases with increases in the film thickness. This characteristic of the film pressure along with the radial spring 1505 that urges the shoe 2002 toward the rotating component 104 results in the shoe 2002 closely following or tracking the radial incursions of the rotating component 104. The film-riding shoe 2002 can maintain a very small distance (for example, five to twenty-five microns) between the outer surface of the rotating component 104 and the load-bearing surface 2904 using aerodynamic and aerostatic forces, thereby positioning the primary labyrinth seal very close to the rotating component 104.

During motion of the rotating outer surface of the rotating component 104 in the radial directions 110 (caused due to thermal growth of the rotating component 104, centrifugal growth of the rotating component 104, and/or radial vibratory motion of the rotating component 104), the film-riding shoe 2002 maintains a thin fluid film between the rotating component 104 and the load-bearing surface 2904 due to the high stiffness of the thin fluid film. This allows for the seal segments 2012, 2212 to track radial motions of the rotating component 104. This radial tracking (or following) of the rotating component 104 can enable the primary labyrinth seal established by the primary teeth 2032 to maintain a small clearance between the rotating component 104 and the primary teeth 2032. This radial tracking also can eliminate relative radial motion between the rotating component 104 and the primary labyrinth teeth 2032. The elimination of relative radial motion between the primary labyrinth seal teeth 2032 and the rotating component 104 can reduce or eliminate degradation of the labyrinth seal teeth 2032 (due to little or no contact with the spinning rotor or rotating machine 102) and sustained low-leakage performance otherwise not possible with traditional labyrinth seals, which typically undergo degradation with relative radial motion between the rotating component 104 and the seal teeth.

Note that the preceding description uses terms "aerostatic" and "aerodynamic" to refer to the types of load-bearing pressures in the fluid film. The term "aerostatic" can refer to fluid film forces created due to pressurization and are thus pressure-dependent in nature. The "aerodynamic" forces in the fluid film are dependent on the rotation speed of the rotating component 104. Additionally, while the description herein focuses on the use of air as the fluid, optionally, the fluid (or working fluid) can be or include nitrogen, hydrogen, supercritical and gaseous $CO_2$, steam, etc.

The internal passages 2004 in the shoe 2002 supply or direct fluid to the aerostatic ports 2902 and other locations (e.g., the bellows and/or to form an axial air or fluid bearing 2008 between the seal segment 2012, 2212 and the aft support plate 2003). The seal segment 2012, 2212 and/or internal passages 2004 can be manufactured using additive manufacturing techniques or conventional machining techniques. Some portion of the shoe 2002, such as the flexures shown herein, can be manufactured with wire EDM techniques. Some surfaces of the shoe 2002 (like the load bearing face or surface 2904, a front vertical load bearing face of the shoe 2002 that faces the front plate 2001, and/or an aft vertical load bearing face of the shoe 2002 that faces the aft support plate 2003) may be machined with processes like grinding, lapping, etc., to achieve desired surface profiles and low surface roughness. The radially innermost load-bearing surfaces of the seal segments 2012, 2212 can be coated with lubricating coatings like PS304, PS400, or the like, that can withstand unintentional rubbing or other contact between the shoe 2002 and the rotating component 104. The coating optionally could be graphite, diamond-like carbon, hexagonal boron nitride, chromium molybdenum nitride, chrome titanium aluminum nitride, or another similar lubricant embedded in a harder material to balance the lubrication, wear, and thermal growth properties of the coating. The surface of the rotating component 104 that interfaces with the shoe 2002 could be coated with chromium carbide, titanium aluminum nitride, hexagonal boron nitride, or similar coatings to improve hardness of the rotating component 104, improve corrosion resistance, and/or to maintain a finish of the surface. Optionally, the shoe 2002 can be formed from materials such as graphite.

Figure 26:
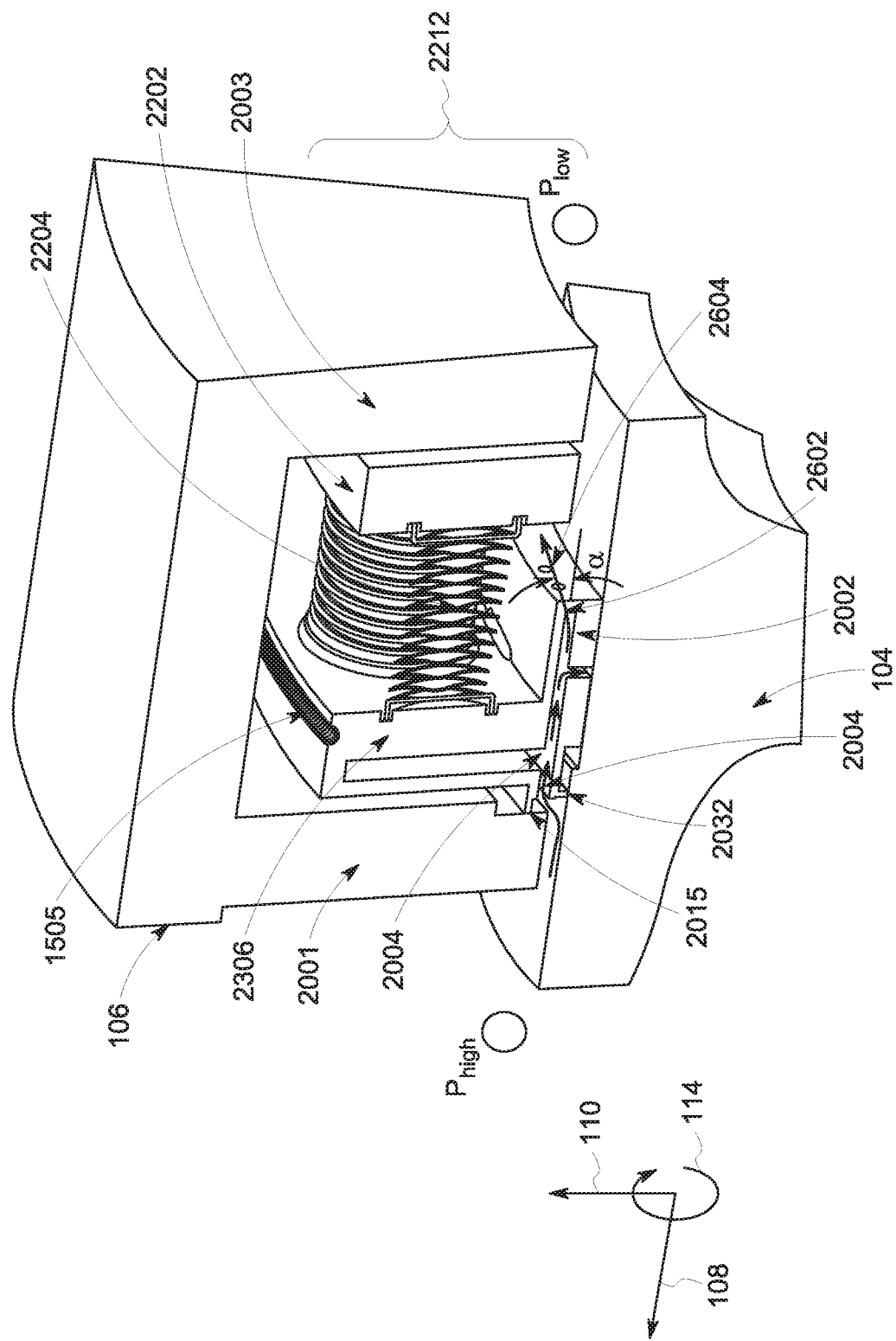
FIG. 26 illustrates another cross-sectional view of one of the seal segments shown in FIG. 22.
Figure 27:
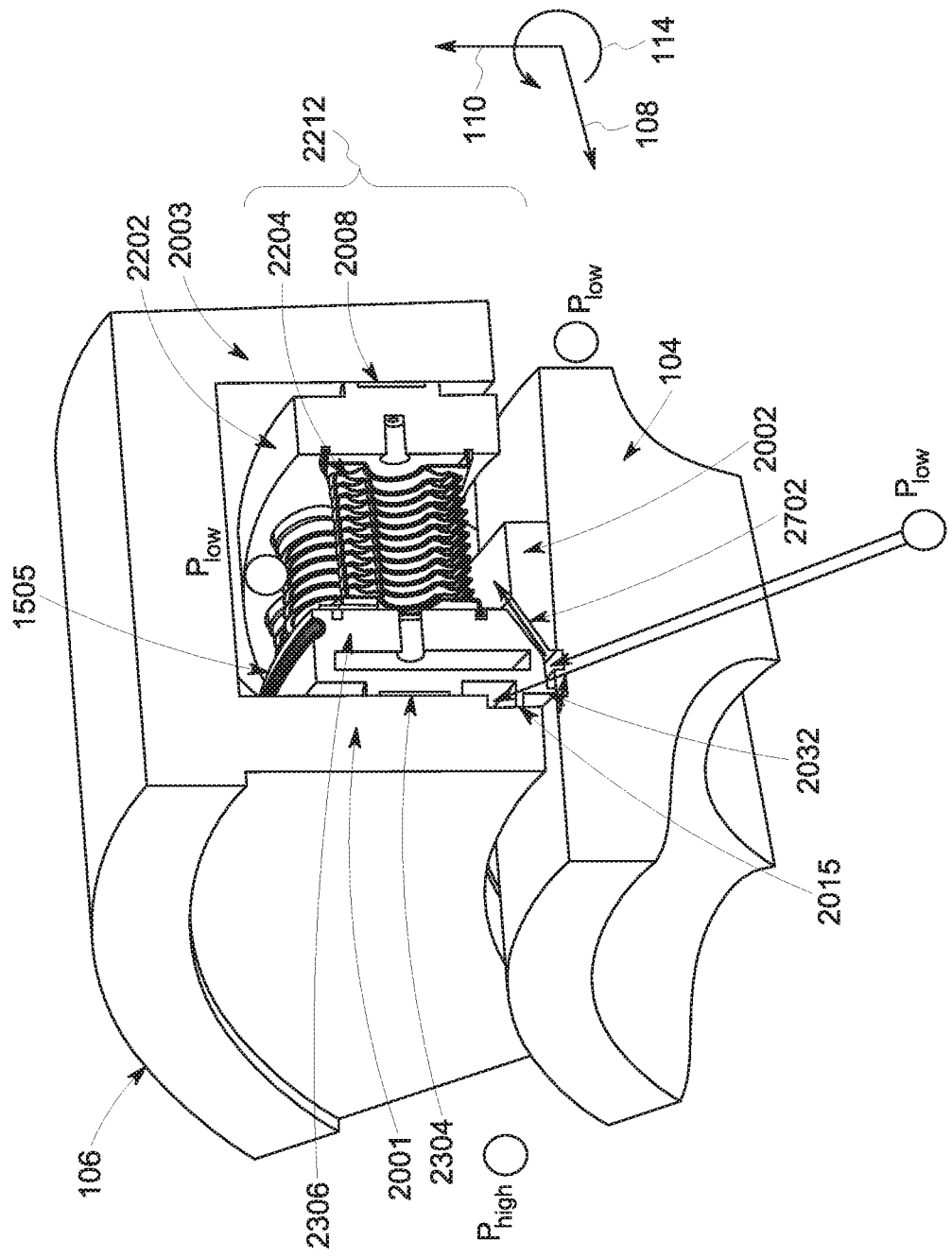
FIG. 27 illustrates another cross-sectional view of one of the seal segments shown in FIG. 22.

In one or more embodiments, the film-riding shoe 2002 may have one or more angled flow holes or passageways 2602 (shown in FIG. 26) that allow for some leaking fluid to flow and bypass the seal formed by the seals formed by the primary teeth 2032 and the secondary teeth 2015. These holes can be referred to as bypass flow holes 2602. As shown in FIG. 26, a bypass flow 2604 of fluid exits from the bypass flow holes 2602 at an angle α relative to the axial direction 108. The bypass flow holes 2602 connect the internal cavities of the seal segment 2012, 2212 with the downstream cavity of the turbomachine or rotary machine 102 with an angled hole. The angle of the bypass flow holes 2602 create swirling flow of the fluid in the direction of the spin of the rotating component 104 as the fluid flow exits the seal segments 2012, 2212.

The seal assemblies formed by the seal segments 2012, 2212 interact with the stator housing 106 on both the front support plate 2001 and the aft support plate 2003. The interaction on the front plate 2001 is the secondary sealing tooth or teeth 2015 and/or a front axial air or film bearing 2304 (shown in FIGS. 23, 27, 28, 31, and 32). The interaction with the aft support plate 2003 is in the form of the aft axial air or fluid bearing 2008.

Figure 30:
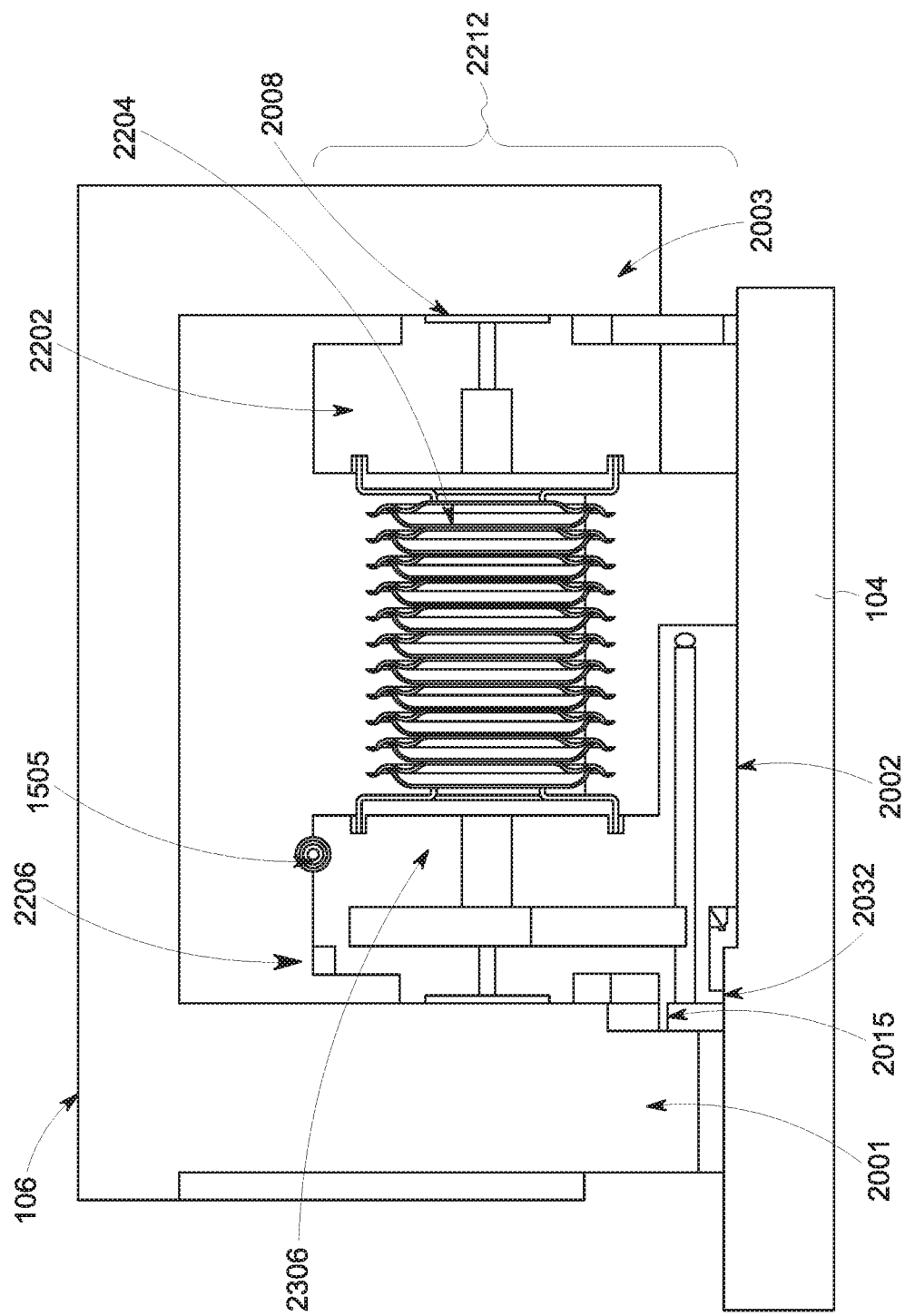
FIG. 30 illustrates another cross-sectional view of one of the seal segments shown in FIG. 22.
Figure 31:
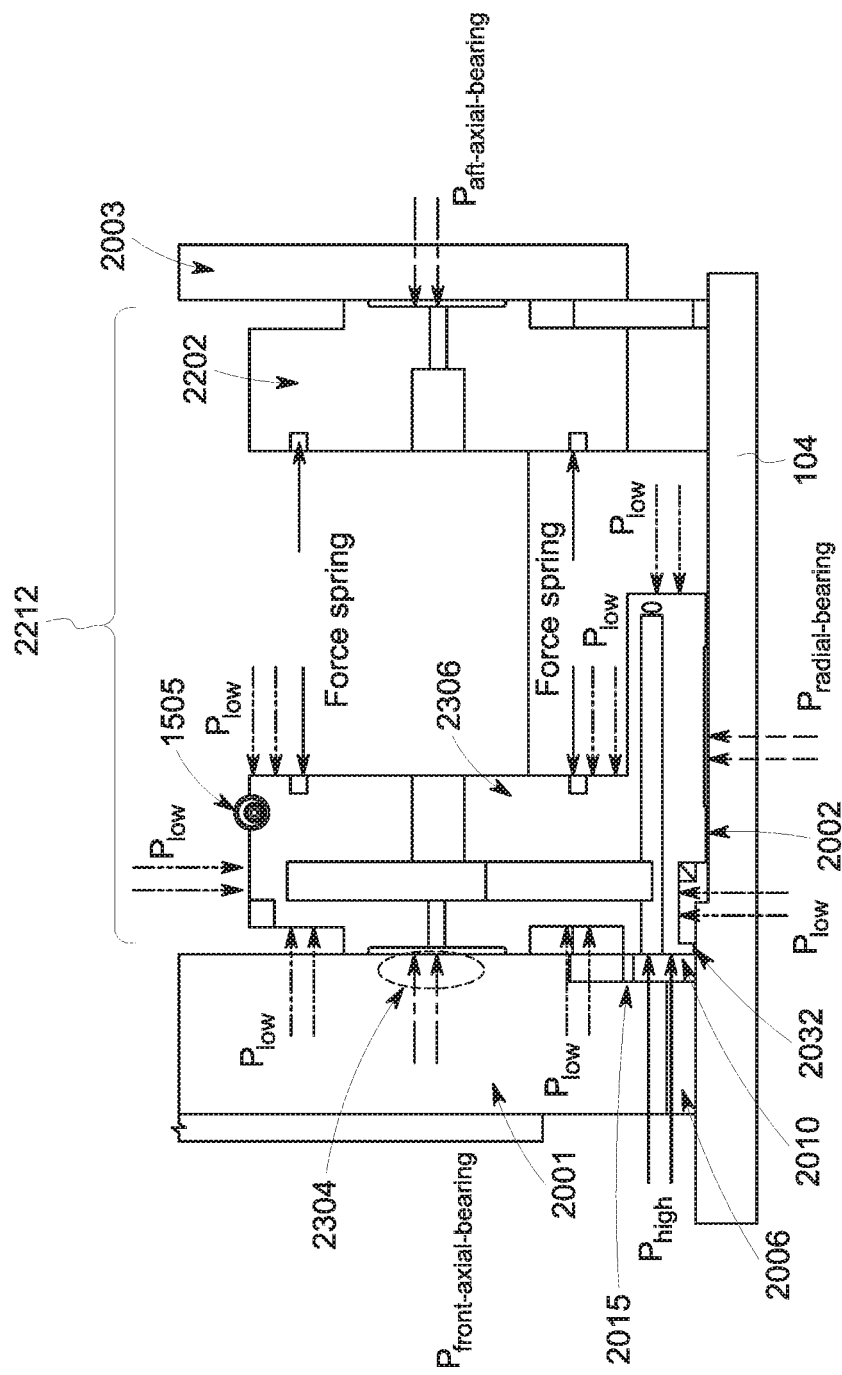
FIG. 31 illustrates forces acting on a stationary housing and seal segment shown in FIG. 22.
Figure 32:
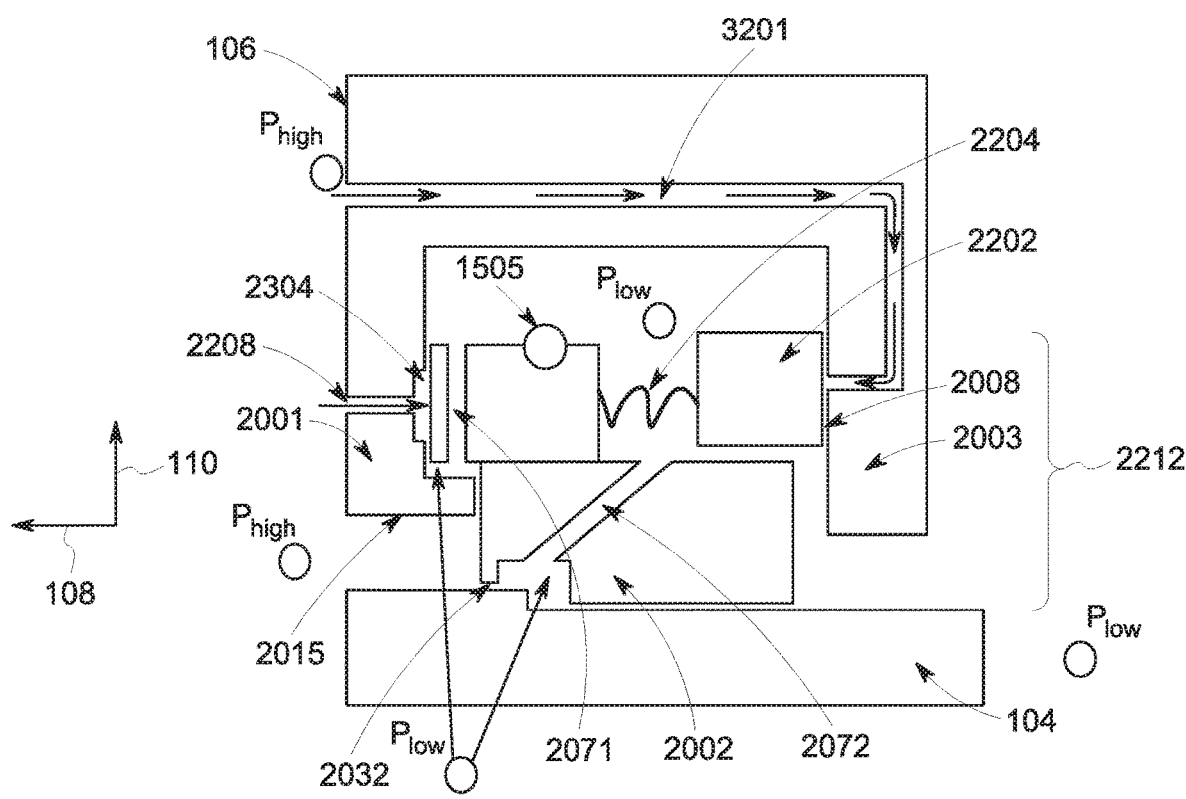
FIG. 32 illustrates forces acting on a stationary housing and seal segment shown in FIG. 22.

The secondary sealing teeth 2015 are shown as integral part of the film-riding shoe 2002 in FIGS. 20 and 22 through 31. Alternatively, the secondary teeth 2015 can be formed as part of the front support plate 2001 of the stator interface 106, as shown in FIG. 32. The secondary teeth 2015 are elongated bodies that are longer in directions that are along or parallel to the axial direction 108.

In operation, the pressure reduces from high pressure $P_{high}$ on the upstream side of the seal assembly to the lower-pressure $P_{low}$ across the secondary tooth or teeth 2015. The small clearance between the front support plate 2001 and the secondary seal tooth or teeth 2015 (on the film-riding shoe 2002 or on the front support plate 2001) forms a secondary film seal. This secondary seal minimizes or reduces fluid leakage through a secondary leakage path (e.g., between the seal assembly or seal segment and the stator interface 106). Once the fluid flow passes the secondary seal tooth 2015 as a fluid flow 2502 (shown in FIG. 25), this fluid can pass radially outward. In the embodiment shown in FIGS. 20 and 21, the fluid flow can pass through a radially oriented open pathway 2071 that is located between a front or upstream-facing surface of the radial plate 124 and an internal or downstream-facing surface of the front support plate 2001, as shown in FIGS. 20 and 21. This pathway 2071 connects the lower fluid pressure volume that is downstream of the secondary tooth 2015 with the lower fluid pressure volume that is downstream of the seal or seal segment 2012.

A radially oriented or radially vertical surface 2010 of the film-riding shoe 2002 is located to the left of the primary tooth 2032 and radially inward of the secondary tooth 2015 as shown in FIGS. 21 and 30. This surface 2010 is subjected to higher fluid pressure $P_{high}$ during operation of the rotary machine 102 (as shown in FIGS. 21, 30, and 31). This higher-pressure $P_{high}$ in combination with the lower-pressure $P_{low}$ on the opposite face of the film-riding shoe 2002 create an axial force that urges or forces the seal segment from left to right (or front to aft).

One or more embodiments of the inventive subject matter described herein provide ways to support or oppose this axial force using an air or fluid bearing. If this axial force is not opposed using an air or fluid bearing, the aft side of the seal segments and assemblies may contact and rub against the aft support plate 2003 of the stator interface 106. The inventive subject matter described herein can support or oppose this axial load in a frictionless or low-friction manner (e.g., less friction than if the seal segments or assemblies contacted the aft support plate 2003). If the film-riding shoe 2002 comes in physical contact with the aft support plate 2003 of the stator interface 106, this contact can result in a frictional resistance for the radial motion of the seal assembly. The inventive subject matter described herein can create an air-film (or fluid film) bearing between the film-riding shoe 2002 and the aft support plate 2003. This fluid film can be self-correcting in that the fluid film can automatically stabilize or change to a film thickness under force equilibrium and can be self-sustaining if there is pressurization on the seal assembly.

Figure 35:
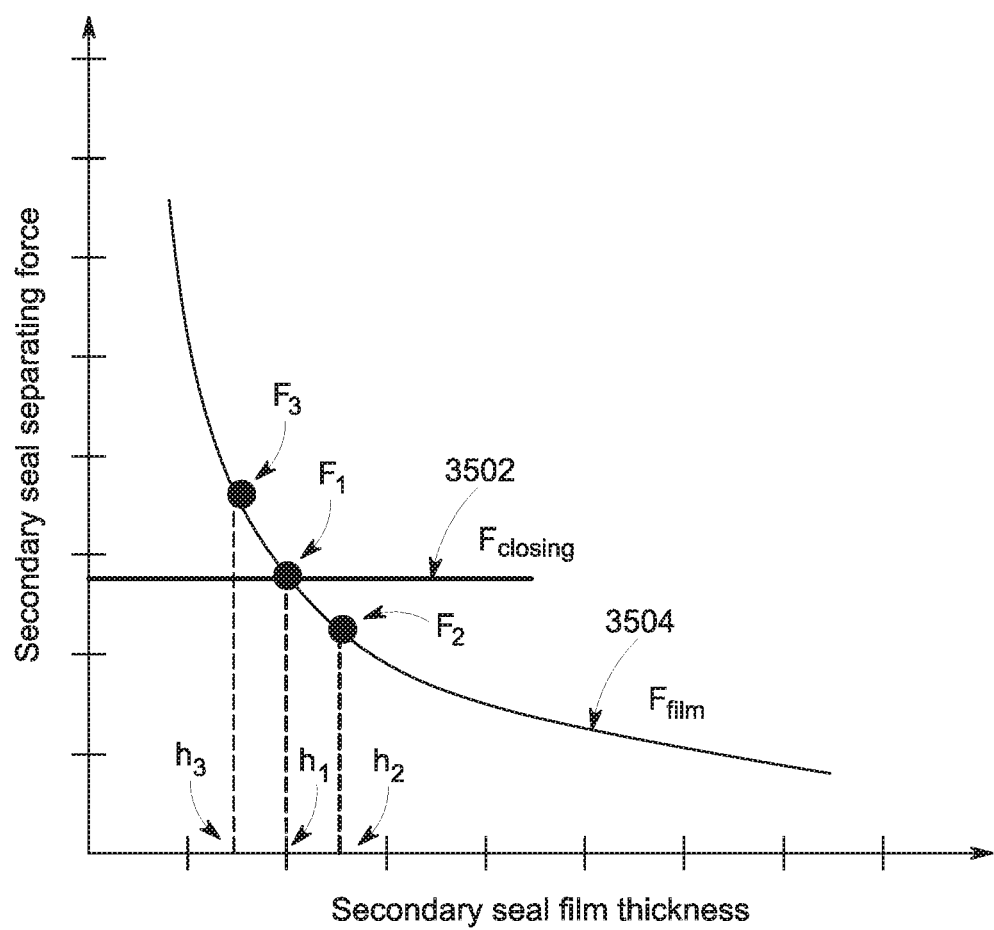
FIG. 35 illustrates one example of a relationship between fluid film thickness and a film separating force (between the seal segment and the stationary housing or rotating component shown in FIG. 22)

One embodiment of the inventive seal segment 2012 for a seal assembly is shown in FIG. 20. FIG. 21 illustrates the balancing forces acting on the seal segment 2012 shown in FIG. 20. A higher fluid pressure $P_{high}$ 2102 exerted on the front side of the shoe 2002 (radially inwards of the secondary seal tooth) along with a lower fluid pressure $P_{low}$ 2104 exerted acting on the opposite face of the shoe 2002 create an axial thrust on the shoe 2002 from left to right in the perspective of FIGS. 20 and 21. Pressurized fluid supplied through internal passages 2004 of the shoe 2002, however, forms the aerostatic fluid bearing 2008 (which exerts an aft-axial bearing force 2106) between the film-riding shoe 2002 and the aft support plate 2003. Example forces versus film thickness characteristics for the bearing 2008 are shown in FIG. 35, where an $F_{closing}$ line 3502 represents the total unbalanced force urging the film-riding shoe 2002 toward the aft support plate 2003. The $F_{closing}$ line 3502 intersects a film force curve 3504 ($F_{film}$) at a film thickness h1, which implies that for fluid film thickness h1, the film-riding shoe 2002 will be in an axial force equilibrium and film-borne on the aft support plate 2003.

Furthermore, perturbations from this film thickness are self-correcting as the film force (represented by the curve 3504) decreases for increased film thicknesses and increases for decreased film thicknesses. The film-riding shoe 2002 that is simultaneously film-riding on the rotating component 104 as well as film-riding the vertical aft support plate 2003 will experience little to no friction on the stator interface 106 during radial motion of the shoe 2002. There may be some friction from contact between neighboring shoes 2002 in the seal assembly, but the friction forces are much smaller forces (e.g., than the forces exerted by the fluid pressure).

The embodiment of the seal assembly 2200 shown in FIGS. 22 and 29 includes raised or protruding cylindrical platforms 2214 that can axially protrude from the seal segments 2212 in opposite directions (e.g., toward the front support plate 2001 of the stator interface 106 from one end of the seal segment 2212 and toward the opposing aft support plate 2003 of the stator interface 106 from the opposite end or side of the seal segment 2212). Five platforms 2214 are shown for the seal segment 2212 in FIG. 29, although a greater or lesser number of the platforms 2214 can be provided. A non-isolated fluid bearing can be formed if the raised height of the platforms 2214 is zero, such as is shown in FIG. 36, where the fluid-bearings formed by the ports 2208 inside counter bores 3503 (instead of raised or protruding platforms 2214) are not isolated but coupled with one another. The seal segments 2212 forming non-isolated fluid bearings (e.g., shown in FIG. 36) may also include the open pathways 2071 and the angled ports 2072. As shown in FIG. 32, the open pathways 2071 fluidly couple the lower fluid pressure volume downstream of the secondary tooth 2015 (above the tooth 2015 in FIG. 32) with the lower fluid pressure volume that is between the shoe 2002 and the housing 106 (e.g., above the shoe 2002 and the spring 1505 in FIG. 32). The angled ports 2072 fluidly couple the lower fluid pressure volume that is downstream of the primary tooth 2032 (to the right of the tooth 2032 in FIG. 32) with the lower fluid pressure volume that is between the shoe 2002 and the housing 106 (e.g., above the shoe 2002 and the spring 1505 in FIG. 32).

Also as shown in FIG. 32, the housing 106 can include ports 2208, 3201 for directing fluid between the seal segment 2212 and the housing 106 to form the front and aft axial fluid bearings. For example, the port 2208 can allow fluid to flow from the higher fluid pressure volume that is upstream of the housing 106 (e.g., to the left of the housing 106 in FIG. 32) through the housing 106 to form the front axial fluid bearing 2304. A bypass port 3201 can extend through the housing 106 in a first portion 3203 of the port 3201 that is radially outside of the seal segment 2212 and in a fluidly coupled second portion 3205 that extends radially inward from the first portion 3203. The bypass port 3201 can fluidly couple the higher fluid pressure volume that is upstream of the housing 106 with the space between the seal segment 2212 and the aft support plate 2003 to form the aft axial fluid bearing 2008.

The embodiment of the seal segment 2212 shown in FIGS. 20 and 21 use the aft fluid bearing 2008 to axially position the shoe 2002 between the support plates 2001, 2003. This equilibrium dictates the relative position of the secondary tooth 2015 relative to the front plate 2001. This embodiment works for scenarios where the front support plate 2001 plate is expected to remain at a fixed axial separation from the aft support plate 2003. As the seal assembly undergoes large thermal changes, the stator housing 106 may axially grow, resulting in the front support plate 2001 moving away from the aft support plate 2003. In such a scenario, the gap between the secondary tooth 2015 and the front support plate 2001 might increase for the embodiment of the seal segments 2012 shown in FIGS. 20 and 21, thereby resulting in excessive undesirable fluid leakage past the secondary seal formed between the secondary tooth 2015 and the front support plate 2001.

Figure 33:
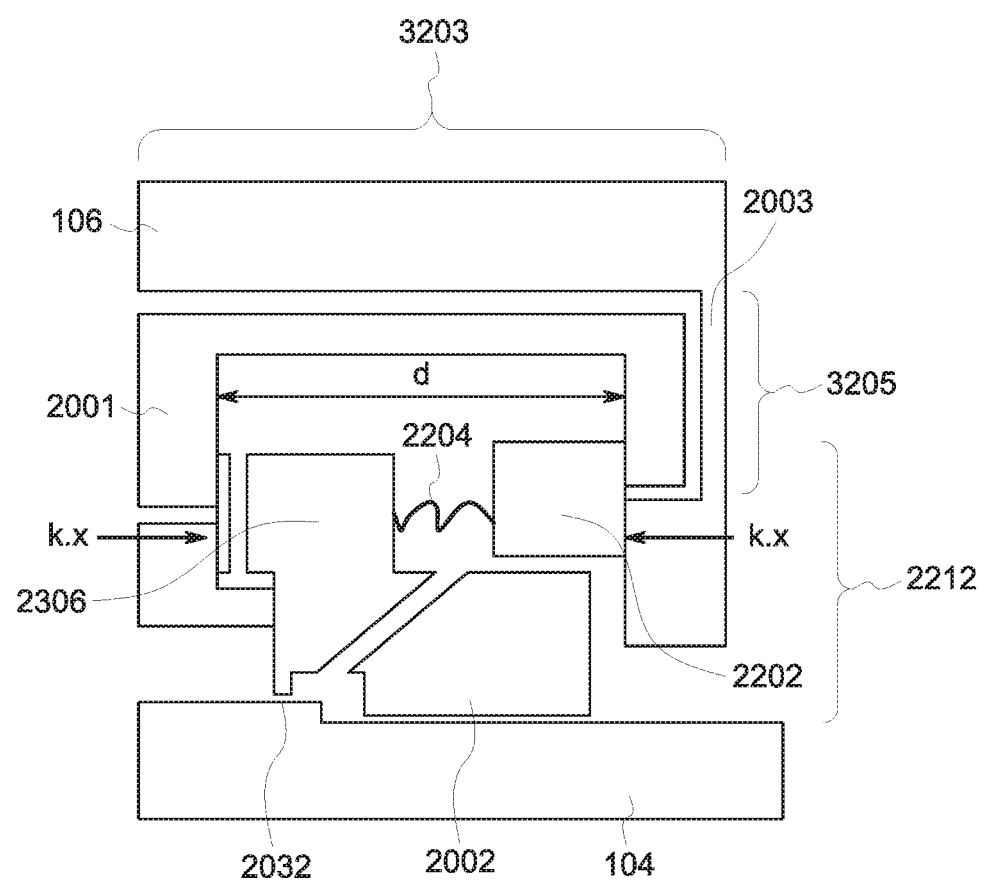
FIG. 33 illustrates forces acting on a stationary housing and seal segment shown in FIG. 22.
Figure 34:
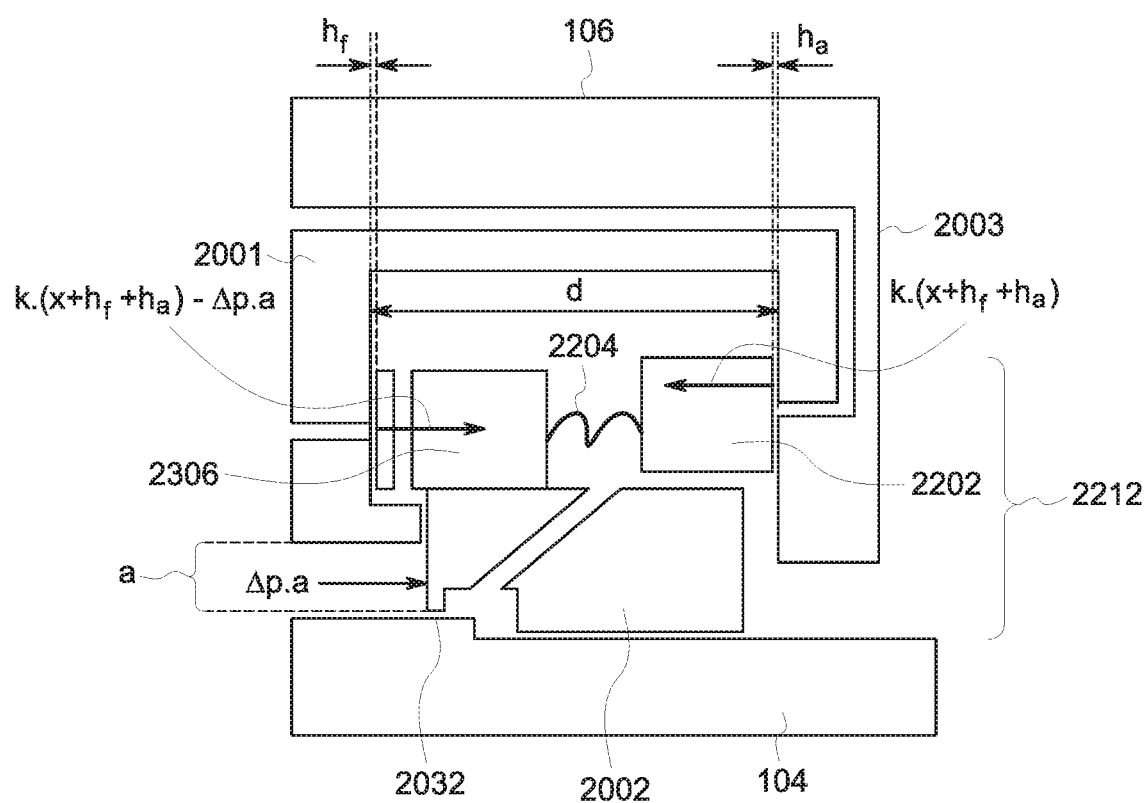
FIG. 34 illustrates forces acting on a stationary housing and seal segment shown in FIG. 22.

To overcome this issue, an alternate embodiment of the seal segment 2212 includes the floating aft support plate 2003, as shown in FIGS. 32 through 34. The film-riding shoe 2002 is connected with the floating aft support plate 2003 with the force-applying element 2204, also referred to as an axial spring. The axial spring 2204 can be pre-compressed for assembling the film-riding shoe 2002 and the aft floating plate 2202 in the stator housing 106. Under zero pressurization and pre-compression, the axial spring 2204 forces the vertical (e.g., radially oriented) load-bearing surfaces of the film-riding shoe 2002 on the front support plate 2001. The axial spring 2204 also forces the vertical (e.g., radially oriented) load-bearing surface of the aft floating plate 2202 on to the aft support plate 2003. As shown in FIGS. 33 and 34, this results in a contact force 'k·x', where 'k' is the spring stiffness and 'x' is the pre-compression.

With pressurization of the higher fluid pressure $P_{high}$ upstream of the seal segment 2212 (or seal assembly formed from the seal segments 2212) and the lower fluid pressure $P_{low}$ downstream of the seal segment 2212 or seal assembly, a resulting differential pressure '$\Delta p = P_{high} - P_{low}$' acts on the front exposed area 'a' (e.g., the front area of the film-riding shoe 2002 that is between the secondary tooth 2015 and the rotating component 104). This creates an axial thrust of '$\Delta p \cdot a$' on the seal segment 2212. At the same time, high-pressure fluid flows through internal passages 2301 of the stator interface 106 and/or the internal passages 2004 of the seal segment 2212). This creates the front axial fluid bearing 2304 (with film thickness $h_f$ as shown in FIG. 34) and the aft axial fluid bearing 2008 (with film thickness $h_a$ as shown in FIG. 34). Accordingly, the front fluid bearing 2304 with film thickness '$h_f$' applies a force of '$k \cdot (x + h_f + h_a) - \Delta p \cdot a$' on the vertical load-bearing surface of the film riding shoe 2002. Similarly, the aft fluid bearing 2008 with film thickness '$h_a$' applies a force of '$k \cdot (x + h_f + h_a)$' on the vertical load-bearing surface of the aft floating plate 2202. Overall, the seal segment 2212 (and seal assembly) is film-riding on the front and aft fluid bearings 2304, 2008, as well as on the rotating component 104 (by the fluid bearing between the shoe 2002 and the rotating component 104). The secondary seal tooth 2015 forms a small clearance and a low leakage path, as shown in FIG. 34.

The equilibrium position of the seal segment 2212 can be self-correcting. For example, if the distance 'd' between the front support plate 2001 and the aft support plate 2003 increases (e.g., due to thermal growth or manufacturing tolerances) such that the front support plate 2001 moves to the left in FIG. 34, then the film thickness '$h_f$' will temporarily increase to '$h_{ff}$'. This increased film thickness '$h_{ff}$' can result in a lower fluid bearing force (as shown in FIG. 35). Because the front fluid film can no longer produce the desired force '$k \cdot (x + h_f + h_a) - \Delta p \cdot a$', the axial spring 2204 can expand to a lower compression '$x_1$' (smaller than 'x') and the fluid film thickness will decrease until the fluid film and the spring forces are in equilibrium. This self-correcting behavior helps to ensure that the gap between the secondary tooth 2015 and the rotating component 104 is maintained at a small clearance despite thermal deformation of the stator housing 106. This particular feature of the seal segment 2212 also is useful because the stator interface dimension 'd' (e.g., the distance between the support plates 2001, 2003) does not have to be tightly controlled during manufacturing because the axial spring 2204 helps to ensure that an equilibrium is achieved.

Figure 28:
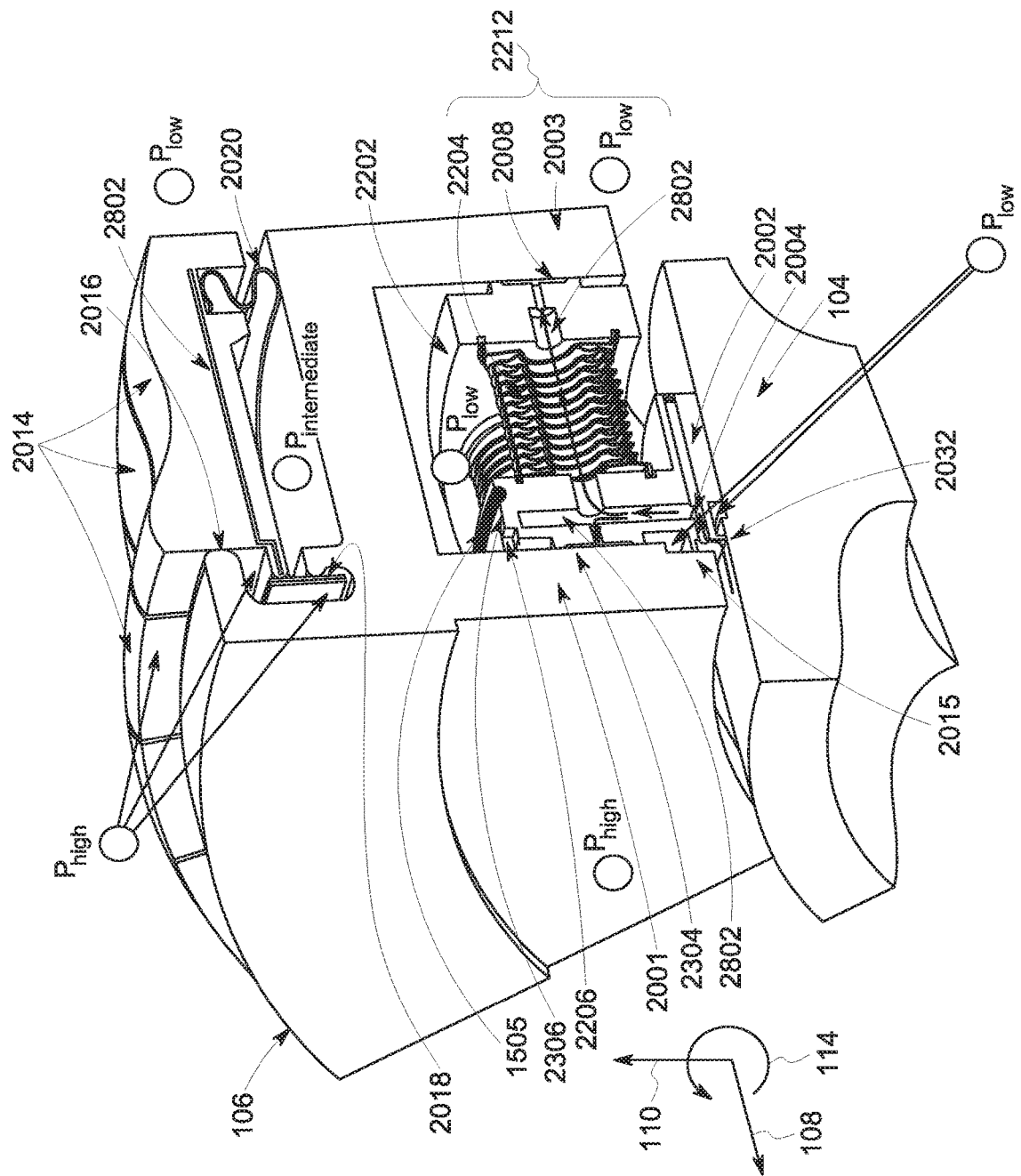
FIG. 28 illustrates another cross-sectional view of one of the seal segments shown in FIG. 22.

One embodiment of the axial spring 2204 is the internally pressurized spring or bellow shown in FIGS. 22 through 30 (with the corresponding balance of forces shown in FIG. 31). While the illustrated embodiment shows five internally pressurized circular bellows on every seal segment 2212, other shapes and/or numbers of springs or bellows can be used. The bellow can be sealed to the forward and aft plates 2306, 2202 of the seal segment 2212 by brazed joints 2803, as shown in FIG. 28. Alternatively, the bellow can be sealed to the forward and aft plates 2306, 2202 of the seal segment 2212 in another manner. The forward plate 2306 of the shoe 2002 shown in FIGS. 22 through 30 replaces the plate 124 in the embodiment of the shoe 2002 shown in FIGS. 20 and 21. The stiffness of the bellows is typically governed by the thickness of the convolutions, number of convolutions, overall size (e.g., inner and outer diameter of a circular bellow) and axial length of the bellow. In addition to acting like an axial spring, the internally pressurized bellow also applies an "axial thrust." The axial thrust depends on the size (e.g., the inner and outer diameter of a circular bellow) and the magnitude of the internal pressure.

For example, one difference between the embodiment of FIG. 32 and the embodiment of FIG. 22 is that the axial spring 2204 is an internally pressurized bellow for the embodiment of FIG. 22 (as shown in FIGS. 22 through 30). This feature of internally pressurizing the spring 2204 has implications for the range of differential pressures that the seal can operate over. Specifically, the embodiment described above in connection with FIGS. 32 through 34 works over a smaller range of differential pressure '$\Delta p = P_{high} - P_{low}$'. Assuming the embodiment of FIGS. 32 through 34 works for a certain differential pressure '$\Delta p_1$', then the axial spring force 'k·x' for the embodiment in FIG. 32 to FIG. 34 is of the same order of magnitude as the axial thrust '$\Delta p_1 \cdot a$'. If, however, the seal segment 2212 is now subjected to a larger differential pressure '$\Delta p_2$' (where '$\Delta p_2$' is larger by an order of magnitude than the original differential pressure '$\Delta p_1$'), then the fluid bearing forces and the axial thrust will increase significantly (by one order of magnitude), but the axial spring force will not scale up. To remedy this situation, the internally pressurized bellow (with a pressure-scaling internal axial thrust) can scale the spring force up to match the increased axial thrust and increased fluid bearing forces. Thus, an internally pressurized bellow works as described in paragraphs 00152 to 00154 (in the context of FIGS. 32 through 34), except the spring force term 'k·x' is replaced with spring and internal thrust forces (i.e., 'k·x+$\Delta p$. Thrust Area'). The thrust area of the bellow depends on the overall size (e.g., inner and outer diameters of a circular bellow).

The stator interface 106 is shown in FIGS. 21, 23, 26, 27, 30, 32, 33, and 34 as being stationary or fixed to the stator of the rotary machine 102. Other embodiments shown in FIGS. 20 and 28 provide for a floating stator interface 106. In these embodiments, the stator interface 106 is not bolted or welded to the stator of the rotary machine 102. The rotary machine 102 can have a segmented stator 2014 (shown in FIG. 20). This segmented stator 2014 can interface the stator interface 106 via a load-contact-line 2016. One or more stator-stator seals, such as W-seals or E-seals 2016, leaf seals 2018, spline seals 2802 (shown in FIG. 28), O-rings, rope seals, etc., can be used to reduce fluid leakage from the higher fluid pressure $P_{high}$ to the lower fluid pressure $P_{low}$ along leakage paths between the stator interface 106 and the stator of the turbomachinery or rotary machine 102.

Figure 37:
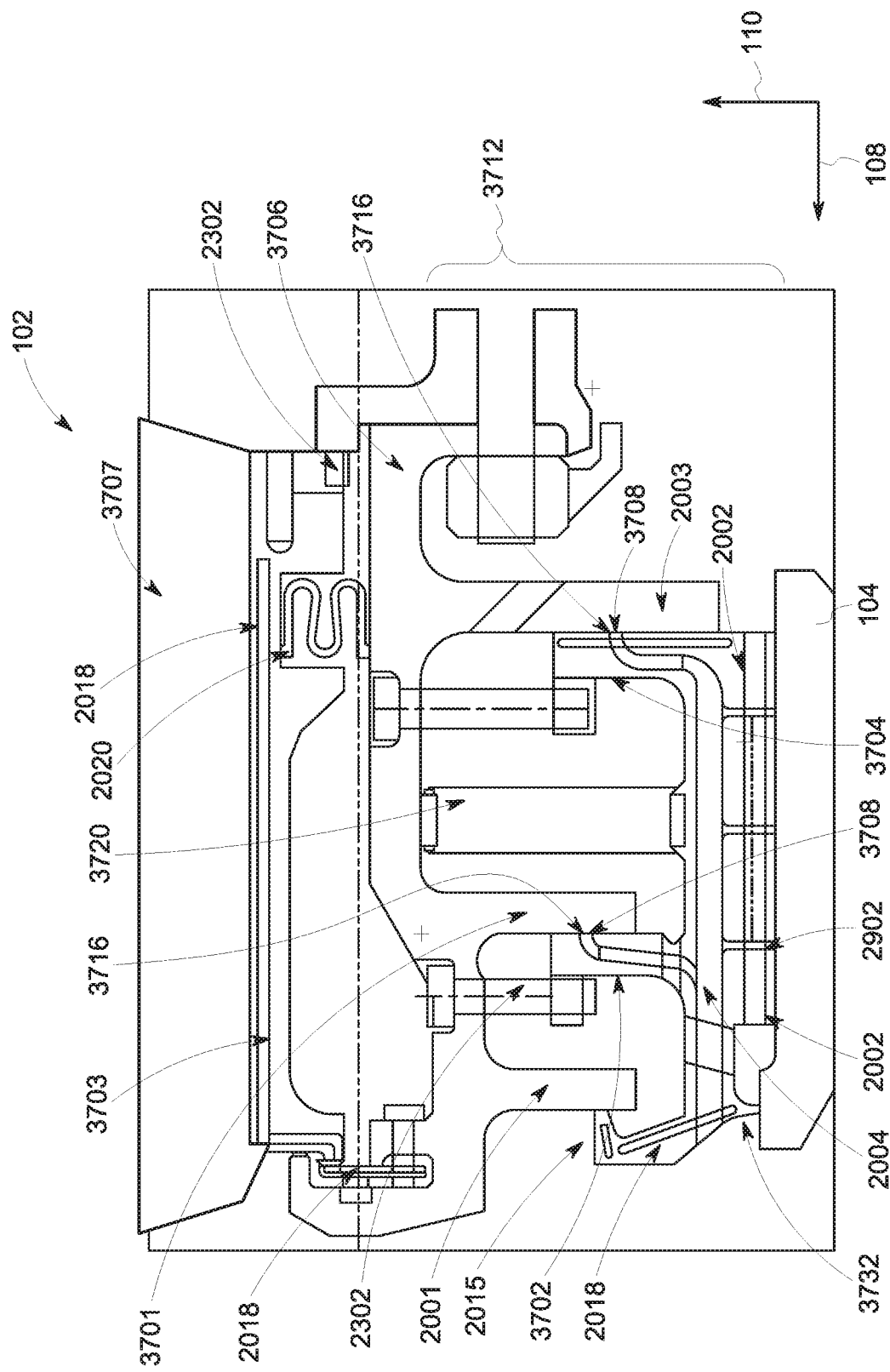
FIG. 37 illustrates another embodiment of a seal segment.

FIG. 37 illustrates a cross-sectional view of another embodiment of a seal segment 3712 for a seal assembly. The stationary interface 3706 is connected to another stationary component 3707 of the machine 102. In the illustrated embodiment, a stationary interface 3706 of the rotary machine 102 includes multiple support plates, such as the front support plate 2001, the aft support plate 2003, and an intermediate support plate 3701. This intermediate support plate 3701 is located between the support plates 2001, 2003 along the axial direction 108. The seal segment 3712 can be similar to the seal segments described above, such as by including the shoe 2002 having the ports 2902 to form a fluid bearing between the rotating component 104 and the seal segment 3712. The seal segment 3712 includes the secondary tooth 2015 that is elongated inward toward the front support plate 2001 and a primary tooth 3732. That is, in contrast to the secondary teeth described above that are between the support plates 2001, 2003, the secondary tooth 2015 is outside of the support plates 2001, 2003 and forms a secondary seal between the support plate 2001 and the seal segment 3712 on an opposite side of the support plate 2001 (relative to the secondary teeth described above). A radial spring 3720 can apply a force in a direction that is opposite the radial direction 110 to urge the shoe 2002 toward the rotating component 104.

The seal segment 3712 also includes an internal forward plate 3702 and an aft plate 3704. The internal forward plate 3702 and the aft plate 3704 both include feed holes 3708 that are fluidly coupled with internal passages 2004 of the shoe 2002. Higher-pressure fluid $P_{high}$ from the upstream side of the seal segment 3712 flows through the internal passages 2004 to the feed holes 3708 to form a fluid bearing 3716 between the internal forward plate 3702 and the intermediate support plate 3701 and to form a fluid bearing 3716 between the aft plate 3704 and the support plate 2003. As described above, these fluid bearings can help provide for frictionless seals between the seal segments 3712 and the stationary interface 3706.

Figure 38:
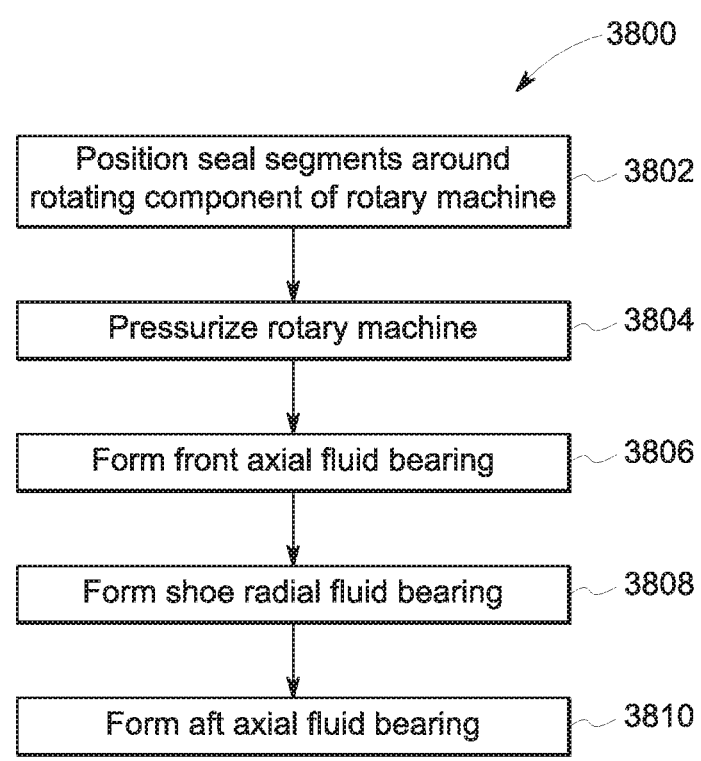
FIG. 38 illustrates a flowchart of one embodiment of a method for forming fluid seals between a rotating component and a stationary housing of a rotary machine.

FIG. 38 illustrates a flowchart of one embodiment of a method 3800 for forming fluid seals between a rotating component and a stator interface of a rotary machine and between a higher-pressure fluid volume upstream of the stator interface and a lower-pressure fluid volume downstream of the stator interface. At 3802, plural seal segments are positioned circumferentially intermediate to the rotating component of the rotary machine and axially between a front support plate and a rear support plate of the stator interface. At 3804, the rotary machine is pressurized with fluid to form the higher-pressure volume upstream of the stator interface. The higher-pressure volume rotates the rotating component to form the lower-pressure volume downstream of the stator interface. At 3806, a front axial fluid bearing is formed between cover plates of the seal segments and the front support plate of the stator interface using at least some of the fluid. At 3808, a shoe radial fluid bearing is formed between film-riding shoes of the seal segments and the rotating component using at least some of the fluid. At 3810, an aft fluid bearing is formed between aft plates of the seal segments and the rear support plate of the stator interface using at least some of the fluid.

The inventive subject matter described herein provides several technical effects. The seal assemblies and seal segments provide for improved predictability of aerostatic force balances and radial operation of the seal assemblies. The radial friction force between the stationary component 106 and the seal assemblies is significantly reduced or eliminated, thereby allowing for predictable radial motion of the seal assemblies. The seal assemblies can operate with both aerostatic and aerodynamic modes of operation, which increases load-bearing capacity. For example, the seal assemblies can axially float between the support plates 2001, 2003 of the stationary interface 3706 when the rotating component 104 is stationary (e.g., not rotating) and the seal assemblies can axially float between the support plates 2001, 2003 and radially float when the rotating component 104 is rotating. The seal assemblies described herein can have many ports and feeding grooves for controlling pressure distributions on the shoes 2002 and for controlling cooling flow around the shoes 2002. Leakage between neighboring seal segments can be reduced using splines seals between the neighboring seal segments or slanted-surface contact between neighboring segments. The load-bearing surfaces of the seal segments can have aerodynamic features 2906 (e.g., recesses, grooves, etc.) and aerostatic feed holes or hydrostatic ports 2902 that allow for correction of tilt and moment-bearing capacity. The shoes 2002 can have a curvature mismatch with the rotating component 104 and/or have one or more grooves, steps, or pockets to generate additional radial force in the aerodynamic operation mode of the seal assembly.

The seal segments described herein can be manufactured at low cost while providing reliable and robust seals for several locations in rotating machinery with large pressure drops and pressure transients. The non-contact operation of the seal assemblies makes the assemblies especially useful for large rotor transient locations where, due to limitations of current technologies, larger steady-state clearances may otherwise be required to avoid rubs and wear. The larger clearances may produce large fluid leakages as well. The aerostatic features of the seal assemblies improve load-bearing capacities of the seal assemblies and allows for operation of the seal assemblies at increased running gaps compared to previous foil seals. This increased gap enables operation of the seal assemblies at higher rotating speeds of the rotating component 104. Furthermore, the frictionless secondary seal formed by the secondary teeth 2015 can allow for high differential pressure operation, which may not be possible with previous secondary seal concepts. For example, in other radial seal designs, the secondary seal friction force scales with the differential pressure and makes the seal inoperable for large differential pressures.

In one embodiment, a seal assembly for a rotary machine is provided. The rotary machine includes a stator interface (e.g., the stator interface 106) and a rotating component. The stator interface includes the front support plate and the opposing rear support plate that are axially separated from each other along one or more axial directions that are parallel to an axis of rotation of the rotating component. The seal assembly includes plural seal segments configured to be disposed circumferentially intermediate to the rotating component of the rotary machine and axially located between the front support plate and the rear support plate of the stator interface. One or more of the seal segments includes a radially oriented forward plate (e.g., the plate 2306) configured to axially oppose the front support plate of the stator interface, a radially oriented aft plate (e.g., the plate 2202) configured to axially oppose the rear support plate of the stator interface, and a film-riding shoe configured to be located between the cover plate and the aft plate. The film-riding shoe has one or more hydrostatic ports axially extending through the film-riding shoe. Responsive to rotation of the rotating component and pressurization of fluid in the rotary machine upstream of the front support plate of the stator interface, the cover plates form a front axial fluid bearing between the cover plates and the front support plate using at least some of the fluid. The film-riding shoes form a shoe fluid bearing between the film-riding shoe and the rotating component using at least some of the fluid. And the aft plates form an aft fluid bearing between the aft plates and the rear support plate using at least some of the fluid.

Optionally, the cover plates, the aft plates, and the film-riding shoes are prevented from contacting the stator interface or the rotating component by the front axial fluid bearing, the aft fluid bearing and the shoe fluid bearing.

Optionally, the aft plates include feed passages that direct the fluid that is pressurized upstream of the cover plates and the film-riding shoes to locations between the aft plates and the rear support plates to form the aft fluid bearing.

Optionally, the cover plates include axially elongated secondary teeth that form a secondary film seal between the secondary teeth film-riding shoe, and the film-riding shoes include radially elongated primary teeth that form a primary film seal between the primary teeth and the rotating component.

Optionally, the aft plates and the cover plates are axially separated from each other by a radially elongated internal channel that directs at least some of the fluid through the seal segments to form the aft fluid bearing.

Optionally, the aft plates include floating aft plates that are coupled with the corresponding cover plates by pressurized spring bellows.

Optionally, the cover plates include feed passages fluidly coupled with the spring bellows and with a pressurized volume of the fluid that is upstream of the stator interface.

Optionally, each of the aft plates includes a forward aft plate and a rearward aft plate axially separated from each other.

Optionally, the stator interface includes a forward rear support plate and a rearward rear support plate. Each of the forward aft plates and each of the rearward aft plates can form the aft fluid bearing between each of the forward aft plates and the forward rear support plate and between each of the rearward aft plates and the rearward rear support plates.

In one embodiment, a seal segment of a seal assembly for a rotary machine having a stator interface and a rotating component is provided. The stator interface includes a front support plate and an opposing rear support plate that are axially separated from each other along one or more axial directions that are parallel to an axis of rotation of the rotating component. The seal segment includes a radially oriented cover plate configured to axially oppose the front support plate of the stator interface, a radially oriented aft plate configured to axially oppose the rear support plate of the stator interface, and a film-riding shoe configured to be located between the cover plate and the aft plate. The film-riding shoe has one or more hydrostatic ports axially extending through the film-riding shoe. Responsive to rotation of the rotating component and pressurization of fluid in the rotary machine upstream of the front support plate of the stator interface, the cover plate forms at least part of a front axial fluid bearing between the cover plate and the front support plate using at least some of the fluid, the film-riding shoe forms at least part of a shoe fluid bearing between the film-riding shoe and the rotating component using at least some of the fluid, and the aft plate forms at least part of an aft fluid bearing between the aft plate and the rear support plate using at least some of the fluid.

Optionally, the cover plate, the aft plate, and the film-riding shoe are configured to be located circumferentially intermediate to the rotating component of the rotary machine.

Optionally, the cover plate is prevented from contacting the stator interface by the front axial fluid bearing.

Optionally, the aft plate is prevented from contacting the stator interface by the aft fluid bearing.

Optionally, the film-riding shoe is prevented from contacting the rotating component by the shoe fluid bearing.

Optionally, the aft plate includes a feed passage that directs the fluid that is pressurized upstream of the cover plate and the film-riding shoe to a location between the aft plate and the rear support plate to form the aft fluid bearing.

Optionally, the cover plate includes an axially elongated secondary tooth that forms a secondary film seal between the secondary tooth and the front support plate of the stator interface.

Optionally, the film-riding shoe includes a radially elongated primary tooth that forms a primary film seal between the primary tooth and the rotating component.

Optionally, the aft plate and the cover plate are axially separated from each other by a radially elongated internal channel that directs at least some of the fluid through the cover plate and the aft plate to form the aft fluid bearing.

Optionally, the aft plate includes a floating aft plate that is coupled with the cover plate by a pressurized spring bellow.

Optionally, the cover plate includes a feed passage fluidly coupled with the spring bellow and with a pressurized volume of the fluid that is upstream of the stator interface.

Optionally, the aft plate includes a forward aft plate (e.g., the plate 2306) and a rearward aft plate (e.g., the plate 2202) axially separated from each other.

Optionally, the stator interface includes a forward rear support plate (e.g., the internal plate 3701) and a rearward rear support plate (e.g., the plate 2003). The forward aft plate can form the aft fluid bearing between the forward aft plate and the forward rear support plate. The rearward aft plate can form the aft fluid bearing between the rearward aft plate and the rearward rear support plate.

In one embodiment, a seal assembly for a rotary machine is provided. The seal assembly includes a stator interface having a front support plate and an opposing rear support plate that are axially separated from each other along one or more axial directions that are parallel to an axis of rotation of a rotating component of the rotary machine. The seal assembly also includes plural seal segments configured to be disposed circumferentially intermediate to the rotating component of the rotary machine and axially located between the front support plate and the rear support plate of the stator interface. One or more of the seal segments includes a radially oriented plate configured to axially oppose the front support plate and/or the rear support plate of the stator interface and a film-riding shoe coupled with the radially oriented plate. The film-riding shoe is configured to form a shoe fluid bearing between the film-riding shoe and the rotating component responsive to rotation of the rotating component and pressurization of fluid in the rotary machine upstream of the front support plate of the stator interface. One or more of the stator interface or the film-riding shoe includes one or more ports or pathways through which higher-pressure fluid upstream of the stator housing in the rotary machine flows to form an aft axial fluid bearing between the radially oriented plate and the rear support plate of the stator interface.

Optionally, the one or more ports are positioned to direct at least some of the fluid to locations between the radially oriented plate and the front support plate of the stator interface to form an axial front fluid bearing between the radially oriented plates and the front support plate of the stator interface.

Optionally, the one or more ports axially extend through the front support plate of the stator interface.

Optionally, the one or more ports radially extend in the radially oriented plates coupled with the film-riding shoes.

Optionally, the one or more ports or pathways fluidly couple a volume in the rotary machine that is upstream of the stator interface with first locations axially positioned between the radially oriented plates of the film-riding shoes and the front support plate of the stator interface, second locations radially positioned between the film-riding shoes and the rotating component of the rotary machine, and third locations axially positioned between the radially oriented plates of the film-riding shoes and the rear support plates of the stator interface.

Optionally, the one or more ports or pathways are positioned to form the aft axial fluid bearing at the third locations, a shoe film bearing at the second locations, and a front axial fluid at the first locations.

Optionally, the radially oriented plate of each of the seal segments includes a front plate and an aft plate. The aft plate includes one or more of the ports that direct fluid that is pressurized upstream of the stator interface to locations between the aft plate and the rear support plate of the stator interface to form the axial aft fluid bearing.

Optionally, one or more of the front support plate of the stator interface or the film-riding shoes includes axially elongated secondary teeth that are positioned to form a secondary film seal between one or more of (a) the secondary teeth and the front support plate of the stator interface or (b) the secondary teeth and the film-riding shoes.

Optionally, the film-riding shoes include the axially elongated secondary teeth.

Optionally, the front support plate of the stator interface includes the axially elongated secondary teeth.

Optionally, the radially oriented plate that is coupled with the film-riding shoe in each of the seal segments includes a front plate that opposes the front support plate of the stator interface and an aft plate that opposes the aft support plate of the stator interface.

Optionally, the front plate and the aft plate in each of the seal segments are separated from each other.

Optionally, the front plate and the aft plate of each of the seal segments are axially separated from each other by an internal channel that directs at least some of the fluid through the seal segments to form the axial aft fluid bearing.

Optionally, the aft plate in each of the seal segments is a floating aft plate that is coupled with the front plate in the corresponding seal segment by one or more axial springs or pressurized spring bellows.

Optionally, each of the radially oriented plates includes a forward aft plate and a rearward aft plate axially separated from each other.

Optionally, the stator interface includes a forward rear support plate and a rearward rear support plate and each of the forward aft plates and each of the rearward aft plates forms the axial aft fluid bearing between each of the forward aft plates and the forward rear support plate and between each of the rearward aft plates and the rearward rear support plates.

In one embodiment, a seal segment of a seal assembly for a rotary machine having a stator interface and a rotating component is provided. The stator interface includes a front support plate and an opposing rear support plate that are axially separated from each other along one or more axial directions that are parallel to an axis of rotation of the rotating component. The seal segment includes a radially oriented front cover plate configured to axially oppose the front support plate of the stator interface, a radially oriented aft plate configured to axially oppose the rear support plate of the stator interface, and a film-riding shoe configured to be located in the vicinity of the cover plate and the aft plate. Responsive to rotation of the rotating component and pressurization of fluid in the rotary machine upstream of the front support plate of the stator interface, the cover plate forms at least part of a front axial fluid bearing between the cover plate and the front support plate using at least some of the fluid, the film-riding shoe forms at least part of a shoe fluid bearing between the film-riding shoe and the rotating component using at least some of the fluid, and the aft plate forms at least part of an aft fluid bearing between the aft plate and the rear support plate using at least some of the fluid.

Optionally, the cover plate, the aft plate, and the film-riding shoe are configured to be located circumferentially intermediate to the rotating component of the rotary machine.

Optionally, the cover plate is prevented from contacting the stator interface by the front axial fluid bearing.

Optionally, the aft plate is prevented from contacting the stator interface by the aft fluid bearing.

Optionally, the film-riding shoe is prevented from contacting the rotating component by the shoe fluid bearing.

Optionally, the aft plate includes a feed passage that directs the fluid that is pressurized upstream of the cover plate and the film-riding shoe to a location between the aft plate and the rear support plate to form the aft fluid bearing.

Optionally, the cover plate includes an axially elongated secondary tooth that forms a secondary film seal between the secondary tooth and the front support plate of the stator interface.

Optionally, the film-riding shoe includes a radially elongated primary tooth that forms a primary film seal between the primary tooth and the rotating component.

Optionally, the aft plate and the cover plate are axially separated from each other by at least one internal channel that directs at least some of the fluid through the cover plate and the aft plate to form the aft fluid bearing.

Optionally, the aft plate includes a floating aft plate that is coupled with the cover plate by one or more of a pressurized spring bellow or an axial spring.

Optionally, the cover plate includes a feed passage fluidly coupled with the spring bellow and with a pressurized volume of the fluid that is upstream of the stator interface.

Optionally, the aft plate includes a forward aft plate and a rearward aft plate axially separated from each other.

Optionally, the stator interface includes a forward rear support plate and a rearward rear support plate. The forward aft plate can form the aft fluid bearing between the forward aft plate and the forward rear support plate and the rearward aft plate forms the aft fluid bearing between the rearward aft plate and the rearward rear support plate.

In one embodiment, a method for forming fluid seals between a rotating component and a stator interface of a rotary machine and between a higher-pressure fluid volume upstream of the stator interface and a lower-pressure fluid volume downstream of the stator interface is provided. The method includes positioning plural seal segments circumferentially intermediate to the rotating component of the rotary machine and axially between a front support plate and a rear support plate of the stator interface and pressurizing the rotary machine with fluid to form the higher-pressure volume upstream of the stator interface. The higher-pressure volume rotates the rotating component to form the lower-pressure volume downstream of the stator interface. The method also includes forming a front axial fluid bearing between cover plates of the seal segments and the front support plate of the stator interface using at least some of the fluid, forming a shoe fluid bearing between film-riding shoes of the seal segments and the rotating component using at least some of the fluid, and forming an aft fluid bearing between aft plates of the seal segments and the rear support plate of the stator interface using at least some of the fluid.

In one embodiment, a seal segment of a seal assembly configured to extend around a rotating component of a rotary machine between the rotating component and a stator interface is provided. The seal segment includes a film-riding shoe having one or more internal passages and an aft plate coupled with the film-riding shoe. The one or more internal passages are configured to direct pressurized fluid in the rotary machine to a location between the film-riding shoe and the rotating component to form a radial film bearing between the film-riding shoe and the rotating component. The one or more internal passages also are configured to direct the pressurized fluid to a location between the aft plate and the stator interface to form an axial aft fluid bearing between the aft plate and the stator interface. The radial film bearing and the axial aft bearing prevent contact between the seal segment and the rotating component and between the seal segment and the stator interface.

Optionally, the seal segment also includes a front plate connected with the film-riding shoe. The one or more internal passages direct the pressurized fluid to a location between the front plate and the stator interface to form an axial front fluid bearing between the front plate and the stator interface.

Optionally, the axial front fluid bearing also prevents contact between the seal segment and the stator interface.

Optionally, the front plate and the aft plate are coupled by a bellow that is configured to be internally pressurized by the pressurized fluid.

Optionally, the bellow is configured to exert axial forces on the front plate and the aft plate urging the front plate and the aft plate in opposite directions and toward the stator interface while the bellow is internally pressurized.

Optionally, the front plate includes a secondary tooth that is elongated toward the stator interface. The secondary tooth is configured to form a film seal between the front plate and the stator interface using at least some of the pressurized fluid.

Optionally, the seal segment also includes one or more radial springs disposed between the film-riding shoe and the stator interface. The one or more radial springs are configured to exert a radial force on the film-riding shoe toward the rotating component.

Optionally, the one or more radial springs include one or more garter springs.

Optionally, the one or more radial springs include one or more leaf springs.

Optionally, the film-riding shoe includes a bearing surface that faces the rotating component. The bearing surface includes one or more of an aerodynamic feature or an aerostatic port through which the pressurized fluid flows to form the radial film bearing.

Optionally, the bearing surface includes one or more of a spiral groove, a Rayleigh step, or a curvature mismatch relative to curvature of the rotating component as the aerodynamic feature.

Optionally, the film-riding shoe includes a slanted surface shaped to interlock with another film-riding shoe of another seal segment.

Optionally, the seal segment also includes one or more spline seals configured to form seals between the seal segment and another neighboring seal segment.

Optionally, the stator interface is rigidly attached to a stator of the rotary machine.

Optionally, the stator interface floats outside of the rotating component.

Optionally, the seal segment also includes one or more of a leaf seal or a W-seal configured to reduce leakage between the stator interface and the floating stator interface.

Optionally, the one or more internal passages include an angled bypass hole that fluidly couples a volume upstream of the shoe with a volume downstream of the shoe in the rotary machine.

Optionally, the one or more internal passages include one or more radial ports that fluidly couple a volume that is upstream of the shoe with the location between the shoe and the rotating component.

In one embodiment, a method for forming fluid seals between a rotating component and a stator interface of a rotary machine and between a higher-pressure fluid volume upstream of the stator interface and a lower-pressure fluid volume downstream of the stator interface is provided. The method includes positioning plural seal segments circumferentially intermediate to the rotating component of the rotary machine and axially between a front support plate and a rear support plate of the stator interface and pressurizing the rotary machine with fluid to form the higher-pressure volume upstream of the stator interface. The higher-pressure volume rotates the rotating component to form the lower-pressure volume downstream of the stator interface. The method also includes forming a front axial fluid bearing between cover plates of the seal segments and the front support plate of the stator interface using at least some of the fluid, forming a shoe fluid bearing between film-riding shoes of the seal segments and the rotating component using at least some of the fluid, and forming an aft fluid bearing between aft plates of the seal segments and the rear support plate of the stator interface using at least some of the fluid.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A seal assembly for a rotary machine, the seal assembly comprising:
    a stator interface having a front support plate and an opposing rear support plate that are axially separated from each other along one or more axial directions that are parallel to an axis of rotation of a rotating component of the rotary machine; and
    plural seal segments configured to be disposed circumferentially intermediate to the rotating component of the rotary machine and axially located between the front support plate and the rear support plate of the stator interface, wherein one or more of the seal segments includes:
        a radially oriented plate configured to axially oppose one or more of the front support plate or the rear support plate of the stator interface; and
        a film-riding shoe coupled with the radially oriented plate, the film-riding shoe configured to form a shoe fluid bearing between the film-riding shoe and the rotating component responsive to rotation of the rotating component and pressurization of fluid in the rotary machine upstream of the front support plate of the stator interface;
    wherein one or more of the stator interface or the film-riding shoe include one or more ports or pathways through which higher-pressure fluid upstream of a stator housing in the rotary machine flows to form an aft axial fluid bearing between the radially oriented plate and the rear support plate of the stator interface.

2. The seal assembly of claim 1, wherein the one or more ports are positioned to direct at least some of the fluid to locations between the radially oriented plate and the front support plate of the stator interface to form an axial front fluid bearing between the radially oriented plates and the front support plate of the stator interface.

3. The seal assembly of claim 2, wherein the one or more ports one or more of axially extend through the front support plate of the stator interface or radially extend in the radially oriented plates coupled with the film-riding shoes.

4. The seal assembly of claim 1, wherein the one or more ports or pathways fluidly couple a volume in the rotary machine that is upstream of the stator interface with first locations axially positioned between the radially oriented plates of the film-riding shoes and the front support plate of the stator interface, second locations radially positioned between the film-riding shoes and the rotating component of the rotary machine, and third locations axially positioned between the radially oriented plates of the film-riding shoes and the rear support plates of the stator interface.

5. The seal assembly of claim 1, wherein the radially oriented plate of each of the seal segments includes a front plate and an aft plate, wherein the aft plate includes one or more of the ports that direct fluid that is pressurized upstream of the stator interface to locations between the aft plate and the rear support plate of the stator interface to form the axial aft fluid bearing.

6. The seal assembly of claim 1, wherein one or more of the front support plate of the stator interface or the film-riding shoes includes axially elongated secondary teeth that are positioned to form a secondary film seal between one or more of (a) the secondary teeth and the front support plate of the stator interface or (b) the secondary teeth and the film-riding shoes.

7. The seal assembly of claim 1, wherein the radially oriented plate that is coupled with the film-riding shoe in each of the seal segments includes a front plate that opposes the front support plate of the stator interface and an aft plate that opposes the aft support plate of the stator interface.

8. The seal assembly of claim 7, wherein the front plate and the aft plate in each of the seal segments are separated from each other.

9. The seal assembly of claim 7, wherein the front plate and the aft plate of each of the seal segments are axially separated from each other by an internal channel that directs at least some of the fluid through the seal segments to form the axial aft fluid bearing.

10. The seal assembly of claim 7, wherein the aft plate in each of the seal segments is a floating aft plate that is coupled with the front plate in the corresponding seal segment by one or more axial springs or pressurized spring bellows.

11. The seal assembly of claim 1, wherein each of the radially oriented plates includes a forward aft plate and a rearward aft plate axially separated from each other.

12. The seal assembly of claim 11, wherein the stator interface includes a forward rear support plate and a rearward rear support plate; and
    wherein each of the forward aft plates and each of the rearward aft plates forms the axial aft fluid bearing between each of the forward aft plates and the forward rear support plate and between each of the rearward aft plates and the rearward rear support plates.

13. A method for forming fluid seals between a rotating component and a stator interface of a rotary machine and between a higher-pressure fluid volume upstream of the stator interface and a lower-pressure fluid volume downstream of the stator interface, the method comprising:
    positioning plural seal segments circumferentially intermediate to the rotating component of the rotary machine and axially between a front support plate and a rear support plate of the stator interface;
    pressurizing the rotary machine with fluid to form the higher-pressure volume upstream of the stator interface, wherein the higher-pressure volume rotates the rotating component to form the lower-pressure volume downstream of the stator interface;
    forming a front axial fluid bearing between cover plates of the seal segments and the front support plate of the stator interface using at least some of the fluid;
    forming a shoe fluid bearing between film-riding shoes of the seal segments and the rotating component using at least some of the fluid; and
    forming an aft fluid bearing between aft plates of the seal segments and the rear support plate of the stator interface using at least some of the fluid.

14. A seal segment of a seal assembly configured to extend around a rotating component of a rotary machine between the rotating component and a stator interface, the seal segment comprising:
    a film-riding shoe having one or more internal passages; and
    an aft plate coupled with the film-riding shoe, wherein the one or more internal passages are configured to direct pressurized fluid in the rotary machine to a location between the film-riding shoe and the rotating component to form a radial film bearing between the film-riding shoe and the rotating component, the one or more internal passages also configured to direct the pressurized fluid to a location between the aft plate and the stator interface to form an axial aft fluid bearing between the aft plate and the stator interface,
    wherein the radial film bearing and the axial aft bearing prevent contact between the seal segment and the rotating component and between the seal segment and the stator interface.

15. The seal segment of claim 14, further comprising a front plate connected with the film-riding shoe, wherein the one or more internal passages direct the pressurized fluid to a location between the front plate and the stator interface to form an axial front fluid bearing between the front plate and the stator interface.

16. The seal segment of claim 14, wherein the front plate and the aft plate are coupled by a bellow that is configured to be internally pressurized by the pressurized fluid.

17. The seal segment of claim 14, further comprising one or more radial springs disposed between the film-riding shoe and the stator interface, the one or more radial springs configured to exert a radial force on the film-riding shoe toward the rotating component.

18. The seal segment of claim 14, wherein the film-riding shoe includes a bearing surface that faces the rotating component, the bearing surface including one or more of an aerodynamic feature or an aerostatic port through which the pressurized fluid flows to form the radial film bearing.

19. The seal segment of claim 14, wherein the one or more internal passages include an angled bypass hole that fluidly couples a volume upstream of the shoe with a volume downstream of the shoe in the rotary machine.

20. The seal segment of claim 14, wherein the one or more internal passages include one or more radial ports that fluidly couple a volume that is upstream of the shoe with the location between the shoe and the rotating component.

* * * * *